United States Patent
Mok et al.

(10) Patent No.: US 11,218,992 B2
(45) Date of Patent: Jan. 4, 2022

(54) METHOD AND APPARATUS FOR SELECTING CARRIER IN WIRELESS COMMUNICATION SYSTEM

(71) Applicant: Samsung Electronics Co., Ltd., Suwon-si (KR)

(72) Inventors: Youngjoong Mok, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/246,363

(22) Filed: Jan. 11, 2019

(65) Prior Publication Data
US 2019/0215801 A1    Jul. 11, 2019

(30) Foreign Application Priority Data

Jan. 11, 2018  (KR) .................. 10-2018-0004107
Mar. 28, 2018  (KR) .................. 10-2018-0036039

(51) Int. Cl.
| | |
|---|---|
| H04W 72/04 | (2009.01) |
| H04W 72/02 | (2009.01) |
| H04L 5/00 | (2006.01) |
| H04W 76/27 | (2018.01) |
| H04W 74/08 | (2009.01) |

(52) U.S. Cl.
CPC ............. *H04W 72/02* (2013.01); *H04L 5/001* (2013.01); *H04W 72/0453* (2013.01); *H04W 74/0816* (2013.01); *H04W 76/27* (2018.02); *H04W 72/042* (2013.01); *H04W 74/0808* (2013.01)

(58) Field of Classification Search
None
See application file for complete search history.

(56) References Cited

U.S. PATENT DOCUMENTS

| | | |
|---|---|---|
| 9,961,684 B2 | 5/2018 | Luo et al. |
| 2019/0116475 A1 | 4/2019 | Lee et al. |
| 2019/0124015 A1* | 4/2019 | Loehr .............. H04L 67/322 |

FOREIGN PATENT DOCUMENTS

| | | |
|---|---|---|
| KR | 10-2016-0039279 A | 4/2016 |
| WO | 2017/171529 A1 | 10/2017 |

OTHER PUBLICATIONS

Ericsson, "Sidelink Carrier Selection Criteria for TX", 3GPP TSG-RAN WG2 #100, Nov. 27-Dec. 1, 2017, 5 pages, Tdoc R2-1713516.
Huawei, HiSilicon, "Discussion on the Tx carrier selection for PC5 CA", 3GPP TSG-RAN WG2 Meeting #100, Nov. 27-Dec. 1, 2017, 6 pages, R2-1712751.

(Continued)

Primary Examiner — Willie J Daniel, Jr.

(57) ABSTRACT

The present disclosure relates to 5G (5th generation) or pre-5G communication systems to support the higher data rate after 4G (4th generation) communication systems such as LTE (Long Term Evolution). The present disclosure provides an apparatus and a method for effectively selecting a transmission carrier in a wireless communication system. The present disclosure relates to an operating method of a terminal in a wireless communication system, which including receiving configuration information from a base station and selecting a transmission carrier and a resource pool on the basis of the configuration information.

22 Claims, 26 Drawing Sheets

(56) References Cited

OTHER PUBLICATIONS

ZTE, "Discussion on carrier selection in PC5 CA", 3GPP TSG-RAN WG2 Meeting #100, Nov. 27-Dec. 1, 2017, 6 pages, R2-1713070.
ZTE, Sanechips, "Carrier selection and resource selection in SL CA", 3GPP TSG RAN WG1 Meeting #91, 4 pages, R1-1719654.
International Search Report dated Apr. 19, 2019 in connection with International Patent Application No. PCT/KR2019/000475, 3 pages.
Written Opinion of the International Searching Authority dated Apr. 19, 2019 in connection with International Patent Application No. PCT/KR2019/000475, 7 pages.
Supplementary European Search Report dated Sep. 23, 2020 in connection with European Application No. 19738604.8, 11 pages.
CATT, "CBR Measurement and Report," R2-1701245, 3GPP TSG-RAN WG2 Meeting #97, Athens, Greece, Feb. 13-17, 2017, 4 pages.
Intel Corporation, "Sidelink congestion control for V2X services," R1-1611925, 3GPP TSG RAN WG1 Meeting #87, Reno, USA, Nov. 14-18, 2016, 6 pages.

\* cited by examiner

METHOD AND APPARATUS FOR SELECTING CARRIER IN WIRELESS COMMUNICATION SYSTEM

CROSS-REFERENCE TO RELATED APPLICATIONS

This application is based on and claims priority under 35 U.S.C. § 119 to Korean Patent Application No. 10-2018-0004107 filed on Jan. 11, 2018 in the Korean Intellectual Property Office and Korean Patent Application No. 10-2018-0036039 filed on Mar. 28, 2018, in the Korean Intellectual Property Office, the disclosures of which are incorporated by reference herein in their entireties.

BACKGROUND

1. Field

The present disclosure relates generally to a wireless communication system and, more specifically, to an apparatus and a method for selecting a carrier in a wireless communication system.

2. Description of Related Art

The above information is presented as background information only to assist with an understanding of the present disclosure. No determination has been made, and no assertion is made, as to whether any of the above might be applicable as prior art with regard to the present disclosure.

In order to meet growing demand for wireless data traffic after commercialization of 4G (4th generation) communication systems, efforts are underway to develop improved 5G (5th generation) communication systems or pre-5G communication systems. For this reason, 5G communication systems or pre-5G communication systems are referred to as "beyond-4G network communication systems" or "post-LTE (Long Term Evolution) systems".

In order to achieve a high data rate, implementation of 5G communication systems in super-high frequency (mmWave) bands (e.g., a band of 60 GHz) has been taken into consideration. In order to mitigate the path loss of radio waves and in order to increase the propagation distance of radio waves in super-high frequency bands, technologies, such as beam-forming, massive MIMO, full-dimensional MIMO (FD-MIMO), array antennas, analog beamforming, and large scale antennas, are being discussed in the 5G communication systems.

In addition, in order to improve the network of a system, technologies, such as evolved small cells, advanced small cells, a cloud radio access network (cloud RAN), an ultra-dense network, device-to-device (D2D) communication, wireless backhaul, moving networks, cooperative communications, coordinated multi-points (CoMP), reception interference cancellation, and the like, are being developed in the 5G communication systems.

In addition, in 5G systems, advanced coding modulation (ACM) schemes, such as hybrid frequency shift keying and quadrature amplitude modulation (FQAM) and sliding window superposition coding (SWSC), and advanced connection technologies, such as filter bank multi-carrier (FBMC), non-orthogonal multiple access (NOMA), sparse code multiple access (SCMA), and the like, are being developed.

Vehicle-to-everything (V2X) technology is being considered in 5G systems. When a terminal uses multiple carriers in a V2X system, it may be necessary to select a transmission carrier supporting reliable data transmission. Therefore, a specific procedure for effectively selecting a transmission carrier in the V2X system is under discussion.

SUMMARY

On the basis of the above discussion, the present disclosure provides an apparatus and a method for effectively selecting a transmission carrier in a wireless communication system.

According to various embodiments of the present disclosure, a method for operating a terminal in a wireless communication system is provided. The method comprises acquiring information on a first threshold value and a second threshold value of channel busy ratio (CBR); measuring a first CBR for a first carrier and a plurality of second CBRs for a plurality of second carriers configured by upper layer; and determining at least one transmission carrier from among the first carrier and the plurality of second CBRs based on the first threshold value, the second threshold value, the first CBR and the plurality of second CBRs.

According to various embodiments of the present disclosure, a terminal in a wireless communication system is provided. The terminal comprises a transceiver; and a processor operably coupled to the transceiver, and configured to: acquire information on a first threshold value and a second threshold value of channel busy ratio (CBR), measure a first CBR for a first carrier and a plurality of second CBRs for a plurality of second carriers configured by upper layer, and determine at least one transmission carrier from among the first carrier and the plurality of second CBRs based on the first threshold value, the second threshold value, the first CBR and the plurality of second CBRs.

According to various embodiments of the present disclosure, a method for operating a base station in a wireless communication system is provided. The method comprises transmitting information on a first threshold value and a second threshold value of channel busy ratio (CBR) to a terminal; receiving a request for resource allocation using at least one transmission carrier determined based on the first threshold value, the second threshold value, a first CBR for a first carrier and a plurality of second CBRs for a plurality of second carriers; and transmitting a resource allocation message for available resources for the at least one transmission carrier.

An apparatus and a method according to various embodiments of the present disclosure enable effective selection for a transmission carrier in a wireless communication system.

The effects obtainable in the present disclosure are not limited to the above description, and other effects, which have not yet been mentioned, will be clearly understood by those skilled in the art from the description below.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

FIGS. 1 through 24C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, the present disclosure relates to an apparatus and a method for selecting a transmission carrier in a wireless communication system. More specifically, the present disclosure describes a technique for selecting a transmission carrier in a multi-carrier situation in a wireless communication system.

The terms referring to communication schemes, the terms referring to signals, the terms referring to information, the terms referring to network entities, the terms referring to elements of an apparatus, and the like, which are used hereinafter, are illustrative words for the convenience of explanation. Accordingly, the present disclosure is not limited to the terms described later, and other terms having equivalent technical meanings may be used.

In addition, the present disclosure describes various embodiments using terms used in some communication standards {e.g., 3rd generation partnership project (3GPP)}, but this is merely an illustrative example. The various embodiments of the present disclosure may be easily modified and applied to other communication systems as well.

Figure 1:
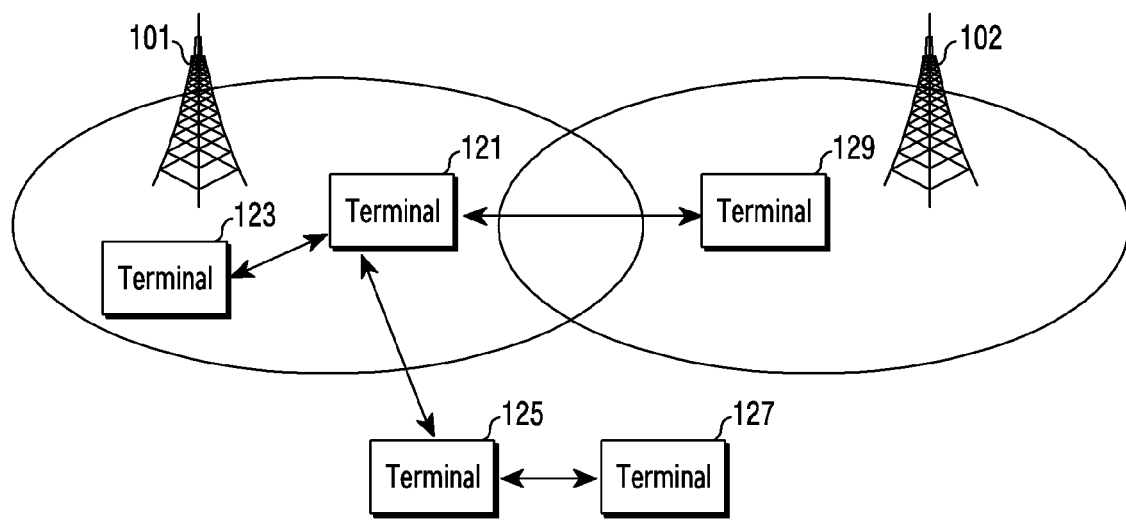
FIG. 1 illustrates a wireless communication system according to various embodiments of the present disclosure.

FIG. 1 illustrates a wireless communication system according to various embodiments of the present disclosure. FIG. 1 illustrates base stations 101 and 102 and terminals 121, 123, 125, 127, and 129 as parts of nodes using wireless channels in a wireless communication system.

The base stations 101 and 102 are network infrastructure that provides wireless access to the terminals 120, 123, 125, 127, and 129. The base stations 101 and 102 have coverages defined as a certain geographic area based on the distance over which signals can transmitted. The base station 101 or 102 may be referred to as an "access point (AP)", an "eNodeB (eNB)", a "5th generation (5G) node", a "wireless point", a "transmission/reception point (TRP)", or other terms having equivalent technical meanings, as well as a base station.

The respective terminals 121, 123, 125, 127, and 129 are devices used by a user and communicate with the base stations 101 and 102 via wireless channels. In some cases, at least one of the terminals 121, 123, 125, 127, and 129 may be operated without user involvement. That is, at least one of the terminals 121, 123, 125, 127, and 129 may be a device for performing machine type communication (MTC), and may not be carried by a user. Each of the terminals 121, 123, 125, 127, and 129 may be referred to as "user equipment (UE)", a "mobile station", a "subscriber station", a "remote terminal", a "wireless terminal", a "user device", or other terms having equivalent technical meanings, as well as a terminal.

FIG. 1 shows various examples in which communication can be performed. For example, communication between the base station 101 and the terminal 121 may be conducted. As another example, communication may be made using a direct link between two terminals. That is, communication may be performed using a direct link between two terminals 121 and 123 within a service range of the base station 101, communication may be performed using a direct link between a terminal 121 within a service range of the base station 101 and a terminal 125 out of the service range of the base station 101, and communication may be performed using a direct link between two terminals 125 and 127 out of a service range of the base station 101. Alternatively, communication may be performed using a direct link between the terminals 121 and 129, which are within the service ranges of different base stations 101 and 102, respectively.

For the communication using a direct link, the terminals 121, 123, 125, 127, and 129 may use intelligent transportation systems (ITS) bands (e.g., 5.9 GHz), instead of using the frequency resources of the base stations 101 and 102. The terminals 121 and 123 within a service range of the base station 101 may set parameters for communication by the base station 101, and the terminal 129 within a service range of the base station 102 may set parameters for communication by the base station 102. The terminals 125 and 127 out of a service range of the base station 101 may operate according to a predefined configuration.

In the present disclosure, the terminals 121, 123, 125, and 127 may operate as a transmitting terminal or a receiving terminal in performing mutual communication. The roles of the transmitting terminal and the receiving terminals are not fixed, but may be variable. For example, the terminal 121 may operate as a transmitting terminal at a certain time, and may operate as a receiving terminal at another time. Alternatively, the terminal 121 may operate as a transmitting terminal in a certain frequency band, and may operate as a receiving terminal in another frequency band.

Figure 2:
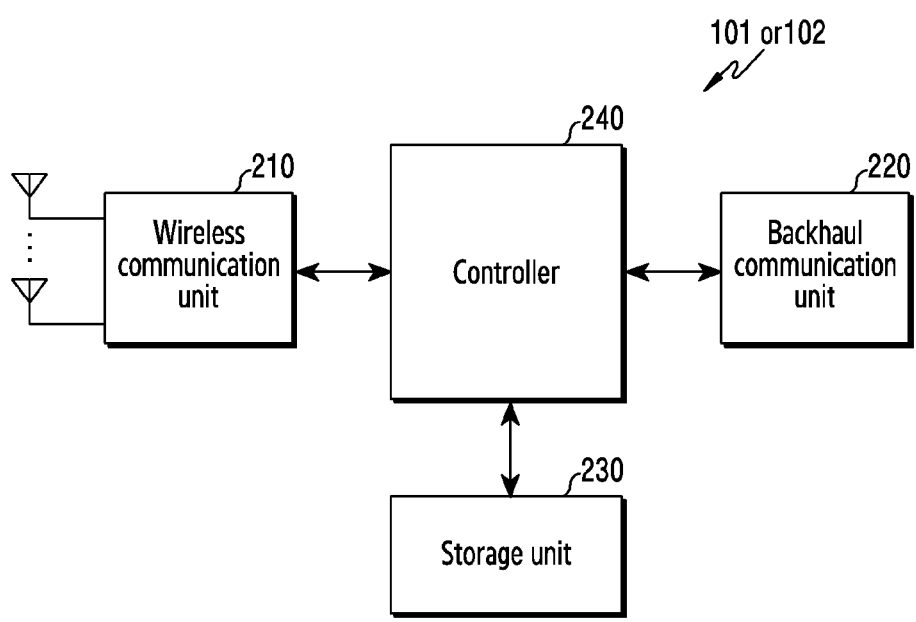
FIG. 2 illustrates the configuration of a base station in a wireless communication system according to various embodiments of the present disclosure.

FIG. 2 illustrates the configuration of a base station in a wireless communication system according to various embodiments of the present disclosure. The configuration illustrated in FIG. 2 may be regarded as a configuration of the base station 101. Hereinafter, the term "-unit", "-or (er)", or the like denotes a unit for processing at least one function or operation, and may be implemented by hardware, software, or a combination thereof.

Referring to FIG. 2, the base station includes a wireless communication unit 210, a backhaul communication unit 220, a storage unit 230, and a controller 240.

The wireless communication unit 210 may perform functions of transmitting and receiving signals via a wireless channel. For example, the wireless communication unit 210 may perform a function of transformation between a baseband signal and a bit stream according to the physical layer standard of a system. For example, in the case of data transmission, the wireless communication unit 210 may generate complex symbols by encoding and modulating a transmission bit stream. In the case of data reception, the wireless communication unit 210 may restore a reception bit stream by demodulating and decoding a baseband signal.

In addition, the wireless communication unit 210 may up-convert a baseband signal to a radio frequency (RF) band signal to thus transmit the same via an antenna, and may down-convert an RF band signal received via an antenna to a baseband signal. To this end, the wireless communication unit 210 may include a transmitting filter, a receiving filter, an amplifier, a mixer, an oscillator, a digital-to-analog convertor (DAC), an analog-to-digital convertor (ADC), and the like. In addition, the wireless communication unit 210 may include a plurality of transmission/reception paths. Further, the wireless communication unit 210 may include at least one antenna array including a plurality of antenna elements.

In terms of hardware, the wireless communication unit 210 may include a digital unit and an analog unit, and the analog unit may include a plurality of sub-units depending on operation power, operation frequency, and the like. The digital unit may be implemented as at least one processor {e.g., a digital signal processor (DSP)}.

The wireless communication unit 210 transmits and receives signals as described above. Accordingly, all or some of the wireless communication unit 210 may be referred to as a "transmitter", a "receiver", or a "transceiver". In the following description, the transmission and reception performed via a wireless channel will be used as a meaning to encompass the execution of the process by the wireless communication unit 210 as described above.

The backhaul communication unit 220 provides an interface for communication with other nodes in the network. That is, the backhaul communication unit 220 converts a bit stream transmitted from a base station to another node, such as another access node, another base station, an upper node, or a core network, into a physical signal and converts a physical signal received from another node into a bit stream.

The storage unit 230 may store data such as fundamental programs, application programs, and configuration information for the operation of the base station. The storage unit 230 may be configured as a volatile memory, a non-volatile memory, or a combination thereof. In addition, the storage unit 230 provides the stored data upon request by the controller 240.

The controller 240 controls the overall operation of the base station. For example, the controller 240 transmits and receives signals through the wireless communication unit 210 or the backhaul communication unit 220. The controller 240 writes or reads data to or from the storage unit 230. The controller 240 may perform functions of a protocol stack used for the communication standard. According to another implemented example, the protocol stack may be included in the wireless communication unit 210. To this end, the controller 240 may include at least one processor.

Figure 3:
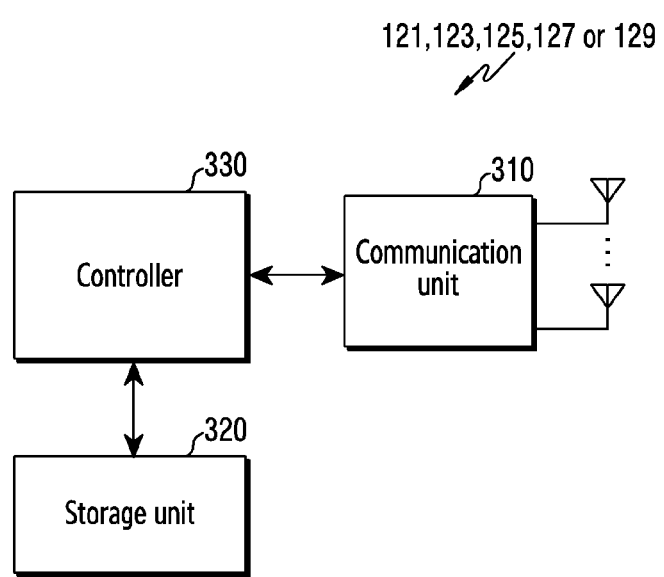
FIG. 3 illustrates the configuration of a terminal in a wireless communication system according to various embodiments of the present disclosure.

FIG. 3 illustrates the configuration of a terminal in a wireless communication system according to various embodiments of the present disclosure. The configuration illustrated in FIG. 3 may be regarded as a configuration of one of the terminals 121, 123, 125, 127, and 129. Hereinafter, the term "-unit", "-or (er)", or the like denotes a unit for processing at least one function or operation, and may be implemented by hardware, software, or a combination thereof.

Referring to FIG. 3, the terminal includes a communication unit 310, a storage unit 320, and a controller 330.

The communication unit 310 performs functions of transmitting and receiving signals via a wireless channel. For example, the communication unit 310 may perform a function of transformation between a baseband signal and a bit stream according to the physical layer standard of a system. For example, in the case of data transmission, the communication unit 310 may generate complex symbols by encoding and modulating a transmission bit stream. In the case of data reception, the communication unit 310 may restore a reception bit stream by demodulating and decoding a baseband signal. In addition, the communication unit 310 may up-convert a baseband signal to an RF band signal to thus transmit the same via an antenna, and may down-convert an RF band signal received via an antenna to a baseband signal. To this end, the communication unit 310 may include a transmitting filter, a receiving filter, an amplifier, a mixer, an oscillator, a DAC, an ADC, and the like.

In addition, the communication unit 310 may include a plurality of transmission/reception paths. Further, the communication unit 310 may include at least one antenna array including a plurality of antenna elements. In terms of hardware, the communication unit 310 may include a digital circuit and an analog circuit {e.g., radio frequency integrated circuit (RFIC)}. Here, the digital circuit and the analog circuit may be implemented as a single package. The communication unit 310 may include multiple RF chains. In addition, the communication unit 310 may perform beamforming.

Furthermore, the communication unit 310 may include a plurality of communication modules to support a plurality of different wireless access technologies. For example, the different wireless access technologies may include Bluetooth Low Energy (BLE), Wireless Fidelity (Wi-Fi™), WiFi Gigabyte (WiGig), cellular networks {e.g., Long Term Evolution (LTE)}, and the like. In addition, different frequency bands may include a super-high frequency (SHF) (e.g., 3.5 GHz or 5 GHz) band and a millimeter wave (e.g., 60 GHz) band.

The communication unit 310 transmits and receives signals as described above. Accordingly, all or some of the communication unit 310 may be referred to as a "transmitter", a "receiver", or a "transceiver". In the following description, the transmission and reception performed via a wireless channel will be used as a meaning to encompass the execution of the process by the communication unit 310 as described above.

The storage unit 320 may store data such as fundamental programs, application programs, and configuration information for the operation of the terminal. The storage unit 320 may be configured as a volatile memory, a non-volatile memory, or a combination thereof. In addition, the storage unit 320 provides the stored data upon request by the controller 330.

The controller 330 controls the overall operation of the terminal. For example, the controller 330 transmits and receives signals through the communication unit 310. The controller 330 writes or reads data to or from the storage unit 320. The controller 330 may perform functions of a protocol stack used for the communication standard. To this end, the controller 330 may include at least one processor or microprocessor, or may be a part of a processor. In addition, a part of the communication unit 310 and the controller 330 may be referred to as a "communication processor (CP)".

Figure 4:
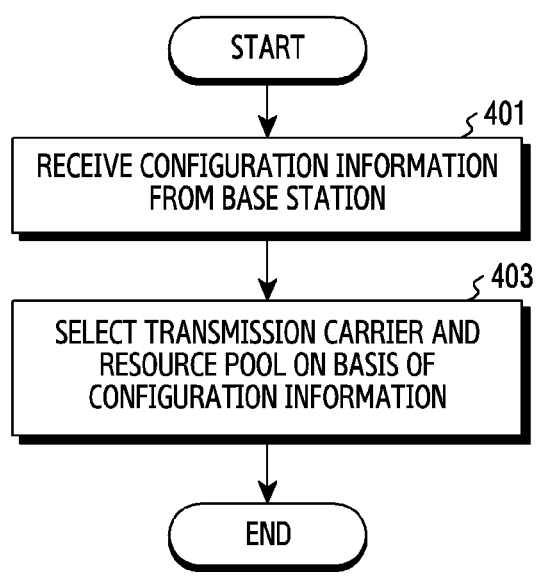
FIG. 4 illustrates a flowchart showing the operation of a terminal according to various embodiments of the present disclosure.

FIG. 4 illustrates a flowchart showing the operation of a terminal according to various embodiments of the present disclosure.

Referring to FIG. 4, the terminal receives configuration information from a base station in step 401. In another embodiment, if the terminal fails to receive the configuration information from the base station in step 401, pre-configuration information preset in the terminal may be used. The configuration information received by the terminal from the base station or the pre-configuration information preset in the terminal may include at least one of a frequency ID, a resource pool ID, resource pool information, transmission carrier and resource pool selection event type information, threshold value information of a channel busy ratio (CBR), and a transmission carrier timer value.

In step 402, the terminal selects a transmission carrier and a resource pool on the basis of the configuration information. The terminal according to various embodiments of the present disclosure may compare the channel busy ratio of a resource pool of a serving frequency with the channel busy ratios of a plurality of candidate resource pools, and if a result of the comparison satisfies a condition of an event corresponding to the transmission carrier and the resource pool selection event type information, may select a transmission resource pool from among the plurality of candidate resource pools satisfying the above condition. In addition, if the result of the comparison does not satisfy the condition, the terminal may select the resource pool of the serving frequency.

In addition, the terminal according to various embodiments of the present disclosure may compare the channel busy ratio of a resource pool group of a serving frequency with the channel busy ratios of a plurality of candidate resource pool groups, if a result of the comparison satisfies a condition of an event corresponding to the transmission carrier and the resource pool selection event type information, may select a transmission resource pool group from among the candidate resource pool groups satisfying the above condition, and may select a transmission resource pool satisfying the condition from among the transmission resource pool group. In addition, if the result of the comparison does not satisfy the condition, the terminal may select the resource pool of the serving frequency.

Furthermore, the terminal according to various embodiments of the present disclosure may compare the channel busy ratio (CBR) of a resource pool of a serving frequency with the CBRs of a plurality of predetermined candidate resource pools, if a result of the comparison satisfies a specific condition, may select a transmission carrier from among the candidate resource pool satisfying the specific condition among the plurality of predetermined candidate resource pools. In addition, if the result of the comparison does not satisfy the specific condition, the terminal may select the transmission carrier from the resource pool of the serving frequency.

According to various embodiments of the present disclosure, after step 402, the terminal may sense available resources using the selected candidate resource pool (mode 4), or may make a request for resource allocation to the selected candidate resource pool (mode 3).

Figure 5:
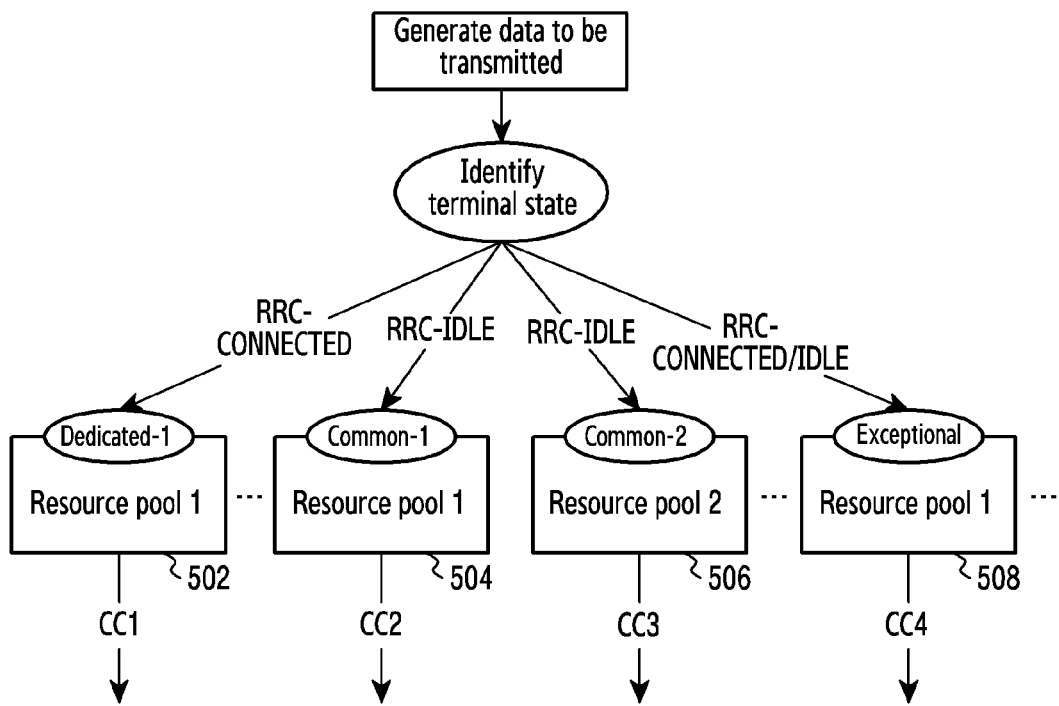
FIG. 5 illustrates a process in which one resource pool is set for a common or dedicated structure and then each resource pool is mapped with one component carrier according to various embodiments of the present disclosure.

FIG. 5 illustrates a process in which one resource pool is set for a common or dedicated structure and then each resource pool is mapped with one component carrier according to various embodiments of the present disclosure.

The terminal may set a resource available for the terminal in radio resource control (RRC) by identifying an RRC state, and may then determine the resource to be actually used in medium access control (MAC), or may then request a resource to be actually used in the MAC.

For example, if the terminal is in the RRC-connected state, the terminal may use, for a dedicated resource pool, one of (1) scheduled v2x-SchedulingPool in SL-V2X-ConfigDedicated received as RRC configuration information or (2) UE-selected CommTxPoolNormalDedicated in SL-V2X-ConfigDedicated received as RRC configuration information.

For example, if the terminal is in the RRC-idle state, the terminal may select, for the resource pool, one of (1) v2x-CommTxPoolNormalCommon received from system information or (2) preconfigured SL-V2X-PreconfigCommPool.

Scenario 1 according to the embodiment in FIG. 5 is as follows.

The system operates a plurality of common resource pools (e.g., a resource pool 504 or a resource pool 506) or a plurality of dedicated resource pools (e.g., a resource pool 502), wherein one resource pool is set for each of the common and dedicated structures and each resource pool is mapped with one component carrier. Additionally, the system may operate at least one exceptional resource pool (e.g., a resource pool 508).

The case where each component carrier is mapped with one resource pool may be considered in a scenario of operating a plurality of common resource pools.

In a structure of a plurality of common resource pools, a system information block may include resource information such as v2x-CommTxPoolNormalCommon1, v2x-CommTxPoolNormalCommon2, . . . , and the like. An example represented as RRC ASN.1 is shown in Table 1 below.

TABLE 1

| Structure in System Information Block 21 |
|---|
| - SL-V2X-ConfigCommon-r14 ::=  SEQUENCE { |
| - ......... |
| - v2x-CommTxPoolNormalCommon1  SL-CommResourcePoolV2X-r14  OPTIONAL, -- Need OR |
| - v2x-CommTxPoolNormalCommon2  SL-CommResourcePoolV2X-r14  OPTIONAL, -- Need OR |
| - ......... |
| - } |

Referring to Table 1, a first common resource and a second common resource may be resources at different locations. Referring to the structure of SL-V2X-ConfigCommon-r14, v2x-CommTxPoolNormalCommon1 represents the first common resource and v2x-CommTxPoolNormalCommon2 represents the second common resource. One piece of resource pool information is included in the common resource structure. One resource pool is connected to one component carrier. In Table 1, it is assumed that the carrier indexes are different for each resource pool.

The terminal may use a plurality of dedicated resources or a plurality of common resources, or may use exceptional resources. The dedicated resource is a resource that the base station can allocate to a specific terminal in the V2X side link, and may be used by a specific terminal when it is allocated by the base station. The common resources are resources that the base station allocates to the terminals in the V2X side link, and may be used by the terminals on the basis of sensing. The exceptional resources are resources that the base station allocates to the terminals in the V2X side link, and may be used when the dedicated resource or the common resource is not available (for example, during handover, during transition from an idle state to an active state, or when the dedicated resource or the common resource is not specified).

The case where each component carrier is mapped with one resource pool may be considered in the scenario of operating a plurality of dedicated resource pools. In a structure of a plurality of dedicated resource pools, for example, a first dedicated resource and a second dedicated resource may be resources at different locations.

An example represented as RRC ASN.1 is shown in Table 2 below.

figDedicated received as RRC configuration information or (2) UE-selected CommTxPoolNormalDedicated in SL-V2X-ConfigDedicated received as RRC configuration information.

For example, if the terminal is in the RRC-idle state, the terminal may select, for the resource pool, one of (1) v2x-CommTxPoolNormalCommon received from the system information or (2) preconfigured SL-V2X-Preconfig-CommPool.

Figure 6:
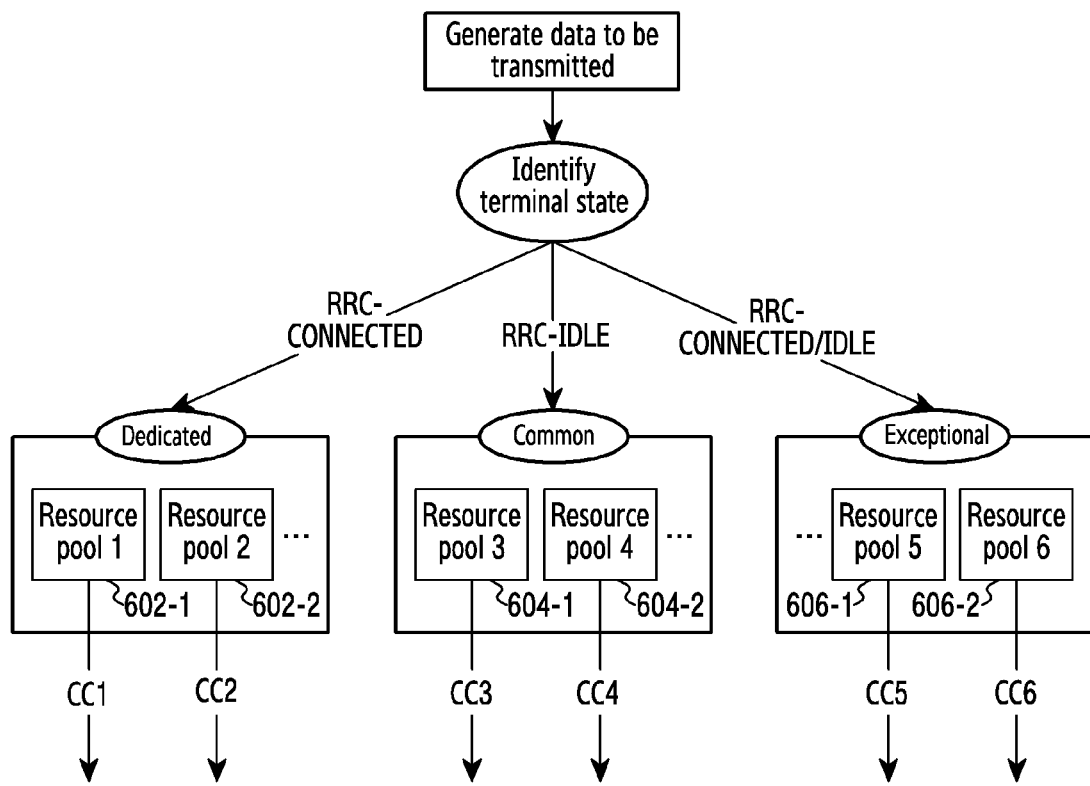
FIG. 6 illustrates a process in which a plurality of resource pools are set for a common or dedicated structure and then each resource pool is mapped with one component carrier according to various embodiments of the present disclosure.

Scenario 2 according to the embodiment in FIG. 6 is as follows.

A plurality of resource pools (e.g., a resource pool 602-1, a resource pool 602-2, a resource pool 604-1, and a resource pool 604-2) may be set for each of the common and dedicated structures, and each resource pool may be mapped with a single component carrier. In the case of the embodiment represented as RRC ASN.1, it is assumed that the carrier indexes are different for each resource pool.

The terminal may include a plurality of dedicated resources or a plurality of common resources, or may include exceptional resources (e.g., a resource pool 606-1

TABLE 2

```
SL-V2X-ConfigDedicated1 ::=           SEQUENCE       {
    commTxResources-r14               CHOICE {
    ......
        scheduled-r14                 SEQUENCE {
        .......
            v2x-SchedulingPool-r14    SL-CommResourcePoolV2X-r14    OPTIONAL,        --
Need ON
            ......
        }
    }
}
SL-V2X-ConfigDedicated2 ::=                                        SEQUENCE{
    commTxResources-r14               CHOICE {
    ......
        scheduled-r14                                               SEQUENCE {
        .......
            v2x-SchedulingPool-r14    SL-CommResourcePoolV2X-r14    OPTIONAL,        --
Need ON
            ......
        }
    }
}
```

Referring to Table 2, SL-V2X-ConfigDedicated1 represents the first dedicated resource and SL-V2X-ConfigDedicated2 represents the second dedicated resource. These are omitted in FIG. 5.

FIG. 6 illustrates a process in which a plurality of resource pools are set for a common or dedicated structure and then each of the resource pools is mapped with one component carrier according to various embodiments of the present disclosure.

The operation of identifying the terminal state is performed in the same manner as the embodiment of FIG. 5.

The terminal may set a resource available for the terminal in RRC by identifying the terminal state (i.e., the RRC state), and may then determine the resource to be actually used in the MAC, or may then request a resource to be actually used in the MAC.

For example, if the terminal is in the RRC-connected state, the terminal may use, for the dedicated resource pool, one of (1) scheduled v2x-SchedulingPool in SL-V2X-Conand a resource pool 606-2). The dedicated resource is a resource that the base station can allocate to a specific terminal in the V2X side link, and may be used by a specific terminal when it is allocated by the base station. The common resources are resources that the base station allocates to the terminals in the V2X side link, and may be used by the terminals on the basis of sensing. The exceptional resources are resources that the base station allocates to the terminals in the V2X side link, and may be used when the dedicated resource or the common resource is not available (for example, during handover, during transition from an idle state to an active state, or when the dedicated resource or the common resource is not specified).

The respective resource pools may inform of the locations of different resources. For example, the first dedicated resource and the second dedicated resource have different locations. In addition, for example, the third common resource and the fourth common resource have different locations.

Example 1 of the dedicated resource represented as RRC ASN.1 is shown in Table 3 below.

TABLE 3

```
- SL-V2X-ConfigDedicated ::=          SEQUENCE{
- commTxResources                     CHOICE {
- ......
-       scheduled                     SEQUENCE {
-
-       ......
-       v2x-SchedulingPool1           SL-CommResourcePoolV2X    OPTIONAL,    -- Need ON
-       v2x-SchedulingPool2           SL-CommResourcePoolV2X    OPTIONAL,    -- Need ON
-       ......
-       }
-     }
-   }
-
```

Referring to Table 3, v2x-SchedulingPool may be expressed as a structure of SL-CommResourcePoolV2X, v2x-SchedulingPool1 represents the first dedicated resource, and v2x-SchedulingPool2 represents the second dedicated resource.

Example 2 of the dedicated resource represented as RRC ASN.1 is shown in Table 4 below.

TABLE 4

```
- SL-V2X-ConfigDedicated ::=          SEQUENCE{
- commTxResources                     CHOICE {
- ......
-       scheduled                     SEQUENCE {
-
-       .......
-           v2x-SchedulingPool        SL-CommResourcePoolListV2X    OPTIONAL,    --
Need ON
-                }
-           }
-       }
- SL- CommResourcePoolListV2X ::=     SEQUENCE (SIZE (1..maxSL-V2X-TxPool)) OF SL-
CommResourcePoolV2X
-
```

Referring to Table 4, v2x-SchedulingPool may be expressed as a list by means of SL-CommResourcePoolListV2X, and the first dedicated resource and the second dedicated resource may be included in SL-CommResourcePoolListV2X.

An example of a common resource represented as RRC ASN.1 is shown in Table 5 below.

TABLE 5

```
- v2x-CommTxPoolNormalCommon    SL-CommTxPoolListV2X       OPTIONAL,       -- Need OR
......
- SL-CommTxPoolListV2X ::=    SEQUENCE (SIZE (1..maxSL-V2X-TxPool)) OF SL-CommResourcePoolV2X
```

Referring to Table 5, for example, a third common resource and a fourth common resource may be resources at different locations. v2x CommTxPoolNormalCommon may be expressed as a list by means of SL-CommTxPoolListV2X, and the third common resource and the fourth common resource may be included in SL-CommTxPoolListV2X.

Figure 7:
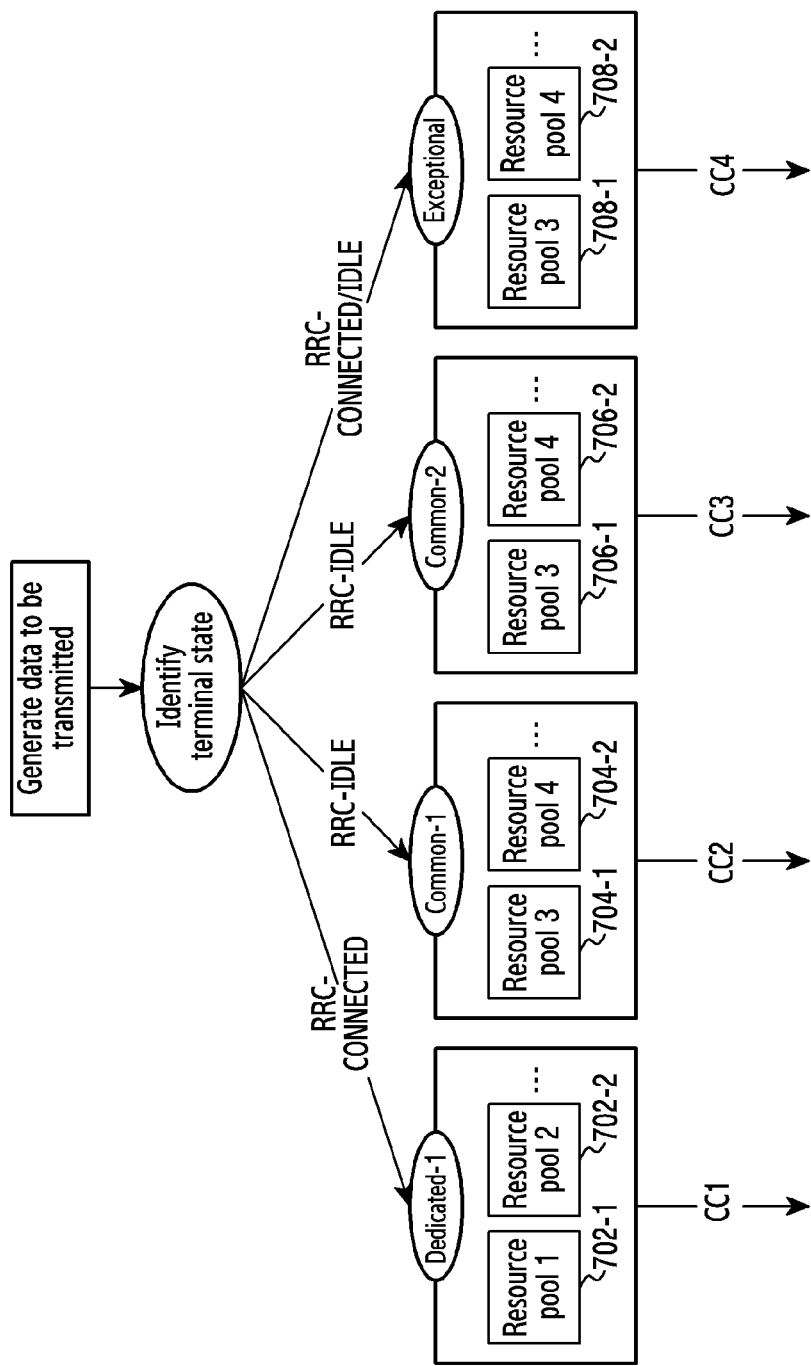
FIG. 7 illustrates a process in which a plurality of resource pools are set for a common or dedicated structure and then a plurality of resource pools are mapped with one component carrier according to various embodiments of the present disclosure.

FIG. 7 illustrates a process in which a plurality of resource pools are set for a common or dedicated structure and then the plurality of resource pools are mapped with one component carrier according to various embodiments of the present disclosure.

The operation of identifying the terminal state is performed in the same manner as the embodiment in FIG. 5.

The terminal may set a resource available for the terminal in RRC by identifying the RRC state, and may then determine the resource to be actually used in the MAC, or may then request a resource to be actually used in the MAC.

For example, if the terminal is in the RRC-connected state, the terminal may use, for a dedicated resource pool, one of (1) scheduled v2x-SchedulingPool in SL-V2X-ConfigDedicated received as RRC configuration information or (2) UE-selected CommTxPoolNormalDedicated in SL-V2X-ConfigDedicated received as RRC configuration information.

For example, if the terminal is in the RRC-idle state, the terminal may select, for a resource pool, one of (1) v2x-CommTxPoolNormalCommon received from system information or (2) preconfigured SL-V2X-PreconfigCommPool.

Scenario 3 according to the embodiment in FIG. 7 is as follows.

In the case where a plurality of resource pools are set for each of the dedicated and common structures and the plurality of resource pools are mapped with a single component carrier, the resource pools mapped with the single component carrier may be defined as a resource pool group.

The terminal may include a plurality of dedicated resources (e.g., a resource pool 702-1 and a resource pool 702-2) or a plurality of common resources (e.g., a resource pool 704-1, a resource pool 704-2, a resource pool 706-1, and a resource pool 706-2), or may include exceptional resources (e.g., a resource pool 708-1 and a resource pool 708-2). The dedicated resource is a resource that the base station can allocate to a specific terminal in the V2X side link, and may be used by a specific terminal when it is allocated by the base station. The common resources are resources that the base station allocates to the terminals in the V2X side link, and may be used by the terminals on the basis of sensing. The exceptional resources are resources that the base station allocates to the terminals in the V2X side link, and may be used when the dedicated resource or the common resource is not available (for example, during handover, during transition from an idle state to an active state, or when the dedicated resource or the common resource is not specified).

The respective resource pools may inform of the locations of different resources.

Example 1 of RRC ASN.1 with respect to a dedicated resource for each frequency is shown in Table 6 below. For example, a first dedicated resource and a second dedicated resource may be resources at different locations.

TABLE 6

```
- SL-FreqInfoListV2X ::= SEQUENCE (SIZE (0..maxFreqV2X-1-r14)) OF SL-FreqInfoV2X
-
- SL-FreqInfoV2X ::=      SEQUENCE{
-
- SL-V2X-ConfigDedicated1 ::=              SEQUENCE{
- commTxResources                  CHOICE {
- ......
-                  scheduled                  SEQUENCE {
-            ......
-                         v2x-SchedulingPool1    SL-CommResourcePoolV2X-r14    OPTIONAL,     --
Need ON
-                         v2x-SchedulingPool2    SL-CommResourcePoolV2X-r14    OPTIONAL,     --
Need ON
-                         ......
-                         }
-                  }
-            }
-
- SL-V2X-ConfigDedicated2 ::=              SEQUENCE{
- commTxResources                  CHOICE {
- ......
-            scheduled                       SEQUENCE {
-            ......
-                         v2x-SchedulingPool3    SL-CommResourcePoolV2X-r14    OPTIONAL,     --
Need ON
-                         v2x-SchedulingPool4    SL-CommResourcePoolV2X-r14    OPTIONAL,     --
Need ON
-                         ......
-                         }
-                  }
-            }
- }
```

Referring to Table 6, v2x-SchedulingPool1 of SL-V2X-ConfigDedicated1 represents a first dedicated resource, v2x-SchedulingPool2 of SL-V2X-ConfigDedicated1 represents a second dedicated resource, v2x-SchedulingPool3 of SL-V2X-ConfigDedicated2 represents a third dedicated resource, and v2x-SchedulingPool4 of SL-V2X-ConfigDedicated2 represents a fourth dedicated resource.

Example 2 of RRC ASN.1 with respect to a dedicated resource for each frequency is shown in Table 7 below.

TABLE 7

```
- SL-FreqInfoListV2X ::= SEQUENCE (SIZE (0..maxFreqV2X-1-r14)) OF SL-FreqInfoV2X
-
- SL-FreqInfoV2X ::=      SEQUENCE{
-
- SL-V2X-ConfigDedicatedList-r15 ::=       SEQUENCE (SIZE (1..maxSL-V2X-ConfigDedicated-r15))
OF SL-V2X-ConfigDedicated-r15
-
- SL-V2X-ConfigDedicated-r15 ::=              SEQUENCE{
- commTxResources-r15           CHOICE {
- ......
-            scheduled-r15                  SEQUENCE {
-            ......
-                         v2x-SchedulingPool    SL-CommResourcePoolListV2X-r15    OPTIONAL,     --
Need ON
-                         }
-                  }
-            }
```

TABLE 7-continued

| |
|---|
| - SL- CommResourcePoolListV2X-r15 ::=    SEQUENCE (SIZE (1..maxSL-V2X-TxPool-r15)) OF SL-CommResourcePoolV2X-r15 |

Referring to Table 7, v2x-SchedulingPool may be expressed as a list by means of SL-CommResourcePoolListV2X-r15, and the first dedicated resource and the second dedicated resource may be included in SL-CommResourcePoolListV2X-r15.

Example 1 of RRC ASN.1 for a common resource is shown in Table 8 below. For example, a first dedicated resource, a second dedicated resource, a third dedicated resource, and a fourth dedicated resource may be resources at different locations.

An embodiment of the operation of a terminal according to various embodiments of the present disclosure when the terminal selects a transmission (TX) carrier on the basis of a channel busy ratio (CBR) will be described with reference to FIGS. 8 to 12.

Figure 8:
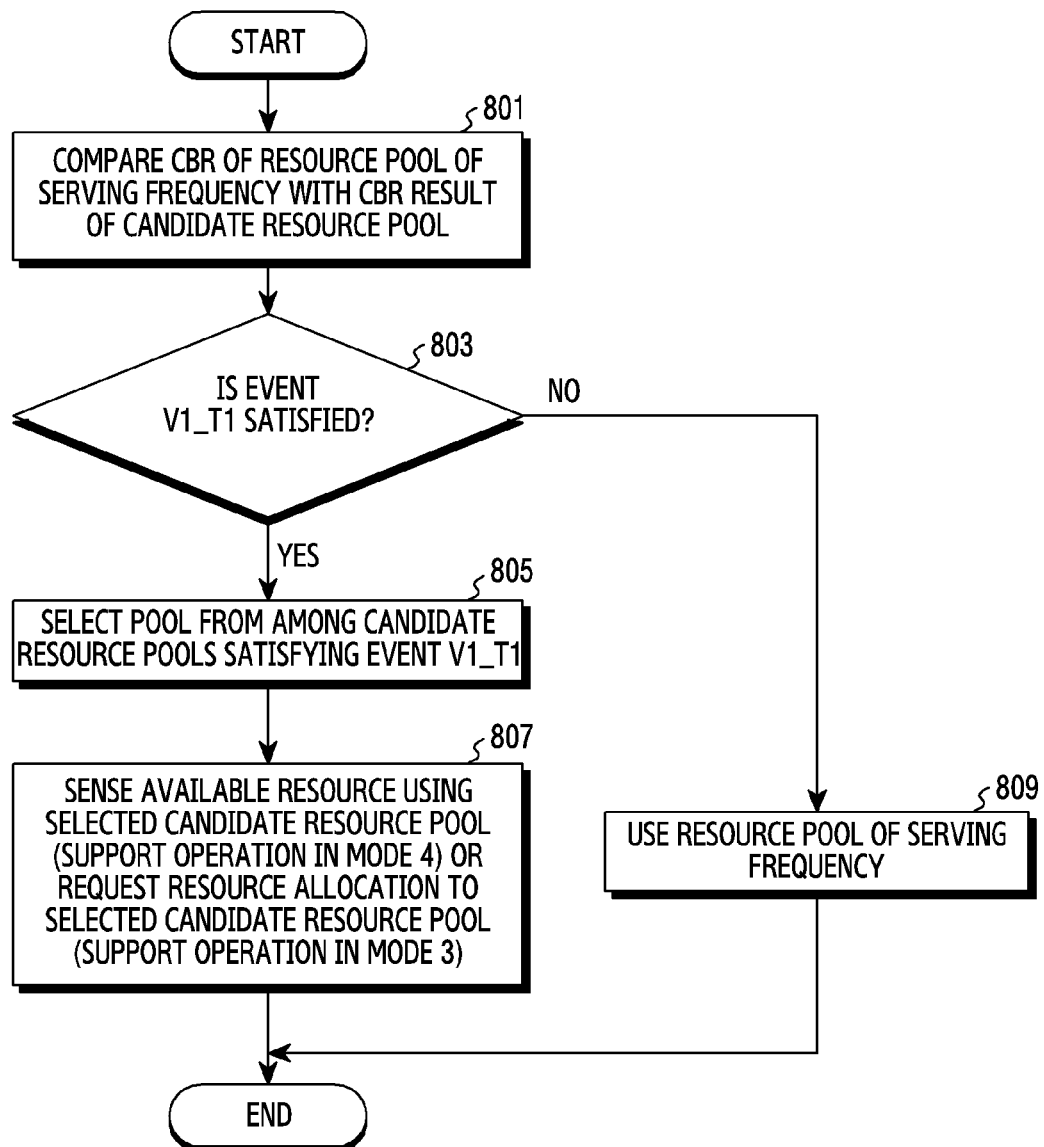
FIG. 8 illustrates a process in which a terminal uses Event V1_T1 for a CBR when selecting a transmission carrier on the basis of the CBR according to various embodiments of the present disclosure.

FIG. 8 illustrates a process of using Event V1_T1 for a CBR when a terminal selects a transmission carrier on the basis of a CBR according to various embodiments of the present disclosure. In the following description, the candidate resource pool means a resource pool having a frequency

TABLE 8

| Structure in System Information Block 21 | | | |
|---|---|---|---|
| - SL-FreqInfoListV2X ::=    SEQUENCE (SIZE (0..maxEreqV2X-1-r14)) OF SL-FreqInfoV2X | | | |
| - SL-FreqInfoV2X ::=    SEQUENCE{ | | | |
| - SL-V2X-ConfigCommon-r14 ::=    SEQUENCE { | | | |
| - ......... | | | |
| - v2x-CommTxPoolNormalCommon1 Need OR | SL-CommTxPoolListV2X-r14 | OPTIONAL, | -- |
| - v2x-CommTxPoolNormalCommon2 Need OR | SL-CommTxPoolListV2X-r14 | OPTIONAL, | -- |
| - ......... | | | |
| - } | | | |

Referring to a structure of SL-V2X-ConfigCommon-r14 in Table 8 above, v2x-CommTxPoolNormalCommon1 represents first and second common resource pools by means of SL-CommTxPoolListV2X-r14, and v2x-CommTxPoolNormalCommon2 represents third and fourth common resource pools by means of SL-CommTxPoolListV2X-r14.

Example 2 of RRC ASN.1 for a common resource is shown in Table 9 below.

different from a serving frequency. The serving frequency means a camped frequency or a frequency of a previously used resource pool.

Referring to FIG. 8, in step 801, the terminal compares a CBR of a currently used resource pool with a CBR result of a candidate resource pool. The CBR measurement result for the resource pool (poolIdentity-r14) may be reflected as cbr-PSSCH-r14 and cbr-PSCCH-r14 in the RRC. Referring

TABLE 9

| Structure in System Information Block 21 | | | |
|---|---|---|---|
| - SL-FreqInfoListV2X ::=    SEQUENCE (SIZE (0..maxFreqV2X-1-r14)) OF SL-FreqInfoV2X | | | |
| - SL-FreqInfoV2X ::=    SEQUENCE{ | | | |
| - SL-V2X-ConfigCommonList-r15   ::=    SEQUENCE (SIZE (1..maxSL-V2X-ConfigCommon-r15)) OF SL-V2X-ConfigCommon-r15 | | | |
| - SL-V2X-ConfigCommon-r15 ::=    SEQUENCE { | | | |
| - ......... | | | |
| - v2x-CommTxPoolNormalCommon Need OR | SL-CommTxPoolListV2X-r14 | OPTIONAL, | -- |
| - ......... | | | |
| - } | | | |

Referring to a structure of SL-V2X-ConfigCommonList-r15 in Table 9 above, first and second common resource pools may be represented by means of the first SL-V2X-ConfigCommon-r15 of SL-V2X-ConfigCommonList-r15 (included in SL-CommTxPoolListV2X-r14), and third and fourth common resource pools may be represented by means of the second SL-V2X-ConfigCommonList-r15 of SL-V2X-ConfigCommonList-r15 (included in SL-CommTxPoolListV2X-r14).

to Table 10 below, values of cbr-PSSCH-r14 and cbr-PSCCH-r14 are integers from 0 to 100.

TABLE 10

| | | |
|---|---|---|
| cbr-PSSCH-r14 | SL-CBR-r14, | |
| cbr-PSCCH-r14 | SL-CBR-r14 | OPTIONAL |
| ...... | | |
| SL-CBR-r14 ::= | INTEGER(0..100) | |

In step 803, the terminal identifies whether or not an Event V1_T1 condition is satisfied. Event V1_T1 may be defined as one of (1) the CBR difference between a serving frequency resource and a candidate resource pool, (2) a CBR value of a candidate resource pool, (3) the CBR difference between a serving frequency resource and a candidate resource pool and a CBR value of the candidate resource pool, and (4) an event with the lowest CBR value of a serving frequency resource.

If the CBR result of the serving frequency resource is higher than the CBR result of the candidate resource pool by CBR_Threshold_A or more, the candidate resource pool is more likely to be included in the transmission resource candidates. The following is a condition in which the candidate resource pool is included in the transmission resource candidates.

CBR_servingPool−
   CBR_candidatedPool>CBR_Threshold_A

If the CBR result of the candidate resource pool is smaller than CBR_Threshold_B, the candidate resource pool is more likely to be included in the transmission resource candidates. The following is a condition in which the candidate resource pool is included in the transmission resource candidates.

CBR_candidatedPool<CBR_Threshold_B

If the CBR result of the serving frequency resource is higher than the CBR result of the candidate resource pool by CBR_Threshold_A or more, and if the CBR result of the candidate resource pool is smaller than CBR_Threshold_B, the candidate resource pool is more likely to be included in the transmission resource. The following is a condition in which the candidate resource pool is included in the transmission resource candidates.

CBR_servingPool−
   CBR_candidatedPool>CBR_Threshold_A and

CBR_candidatedPool<CBR_Threshold_B

If the serving frequency resource has the lowest CBR value, the serving frequency resource is selected. Otherwise, a resource is selected from the candidate resource pool.

Time-to-trigger (TTT) may be operated for Event V1_T1. If Event V1_T1 is satisfied during the TTT, the candidate resource pool is included in the transmission resource candidates. Otherwise, it is not included in the transmission resource candidates. The TTT may be used for the purpose of preventing frequent frequency switching of the terminal and frequent resource allocation requests/resource allocation signaling between the terminal and the base station in mode 3.

Example 1 of RRC ASN.1 for Event V1_T1 is shown in Table 11 below. For example, it may be set in a dedicated RRC message or system information.

In step 805, the terminal selects a candidate frequency and a resource pool of the corresponding frequency from among the candidate resource pools satisfying the Event V1_T1 condition in step 803 using one of the following methods. According to an embodiment, the terminal may select a resource pool having the lowest CBR from among the candidate resource pools. According to another embodiment, the terminal may randomly select a resource pool from among the candidate resource pools.

In step 807, the terminal senses a resource available for V2X communication using the selected resource pool of the selected candidate frequency (operation in mode 4), or the terminal transmits, to the base station, a request for resource allocation to the selected resource pool of the selected candidate frequency (operation in mode 3).

In mode 3, the operation in which the terminal makes a request to the base station for resource allocation to the selected resource pool of the selected candidate frequency will be described later with reference to FIG. 9.

In mode 3 and mode 4, a transmission (TX) carrier timer may be set for the purpose of instructing the terminal to keep using the candidate frequency or the candidate resource pool for a predetermined period of time. The transmission carrier timer may minimize the probability of resource conflict in a corresponding carrier due to frequent changes in the transmission carrier. When the terminal selects to use the candidate frequency and a resource pool of the candidate frequency, instead of the serving frequency and a resource pool of the serving frequency, the transmission carrier timer may be specified such that the terminal can use the selected candidate frequency for a predetermined period of time, and the predetermined period of time may be set as a value of the transmission carrier timer. In another embodiment, the transmission carrier timer may be set to specify that the terminal uses the selected candidate frequency and the selected resource pool of the corresponding frequency for a predetermined period of time.

In step 809, if the Event V1_T1 condition is not satisfied in step 803, the terminal may perform the use of a resource on the basis of mode 3 or mode 4 with respect to the resource pool of the serving frequency while maintaining the selection of the resource pool of the serving frequency.

Figure 9:
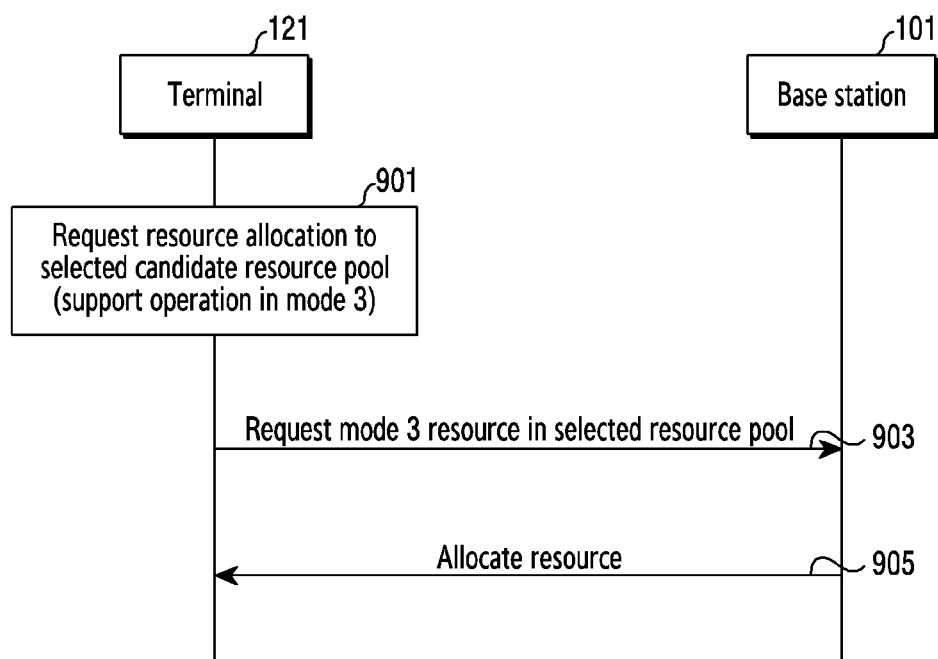
FIG. 9 illustrates a process in which a terminal makes a request for resource allocation to candidate resource pools selected through the process in FIG. 8 (operation in mode 3) according to various embodiments of the present disclosure.

FIG. 9 illustrates a process in which the terminal makes a request for resource allocation to the candidate resource pool selected through the process in FIG. 8 (operation in mode 3) according to various embodiments of the present disclosure.

Referring to FIG. 9, in step 901, the terminal 121 determines a request for resource allocation to the candidate resource pool selected in step 807 of FIG. 8 (mode 3 operation).

TABLE 11

| - TxCarrierSelectionConfig__V2X ::= | SEQUENCE { | |
|---|---|---|
| - triggerType | CHOICE { | |
| -    event | SEQUENCE { | |
| -       eventId | CHOICE { | |
| -          eventV1__T1 | SEQUENCE { | |
| -             CBR__Threshold__A-r15 | SL-CBR-r14 | [Optional] |
| -             CBR__Threshold__B-r15 | SL-CBR-r14 | [Optional] |
| -          }, | | |
| -          timeToTrigger | TimeToTrigger | [Optional] |
| -       }, | | |
| - } | | |

In step 903, the terminal 121 makes a request to the base station 101 for a mode 3 resource in the resource pool selected in step 901.

Example 1: Using RRC SidelinkUEInformation Message (1) The terminal transmits, to the base station 101, a SidelinkUEInformation message including at least one of a frequency ID, a resource pool ID, and DestinationInfoList, thereby requesting a resource in the candidate resource pool.
(2) An example of ASN.1 of an RRC message used when the terminal 121 makes a request to the base station 101 for resource allocation to the selected resource pool of the candidate frequency is shown in Table 12 below.

TABLE 12

| | | |
|---|---|---|
| SL-V2X-CommTxResourceReq-r14 ::= | SEQUENCE { | |
| carrierFreqCommTx-r14 | INTEGER (0.. maxFreqV2X-1-r14) | OPTIONAL, |
| v2x-CommTxPool-r15 | SL-CommTxPoolListV2X-r14 | OPTIONAL, |
| v2x-TypeTxSync-r14 | SL-TypeTxSync-r14 | OPTIONAL, |
| v2x-DestinationInfoList-r14 | SL-DestinationInfoList-r12 | OPTIONAL |
| ... | | |
| } | | |

Example 2: Using MAC Control Element (CE)

(1) The terminal transmits, to the base station 101, a side link buffer status report (BSR) including at least one of a destination ID, a logical channel group ID, a buffer size, a frequency ID, and a resource pool ID, thereby requesting resource allocation to the candidate resource pool.

In step 905, the base station 101 may allocate a resource to the terminal 121 using information of the RRC message or information of the MAC CE transmitted from the terminal 121.

Example: Using Downlink Control Information (DCI) 5A (1) the base station provides a carrier indicator and resource location information, thereby allocating resources to the candidate resource pool.

Figure 10:
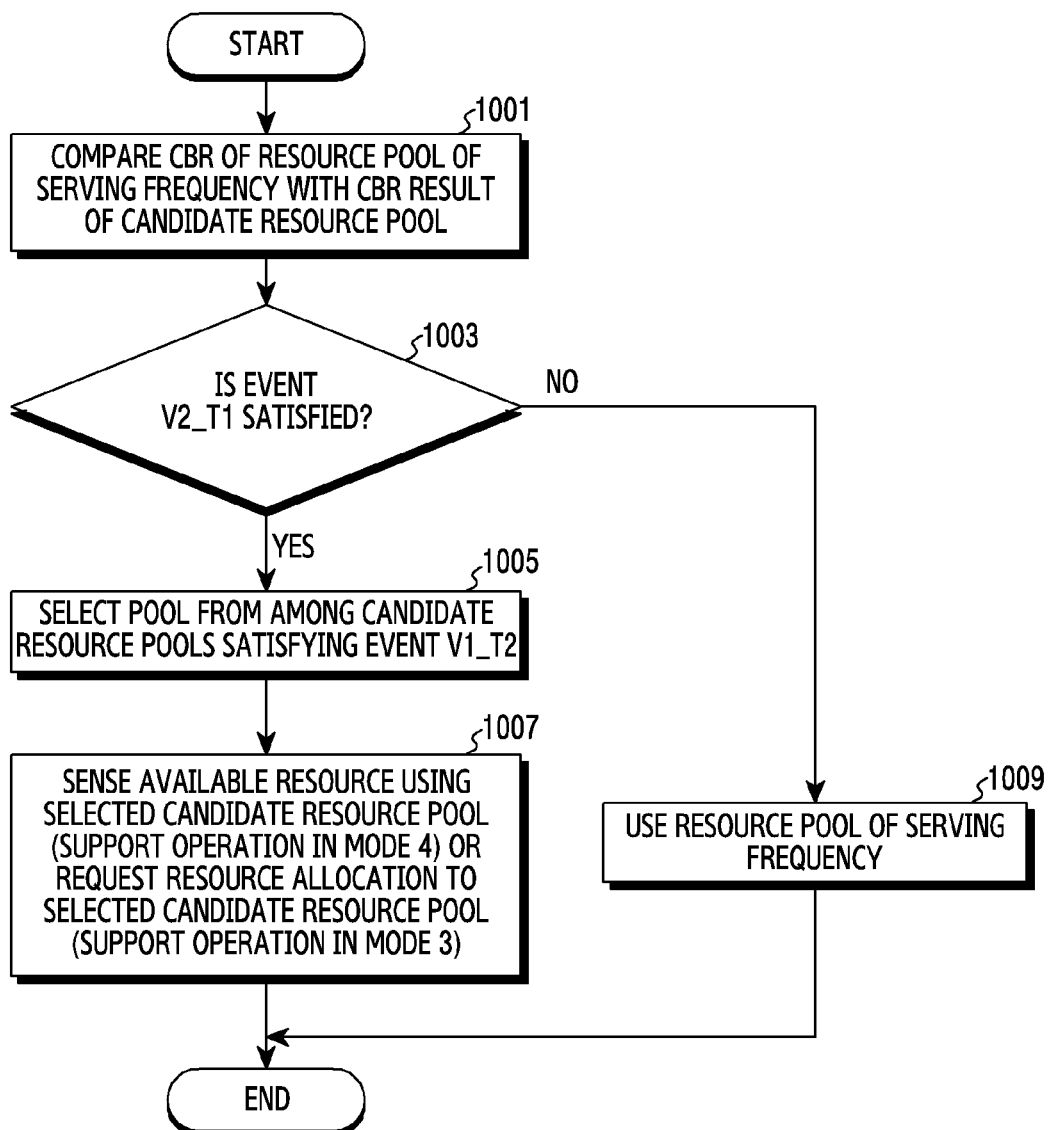
FIG. 10 illustrates a process in which a terminal uses Event V1_T2 for a CBR when selecting a transmission (TX) carrier on the basis of the CBR according to various embodiments of the present disclosure.

FIG. 10 illustrates a process of using Event V1_T2 for a CBR when the terminal selects a transmission (TX) carrier on the basis of a CBR according to various embodiments of the present disclosure. In the following description, the candidate resource pool means a resource pool having a frequency different from the serving frequency. The serving frequency may be a camped frequency, or may correspond to the frequency of a previously used resource pool.

Referring to FIG. 10, in step 1001, the terminal compares the CBR of a currently used resource pool with the CBR result of a candidate resource pool. The CBR measurement result for the resource pool (poolIdentity-r14) may be reflected as cbr-PSSCH-r14 and cbr-PSCCH-r14 in the RRC. Referring to Table 13 below, values of cbr-PSSCH-r14 and cbr-PSCCH-r14 are integers from 0 to 100.

TABLE 13

| | | |
|---|---|---|
| cbr-PSSCH-r14 | SL-CBR-r14, | |
| cbr-PSCCH-r14 | SL-CBR-r14 | OPTIONAL |
| ...... | | |
| SL-CBR-r14 ::= | | INTEGER(0..100) |

In step 1003, the terminal identifies whether or not an Event V1_T2 condition is satisfied. Event V1_T2 may be defined as one of (1) the case where the CBR value of the serving frequency is higher than CBR_Threshold_A (for example, when the probability of occurrence of resource conflict or resource shortage is high) and (2) the case where the CBR value of the candidate resource is lower than CBR_Threshold_B (for example, the probability of occurrence of resource conflict or resource shortage is low).

The following is a condition in which the candidate resource pool is included in the transmission resource candidates.

CBR_servingPool>CBR_Threshold_A and
CBR_neighboring<CBR_Threshold_B

The terminal may selectively operate TTT for Event V1_T2.

An example of RRC ASN.1 for Event V1_T2 is shown in Table 14 below. It may be set in a dedicated RRC message or system information.

TABLE 14

| | | | |
|---|---|---|---|
| - TxCarrierSelectionConfig_V2X ::= | SEQUENCE { | | |
| - triggerType | CHOICE { | | |
| - event | SEQUENCE { | | |
| - eventId | CHOICE { | | |
| - eventV1_T2 | SEQUENCE { | | |
| - CBR_Threshold_A | | SL-CBR-r14 | [Optional] |
| - CBR_Threshold_B | | SL-CBR-r14 | [Optional] |
| - }, | | | |
| - timeToTrigger | | TimeToTrigger | |
| - [Optional] | | | |
| - }, | | | |
| - } | | | |

In step 1005, the terminal selects a candidate frequency and a resource pool of the corresponding frequency from among the candidate resource pools satisfying the Event V1_T2 condition in step 1003 using one of the following methods. According to an embodiment, the terminal may select a resource pool having the lowest CBR from among the candidate resource pools. According to another embodiment, the terminal may randomly select a resource pool from among the candidate resource pools.

In step 1007, the terminal senses available resources using the determined resource pool (operation in mode 4), or the terminal transmits, to the base station, a request for resource allocation to the selected candidate resource pool of the selected candidate frequency (operation in mode 3).

In mode 3, the operation in which the terminal makes a request to the base station for resource allocation to the selected resource pool of the selected candidate frequency is performed in the same manner as the embodiment in FIG. 9.

In mode 3 and mode 4, a transmission (TX) carrier timer may be set for the purpose of instructing the terminal to keep using the candidate frequency or the candidate resource pool for a predetermined period of time. The transmission carrier timer may minimize the probability of resource conflict in the corresponding carrier due to frequent changes in the transmission carrier. When the terminal selects to use the candidate frequency and a resource pool of the candidate frequency, instead of the serving frequency and a resource pool of the serving frequency, the transmission carrier timer may be specified such that the terminal can use the selected candidate frequency for a predetermined period of time, and the predetermined period of time may be set as a value of the transmission carrier timer. In another embodiment, the transmission carrier timer may be set to specify that the terminal uses a selected candidate frequency and a selected resource pool of the corresponding frequency for a predetermined period of time.

In step 1009, if the Event V1_T2 condition is not satisfied in step 1003, the terminal may use a resource pool of the serving frequency.

Figure 11:
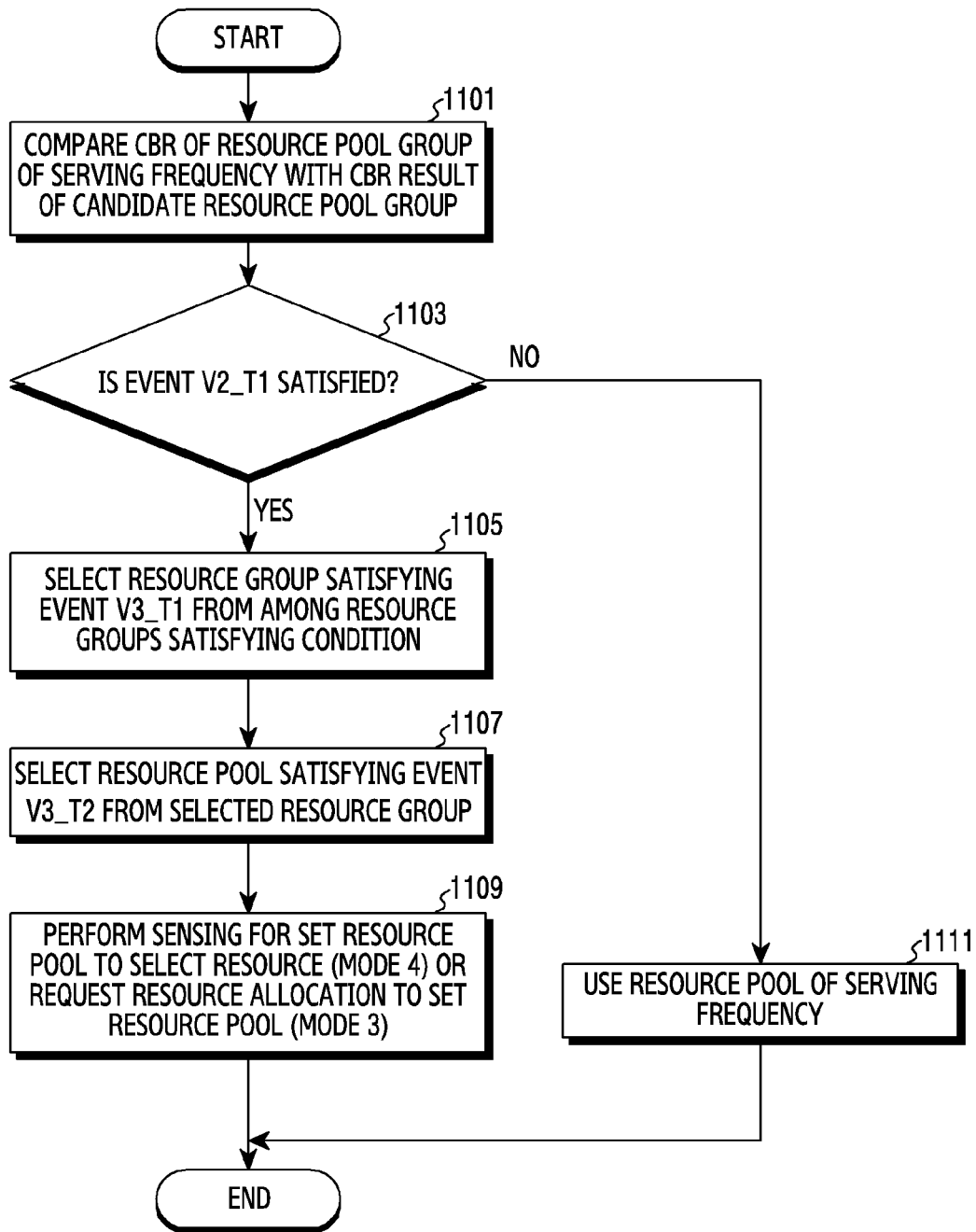
FIG. 11 illustrates a process in which a terminal uses Event V2_T1 for a CBR according to various embodiments of the present disclosure.

FIG. 11 illustrates a process in which a terminal uses Event V2_T1 in scenario 3 in FIG. 7 according to various embodiments of the present disclosure. In the following description, the candidate resource pool means a resource pool having a frequency different from the serving frequency. The serving frequency may be a camped frequency, or may correspond to the frequency of a previously used resource pool. In addition, the resource pool group refers to a set of resources constituting one component carrier (CC) when a plurality of resource pools are allocated to one component carrier in scenario 3 in FIG. 7.

Referring to FIG. 11, in step 1101, the terminal compares the CBR of a currently used resource pool group with the CBR result of a candidate resource pool group. The CBR measurement result for the resource pool (poolIdentity-r14) may be reflected as cbr-PSSCH-r14 and cbr-PSCCH-r14 in the RRC. Referring to Table 15 below, values of cbr-PSSCH-r14 and cbr-PSCCH-r14 are integers from 0 to 100.

TABLE 15

| | | |
|---|---|---|
| cbr-PSSCH-r14 | SL-CBR-r14, | |
| cbr-PSCCH-r14 | SL-CBR-r14 | OPTIONAL |
| SL-CBR-r14 ::= | INTEGER(0..100) | |

In step 1103, the terminal identifies whether or not an Event V2_T1 condition is satisfied for each resource pool group. Event V2_T1 may be defined as one of (1) the CBR difference between a serving frequency resource and a candidate resource pool group, (2) a CBR value of a candidate resource pool group, (3) the CBR difference between a serving frequency resource and a candidate resource pool group and a CBR value of a candidate resource pool group, and (4) an event having the lowest CBR value of a serving frequency resource.

In an embodiment, the CBR value of the candidate resource pool group may be an average CBR value of the resource pools belonging to the corresponding group. In another embodiment, the CBR value of the candidate resource pool group may be the lowest CBR value, among the resource pools belonging to the corresponding group.

In the case where the CBR result of the serving frequency resource is higher than the CBR result of the candidate resource pool group by CBR_Threshold_A or more, for example, if the CBR value of the candidate resource pool group is the average CBR value or the lowest CBR value, the candidate resource pool is more likely to be included in the transmission resource candidates. The following is a condition in which the candidate resource pool is included in the transmission resource candidates.

CBR_servingPool−
 CBR_candidatedPool>CBR_Threshold_A

In the case where the CBR result of the candidate resource pool group is smaller than CBR_Threshold_B, for example, if the CBR value of the candidate resource pool group is the average CBR value or the lowest CBR value, the candidate resource pool is more likely to be included in the transmission resource candidates. The following is a condition in which the candidate resource pool is included in the transmission resource candidates.

CBR_candidatedPool<CBR_Threshold_B

If the CBR result of the serving frequency resource is higher than the CBR result of the candidate resource pool by CBR_Threshold_A or more, and if the CBR result of the candidate resource pool is smaller than CBR_Threshold_B, the candidate resource pool is more likely to be included in the transmission resource candidates. The following is a condition in which the candidate resource pool is included in the transmission resource candidates.

CBR_servingPool−
 CBR_candidatedPool>CBR_Threshold_A and

CBR_candidatedPool<CBR_Threshold_B

If the serving frequency resource has the lowest CBR value, the serving frequency resource is selected. Otherwise, resource is selected from the candidate resource pool.

Time-to-trigger (TTT) may be operated for Event V2_T1. If Event V2_T1 is satisfied during the TTT, the candidate resource pool group is included in the transmission resource candidates. Otherwise, it is not included in the transmission resource candidates. The TTT may be used for the purpose of preventing frequent frequency switching of the terminal and frequent resource allocation requests/resource allocation signaling between the terminal and the base station in mode 3.

Example 1 of RRC ASN.1 for Event V2_T1 is shown in Table 16 below. For example, it may be set in a dedicated RRC message or system information.

TABLE 16

```
- TxCarrierSelectionConfig_V2X ::=           SEQUENCE {
- triggerType                    CHOICE {
-   event                              SEQUENCE {
-     eventId                              CHOICE {
-       eventV2_T1                           SEQUENCE {
-         CBR_Threshold_A-r15              SL-CBR-r14 [Optional]
-         CBR_Threshold_B-r15              SL-CBR-r14 [Optional]
-         CBR_Threshold_B_avg-r15          SL-CBR-r14 [Optional]
-         CBR_Threshold_B_min-r15          SL-CBR-r14 [Optional]
-       },
-     timeToTrigger           TimeToTrigger         [Optional]
-   },
- }
```

In step 1105, the terminal may use an Event V3_T1 condition in order to select one resource pool group from the candidate resource pool groups satisfying the Event V2_T1 condition in step 1103. Event V3_T1 may be defined as one of the following or a combination thereof. According to an embodiment, the terminal may select a resource pool group having the lowest CBR from among the candidate resource pool groups. According to another embodiment, the terminal may select a resource pool group having the lowest average CBR value from among the candidate resource pool groups. According to another embodiment, the terminal may randomly select a resource pool from among the candidate resource pool group.

In step 1107, the terminal may use the following Event V3_T2 condition to select one resource pool from the selected resource group. According to an embodiment, the terminal may select a resource pool having the lowest CBR from the selected resource pool group. According to another embodiment, the terminal may randomly select a resource pool from the selected resource pool group.

In step 1109, the terminal senses a resource available for V2X communication using the selected resource pool of the selected candidate frequency (operation in mode 4), or the terminal transmits, to the base station, a request for resource allocation to the selected resource pool of the selected candidate frequency (operation in mode 3).

In mode 3, the operation in which the terminal makes a request to the base station for resource allocation to the selected resource pool of the selected candidate frequency is performed in the same manner as the embodiment of FIG. 9.

In mode 3 and mode 4, a transmission (TX) carrier timer may be set for the purpose of instructing the terminal to keep using the candidate frequency or the candidate resource pool for a predetermined period of time. The transmission carrier timer may minimize the probability of resource conflict in a corresponding carrier due to frequent changes in the transmission carrier. When the terminal selects to use the candidate frequency and a resource pool of the candidate frequency, instead of the serving frequency and a resource pool of the serving frequency, the transmission carrier timer may be specified such that the terminal can use the selected candidate frequency for a predetermined period of time, and the predetermined period of time may be set as a value of the transmission carrier timer. In another embodiment, the transmission carrier timer may be set to specify that the terminal uses the selected candidate frequency and the selected resource pool of the corresponding frequency for a predetermined period of time.

In step 1111, if the Event V2_T1 condition of step 1103 is not satisfied, the terminal may use the resource on the basis of mode 3 or mode 4 with respect to the resource pool of the serving frequency while maintaining the selection of the resource pool of the serving frequency.

Figure 12:
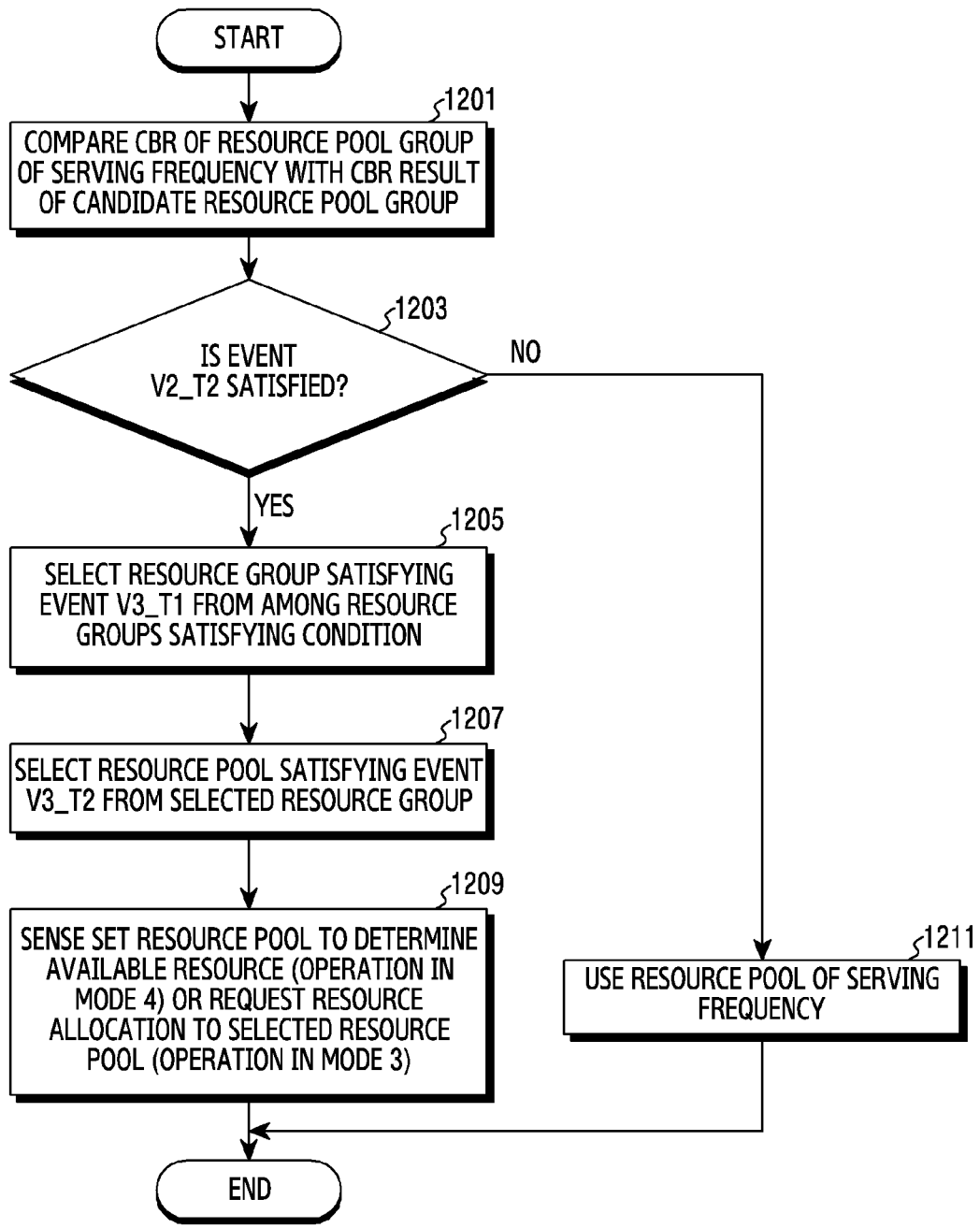
FIG. 12 illustrates a process in which a terminal uses Event V2_T2 for a CBR according to various embodiments of the present disclosure.

FIG. 12 illustrates a process in which the terminal uses Event V2_T2 for a CBR in scenario 3 in FIG. 7 according to various embodiments of the present disclosure. In the following description, the candidate resource pool means a resource pool having a frequency different from the serving frequency. The serving frequency may be a camped frequency, or may correspond to the frequency of a previously used resource pool. In addition, the resource pool group refers to a set of resources constituting one component carrier when a plurality of resource pools are allocated to one component carrier in scenario 3 in FIG. 7.

Referring to FIG. 12, in step 1201, the terminal compares the CBR of a currently used resource pool group with the CBR result of a candidate resource pool group. The CBR measurement result for the resource pool (poolIdentity-r14) may be reflected as cbr-PSSCH-r14 and cbr-PSCCH-r14 in the RRC. Referring to Table 17 below, values of cbr-PSSCH-r14 and cbr-PSCCH-r14 are integers from 0 to 100.

TABLE 17

| cbr-PSSCH-r14 | SL-CBR-r14, | |
|---|---|---|
| cbr-PSCCH-r14 | SL-CBR-r14 | OPTIONAL |
| ...... | | |
| SL-CBR-r14 ::= | | INTEGER(0..100) |

In step 1203, the terminal identifies whether or not an Event V2_T2 condition is satisfied. Event V2_T2 may be defined as one of (1) the case where the CBR value of the serving frequency is higher than CBR_Threshold_A (for example, when the probability of occurrence of resource conflict or resource shortage is high) and (2) the case where the CBR value of the candidate resource pool group is lower than CBR_Threshold_B (for example, the probability of occurrence of resource conflict or resource shortage is low).

The following is a condition in which the candidate resource pool group is included in the transmission resource candidates.

CBR_servingPool>CBR_Threshold_A and
CBR_neighboring<CBR_Threshold_B

The CBR value of the candidate resource pool group (CBR_neighboring) may be an average CBR value or the lowest CBR value.

Time-to-trigger (TTT) may be operated for Event V2_T2. If Event V2_T2 is satisfied during the TTT, the candidate resource pool group is included in the transmission resource candidates. Otherwise, it is not included in the transmission resource candidates. The TTT may be used for the purpose of preventing frequent frequency switching of the terminal and frequent resource allocation requests/resource allocation signaling between the terminal and the base station in mode 3.

An example of RRC ASN.1 for Event V2_T2 is shown in Table 18 below. For example, it may be set in a dedicated RRC message or system information.

TABLE 18

```
- TxCarrierSelectionConfig_V2X ::=        SEQUENCE {
- triggerType                   CHOICE {
-     event                         SEQUENCE {
-         eventId                       CHOICE {
-             eventV2_T2                    SEQUENCE {
-                 CBR_Threshold_A-r15           SL-CBR-r14 [Optional]
-                 CBR_Threshold_B-r15           SL-CBR-r14 [Optional]
-                 CBR_Threshold_B_avg-r15       SL-CBR-r14 [Optional]
-                 CBR_Threshold_B_min-r15       SL-CBR-r14 [Optional]
-         },
-         timeToTrigger            TimeToTrigger              [Optional]
-     },
- }
```

In step 1205, the terminal may use an Event V3_T1 condition in order to select one resource pool group from the candidate resource pool groups satisfying the Event V2_T2 condition in step 1203. Event V3_T1 may be defined as one of the following or a combination thereof. According to an embodiment, the terminal may select a resource pool group having the lowest CBR from among the candidate resource pool groups. According to another embodiment, the terminal may select a resource pool group having the lowest average CBR value from among the candidate resource pool groups. According to another embodiment, the terminal may randomly select a resource pool from among the candidate resource pool groups.

In step 1207, the terminal may use the following Event V3_T2 condition to select one resource pool from the selected resource group. According to an embodiment, the terminal may select a resource pool having the lowest CBR from the selected resource pool group. According to another embodiment, the terminal may randomly select a resource pool from the selected resource pool group.

In step 1209, the terminal senses a resource available for V2X communication using the selected resource pool of the selected candidate frequency (operation in mode 4), or the terminal transmits, to the base station, a request for resource allocation to the selected resource pool of the selected candidate frequency (operation in mode 3).

In mode 3, the operation in which the terminal makes a request to the base station for resource allocation to the selected resource pool of the selected candidate frequency is performed in the same manner as the embodiment in FIG. 9.

In mode 3 and mode 4, a transmission (TX) carrier timer may be set for the purpose of instructing the terminal to keep using the candidate frequency or the candidate resource pool for a predetermined period of time. The transmission carrier timer may minimize the probability of resource conflict in a corresponding carrier due to frequent changes in the transmission carrier. When the terminal selects to use the candidate frequency and a resource pool of the candidate frequency, instead of the serving frequency and a resource pool of the serving frequency, the transmission carrier timer may be specified such that the terminal can use the selected candidate frequency for a predetermined period of time, and the predetermined period of time may be set as a value of the transmission carrier timer. In another embodiment, the transmission carrier timer may be set to specify that the terminal uses the selected candidate frequency and the selected resource pool of the corresponding frequency for a predetermined period of time.

In step 1211, if the Event V2_T2 condition of step 1203 is not satisfied, the terminal may use the resource on the basis of mode 3 or mode 4 with respect to the resource pool of the serving frequency while maintaining the selection of the resource pool of the serving frequency.

Figure 13:
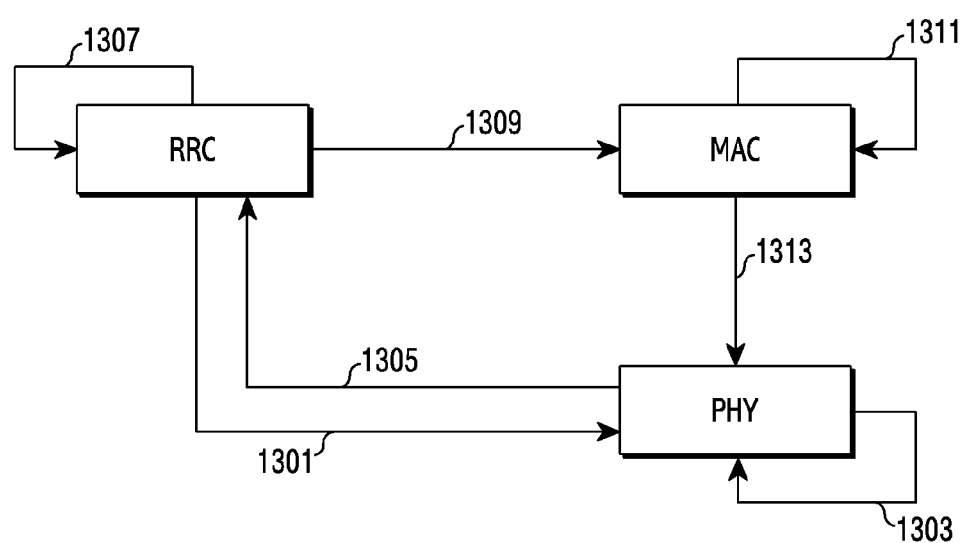
FIG. 13 illustrates a process of selecting a resource pool on the basis of mode 4 in sublayers inside a terminal according to various embodiments of the present disclosure.

FIG. 13 illustrates a process of selecting a resource pool on the basis of mode 4 in sublayers inside a terminal according to various embodiments of the present disclosure. The radio resource control (RRC), medium access control (MAC), and physical (PHY) sublayers inside the terminal process the following information and operations.

Referring to FIG. 13, in step 1301, the RRC layer instructs the PHY layer to measure a CBR of a resource.

In step 1303, the PHY layer measures the CBR of the resource pool.

In step 1305, the PHY layer transmits a CBR result of the resource pool to the RRC layer.

In step 1307, the RRC layer determines whether or not an event is satisfied using the result of step 1305 and determines a carrier and a resource pool of the corresponding carrier. The event may correspond to at least one of Event V1_T1, Event V1_T2, Event V2_T1, Event V2_T2, Event V3_T1, and Event V3_T2 defined in FIGS. 8, 9, 10, 11, and 12. If the event for selecting the candidate resource pool is satisfied, a resource pool is determined from among the candidate resource pools.

In step 1309, the RRC layer transmits, to the MAC layer, information on the carrier and the resource pool of the corresponding carrier determined in step 1307.

In step 1311, the MAC layer senses a resource using information on the carrier and the resource pool of the corresponding carrier, which is received from the RRC layer, thereby selecting an actual transmission resource.

In step 1313, the MAC layer transmits, to the PHY layer, data to be transmitted using the selected resource.

Figure 14:
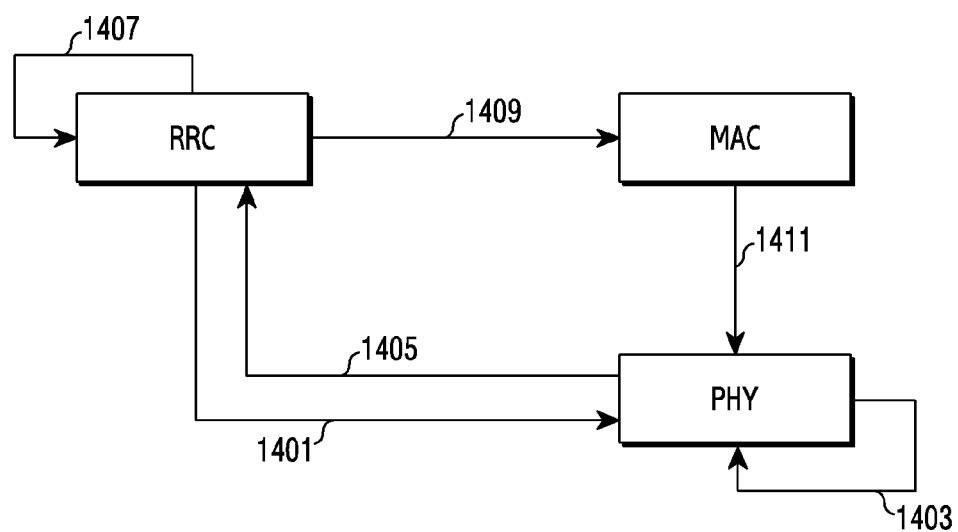
FIG. 14 illustrates a process of selecting a resource pool on the basis of mode 3 in sublayers inside a terminal according to various embodiments of the present disclosure.

FIG. 14 illustrates a process of selecting a resource pool on the basis of mode 3 in sublayers inside a terminal according to various embodiments of the present disclosure. The radio resource control (RRC), medium access control (MAC), and physical (PHY) sublayers inside the terminal process the following information and operations.

Referring to FIG. 14, in step 1401, the RRC layer instructs the PHY layer to measure a CBR of a resource.

In step 1403, the PHY layer measures a CBR of the resource pool.

In step 1405, the PHY layer transmits a CBR result for the resource pool to the RRC layer.

In step 1407, the RRC layer determines whether or not an event is satisfied using the result of step 1405 and determines a carrier and a resource pool of the corresponding carrier. The event may correspond to at least one of Event V1_T1, Event V1_T2, Event V2_T1, Event V2_T2, Event V3_T1, and Event V3_T2 defined in FIGS. 8, 9, 10, 11, and 12. If the event for selecting the candidate resource pool is satisfied, a resource pool is determined from among the candidate resource pools.

In step 1409, the RRC layer transmits, to the MAC layer, information on the carrier and the resource pool of the corresponding carrier determined in step 1407.

In step 1411, the MAC layer transmits, to the base station {e.g., an evolved-universal terrestrial radio access network (E-UTRAN)}, resource allocation request information on the basis of the information on the carrier and the resource pool of the corresponding carrier, which is received from the RRC layer. In this case, the actual resource allocation request information and the resource allocation information are transmitted/received through the PHY layer. The MAC layer transmits, to the PHY layer, data to be transmitted using the allocated resource.

Figure 15:
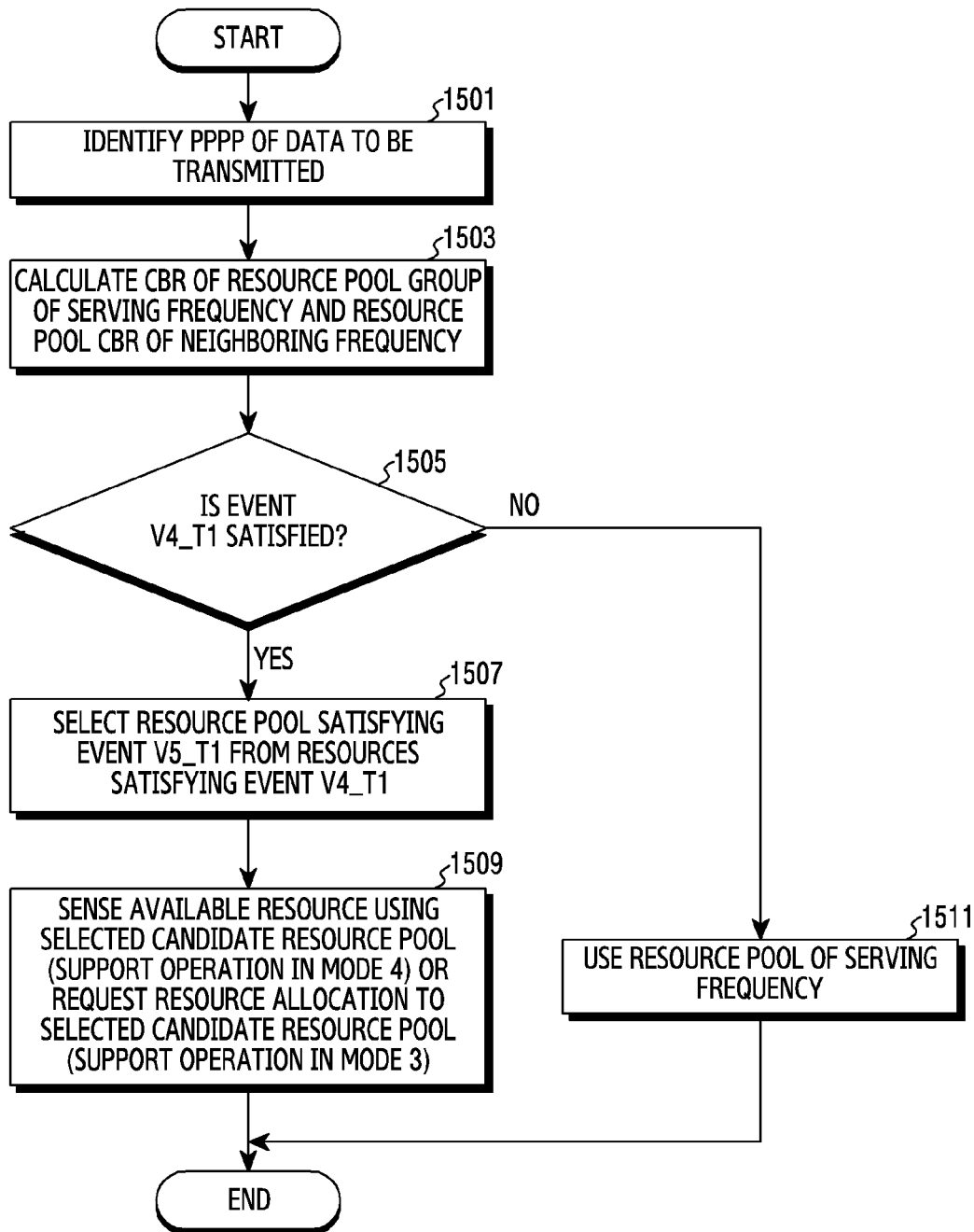
FIG. 15 illustrates a process in which a terminal uses Event V4_T1 when selecting a transmission carrier in consideration of a CBR and prose per packet priority (PPPP) in respective scenarios 1 and 2 in FIGS. 5 and 6 according to various embodiments of the present disclosure.

FIG. 15 illustrates a process of using Event V4_T1 when a terminal selects a transmission carrier in consideration of a CBR and prose per packet priority (PPPP) in scenarios 1 and 2 of FIGS. 5 and 6 according to various embodiments of the present disclosure. In the following description, the candidate resource pool means a resource pool having a frequency different from a serving frequency. The serving frequency means a camped frequency or a frequency of a previously used resource pool.

Referring to FIG. 15, in step 1501, the terminal identifies PPPP of data to be transmitted. The PPPP is indexed by values of 1 to 8, and the values are determined at an upper layer, such as, an application layer, a facility layer, or a PC5 signaling protocol, and are then transmitted to a lower layer such as an RRC, packet data convergence protocol (PDCP), RLC, MAC, or PHY layer.

In step 1503, the terminal may calculate CBR values of the currently used resource pool and the candidate resource pool. That is, the terminal may calculate a CBR value of resource pool of the serving frequency and a CBR value of resource pool of the neighboring frequency. Referring to Table 19 below, the cbr-PSSCH-r14 value and the cbr-PSCCH-r14 value are integers from 0 to 100.

TABLE 19

| cbr-PSSCH-r14 | SL-CBR-r14, | |
|---|---|---|
| cbr-PSCCH-r14 | SL-CBR-r14 | OPTIONAL |
| ...... | | |
| SL-CBR-r14 ::= | | INTEGER(0..100) |

Referring to Table 19, the CBR result according to poolIdentity-r14 in the RRC layer may be identified through cbr-PSSCH-r14.

In step 1505, the terminal identifies whether or not an Event V4_T1 condition is satisfied.

In an embodiment, CBR_Threshold PPPP may be set for each PPPP.

For example, a CBR threshold value of PPPP1 is set to CBR_Threshold_A PPPP1. In addition, a CBR threshold value of PPPP_X is set to CBR_Threshold_A PPPPx. In the case of PPPP1 of data to be transmitted, the terminal may apply CBR_Threshold_A PPPP1 to the currently used resource pool and the candidate resource pool. In addition, in the case of PPPPx of data to be transmitted, the terminal may apply CBR_Threshold_A PPPPx to the currently used resource pool and the candidate resource pool.

As another example, the CBR threshold value of PPPP1 is set to CBR_Threshold PPPP1-A and CBR_Threshold PPPP1-B. In addition, the CBR threshold value of PPPP_X is set to CBR_Threshold_PPPPx-A and CBR_Threshold_PPPPx-B. In the case of PPPP1 of data to be transmitted, the terminal may apply CBR_Threshold PPPP1-A to the currently used resource pool, and may apply CBR_Threshold PPPP1-B to the candidate resource pool. In addition, in the case of PPPPx of data to be transmitted, the terminal may apply CBR_Threshold_PPPPx-A to the currently used resource pool, and may apply CBR_Threshold_PPPPx-B to the candidate resource pool.

The CBR_Threshold configuration per PPPP may be transmitted to the terminal by means of system information or an RRC dedicated message.

The CBR_Threshold value per PPPP may be set to a specific value or a range of the CBR value. An example of RRC ASN.1 in which a specific value is used as the CBR threshold value is shown in Table 20 below.

TABLE 20

```
- TxCarrierSelectionConfig_V2X  ::=        SEQUENCE {
- triggerType                              CHOICE {
-     event                                SEQUENCE {
-         eventId                          CHOICE {
-             eventV4_T1-r15                            SEQUENCE {
-                 CBR_Threshold_PPPP1-r15              SL-CBR-r14    [Optional]
-                 CBR_Threshold_PPPP2-r15              SL-CBR-r14    [Optional]
-                 ......
-                 CBR_Threshold_PPPPx-r15              SL-CBR-r14    [Optional]
-             },
-             timeToTrigger                    TimeToTrigger     [Optional]
-         },
- }
```

An example of RRC ASN.1 in which a range of the CBR value is used as the CBR threshold value is shown in Table 21 below.

TABLE 21

```
- TxCarrierSelectionConfig_V2X ::=            SEQUENCE {
- triggerType                                  CHOICE {
-     event                                    SEQUENCE {
-         eventId                              CHOICE {
-             eventV4_T1-r15                                      SEQUENCE {
-                 CBR_Threshold_PPPP1-r15                         cbr-RangeList [Optional]
-                 CBR_Threshold_PPPP2-r15                         cbr-RangeList [Optional]
-                 ......
-                 CBR_Threshold_PPPPx-r15                         cbr-RangeList [Optional]
-         },
-         timeToTrigger                        TimeToTrigger    [Optional]
-     },
- }
- cbr-RangeList :: = SEQUENCE (SIZE (1..maxSL-V2X-CBRrange-r15)) OF SL-CBR-r14
- }
maxSL-V2X-CBRrange-r15     INTEGER ::= 2    -- Maximum number of CBR range
                                               for Tx Carrier selection
```

Referring to Table 21, cbr-RangeList may be configured as a minimum value and a maximum value of the corresponding CBR range.

Event V4_T1 according to an embodiment of the present disclosure may be defined as one of (1) the difference between the CBR value of a serving frequency resource and the CBR value of a candidate resource pool, (2) the difference between the CBR value of a serving frequency resource and the CBR value of a candidate resource pool, and the CBR value of the candidate resource pool, (3) the CBR value of a serving frequency resource and the CBR value of a candidate resource pool, and (4) an event in which the serving frequency resource has the lowest CBR result value.

If the CBR result of the serving frequency resource for the corresponding PPPPn is greater than the CBR result of the candidate resource pool by more than CBR_Threshold_PPPPn, the candidate resource pool is more likely to be included in the transmission resource candidates. This corresponds to the case where, for example, the probability of occurrence of resource conflict or resource shortage is high if the serving frequency resource is used to transmit a packet of the corresponding PPPP.

If the CBR result of the serving frequency resource for the corresponding PPPPn is greater than the CBR result of the candidate resource pool by more than CBR_Threshold_PPPPn, and if the CBR result of the candidate resource pool for the corresponding PPPPn is smaller than CBR_Threshold_PPPPn B, the candidate resource pool is more likely to be included in the transmission resource candidates. This corresponds to the case where, for example, the probability of occurrence of resource conflict or resource shortage is high if the serving frequency resource is used to transmit a packet of the corresponding PPPP.

If the CBR result of the serving frequency resource for the corresponding PPPPn is greater than CBR_Threshold_PPPPn A, and if the CBR result of the candidate resource pool is smaller than CBR_Threshold_PPPPn B, the candidate resource pool is more likely to be included in the transmission resource candidates. This corresponds to the case where, for example, the probability of occurrence of resource conflict or resource shortage is high if the serving frequency resource is used to transmit a packet of the corresponding PPPP. The value of CBR_Threshold_PPPPn A and the value of CBR_Threshold_PPPPn B may be the same or different.

In the case where the CBR threshold value for the corresponding PPPPn is set as a range, if the CBR result of the serving frequency resource is out of the range corresponding to CBR_Threshold_PPPPn, compared to the CBR result of the candidate resource pool, the candidate resource pool is more likely to be included in the transmission resource candidates.

In the case where the CBR threshold value for the corresponding PPPPn is set as a range, if the CBR result of the serving frequency resource is out of the range corresponding to CBR_Threshold_PPPPn, compared to the CBR result of the candidate resource pool, and if the CBR result of the candidate resource pool for the corresponding PPPPn belongs to the range of CBR_Threshold_PPPPn B, the candidate resource pool is more likely to be included in the transmission resource candidates. This corresponds to the case where, for example, the probability of occurrence of resource conflict or resource shortage is high if the serving frequency resource is used to transmit a packet of the corresponding PPPP.

In the case where the CBR threshold value for the corresponding PPPPn is set as a range, if the CBR result of the serving frequency resource is out of the rage of CBR_Threshold_PPPPn A, and if the CBR result of the candidate resource pool belongs to the range of CBR_Threshold_PPPPn B, the candidate resource pool is more likely to be included in the transmission resource candidates. This corresponds to the case where, for example, the probability of occurrence of resource conflict or resource shortage is high if the serving frequency resource is used to transmit a packet of the corresponding PPPP. The value of CBR_Threshold_PPPPn A and the value of CBR_Threshold_PPPPn B may be the same or different.

In the case where the CBR threshold value for the corresponding PPPPn is set as a range, if the serving frequency resource has the lowest CBR result value, the serving frequency resource is selected. Otherwise, the candidate resource pool may be selected.

The utilization of Event V4_T1 using a specific CBR threshold value or a range of the CBR threshold value may be implemented as various embodiments, in addition to the above embodiment.

TTT may be operated for Event V4_T1. If Event V4_T1 is satisfied during the TTT, the candidate resource pool is included in the transmission resource candidates. Otherwise, it is not included in the transmission resource candidates. The TTT may be used for the purpose of preventing frequent frequency switching of the terminal and frequent resource allocation requests/resource allocation signaling between the terminal and the base station in mode 3.

In step 1507, the terminal may select a resource pool satisfying the following Event V5_T1 condition from among the selected candidate resource pools. According to an embodiment, the terminal may select a resource pool having the lowest CBR value from among the candidate resource pools. According to another embodiment, the terminal may randomly select a resource pool from among the candidate resource pools.

In step 1509, the terminal may sense and select an available resource from the selected resource pool (operation in mode 4), or the terminal may transmit, to the base station, a request for resource allocation to the selected candidate resource pool of the selected candidate frequency (operation in mode 3).

In mode 3, the operation in which the terminal makes a request to the base station for resource allocation to the selected resource pool of the selected candidate frequency is performed in the same manner as the embodiment in FIG. 9.

In mode 3 or mode 4, a transmission (TX) carrier timer may be set for the purpose of instructing the terminal to keep using the candidate frequency or the candidate resource pool for a predetermined period of time. The transmission carrier timer may minimize the probability of resource conflict in a corresponding carrier due to frequent changes in the transmission carrier. When the terminal selects to use the candidate frequency and a resource pool of the candidate frequency, instead of the serving frequency and a resource pool of the serving frequency, the transmission carrier timer may be specified such that the terminal can use the selected candidate frequency for a predetermined period of time, and the predetermined period of time may be set as a value of the transmission carrier timer. In another embodiment, the transmission carrier timer may be set to specify that the terminal uses the selected candidate frequency and the selected resource pool of the corresponding frequency for a predetermined period of time.

In step 1511, if the Event V4_T1 condition is not satisfied in step 1503, the terminal may use the resource on the basis of mode 3 or mode 4 with respect to the resource pool of the serving frequency while maintaining the selection of the resource pool of the serving frequency.

Figure 16:
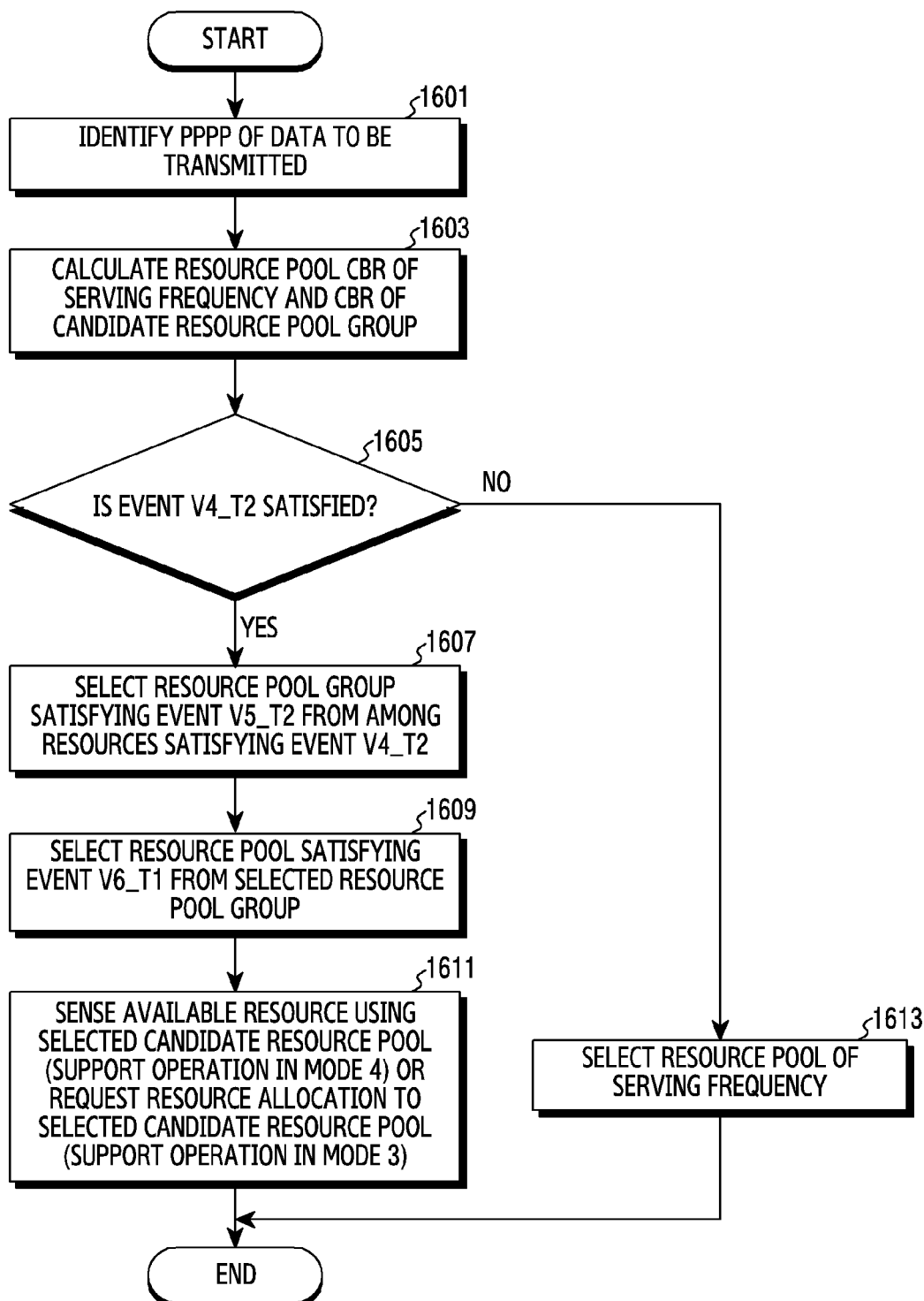
FIG. 16 illustrates a process in which a terminal uses Event V4_T2 when selecting a transmission carrier in consideration of a CBR and PPPP in scenario 3 in FIG. 7 according to various embodiments of the present disclosure.

FIG. 16 illustrates a process of using Event V4_T2 when a terminal selects a transmission carrier in consideration of a CBR and PPPP in scenario 3 of FIG. 7 according to various embodiments of the present disclosure. In the following description, the candidate resource pool means a resource pool having a frequency different from a serving frequency. The serving frequency means a camped frequency or a frequency of a previously used resource pool. In addition, the resource pool group refers to a set of resources constituting one component carrier in the case where a plurality of resource pools are allocated to one component carrier in scenario 3 in FIG. 7.

Referring to FIG. 16, in step 1601, the terminal identifies PPPP of data to be transmitted. The PPPP is indexed by values of 1 to 8, and the values are determined at an upper layer, such as, an application layer, a facility layer, or a PC5 signaling protocol, and are then transmitted to a lower layer such as an RRC, PDCP, RLC, MAC, or PHY layer.

In step 1603, the terminal may calculate CBR values of the currently used resource pool and the candidate resource pool group. The CBR measurement results for the resource pool (poolIdentity-r14) in the RRC may be reflected by cbr-PSSCH-r14 and cbr-PSCCH-r14. Referring to Table 22 below, the cbr-PSSCH-r14 value and the cbr-PSCCH-r14 value are integers from 0 to 100.

TABLE 22

| cbr-PSSCH-r14 | SL-CBR-r14, | |
|---|---|---|
| cbr-PSCCH-r14 | SL-CBR-r14 | OPTIONAL |
| ...... | | |
| SL-CBR-r14 ::= | INTEGER(0..100) | |

Referring to Table 22, in an embodiment, the CBR value of the candidate resource pool group may be an average CBR value of the resource pools belonging to the corresponding group. In another embodiment, the CBR value of the candidate resource pool group may be the lowest CBR value among the resource pools belonging to the corresponding group.

In step 1605, the terminal identifies whether or not an Event V4_T2 condition is satisfied.

In an embodiment, CBR_Threshold PPPP may be set for each PPPP.

For example, a CBR threshold value of PPPP1 is set to CBR_Threshold_A PPPP1. In addition, a CBR threshold value of PPPP_X is set to CBR_Threshold_A PPPPx. In the case of PPPP1 of data to be transmitted, the terminal may apply CBR_Threshold_A PPPP1 to the currently used resource pool and the candidate resource pool group. In addition, in the case of PPPPx of data to be transmitted, the terminal may apply CBR_Threshold_A PPPPx to the currently used resource pool and the candidate resource pool group.

As another example, the CBR threshold value of PPPP1 is set to CBR_Threshold PPPP1-A and CBR_Threshold PPPP1-B. In addition, the CBR threshold value of PPPP_X is set to CBR_Threshold_PPPPx-A and CBR_Threshold_PPPPx-B. In the case of PPPP1 of data to be transmitted, the terminal may apply CBR_Threshold PPPP1-A to the currently used resource pool, and may apply CBR_Threshold PPPP1-B to the candidate resource pool group. In addition, in the case of PPPPx of data to be transmitted, the terminal may apply CBR_Threshold_PPPPx-A to the currently used resource pool, and may apply CBR_Threshold_PPPPx-B to the candidate resource pool group.

The CBR_Threshold value per PPPP may be set to a specific value or a range of the CBR value. An example of RRC ASN.1 in which a specific value is used as the CBR threshold value is shown in Table 23 below.

TABLE 23

| - TxCarrierSelectionConfig_V2X ::= | SEQUENCE { | |
|---|---|---|
| - triggerType | CHOICE { | |
| - event | SEQUENCE { | |
| - eventId | CHOICE { | |
| eventV4_T1-r15 | SEQUENCE { | |
| CBR_Threshold_PPPP1-r15 | SL-CBR-r14 | [Optional] |
| CBR_Threshold_PPPP2-r15 | SL-CBR-r14 | [Optional] |
| - | | |
| ...... | | |
| CBR_Threshold_PPPPx-r15 | SL-CBR-r14 | [Optional] |

TABLE 23-continued

```
-        },
-        timeToTrigger                    TimeToTrigger              [Optional]
-    },
- }
```

An example of RRC ASN.1 in which a range of the CBR value is used as the CBR threshold value is shown in Table 24 below.

TABLE 24

```
- TxCarrierSelectionConfig_V2X ::=         SEQUENCE {
- triggerType                              CHOICE {
-    event                                 SEQUENCE {
-       eventId                            CHOICE {
-          eventV4_T1-r15                  SEQUENCE {
-             CBR_Threshold_PPPP1-r15      cbr-RangeList [Optional]
-             CBR_Threshold_PPPP2-r15      cbr-RangeList [Optional]
-             ......
-             CBR_Threshold_PPPPx-r15      cbr-RangeList [Optional]
-          },
-       timeToTrigger                      TimeToTrigger  [Optional]
-    },
- }
- cbr-RangeList :: = SEQUENCE (SIZE (1..maxSL-V2X-CBRrange-r15)) OF SL-CBR-r14
- }
maxSL-V2X-CBRrange-r15    INTEGER ::= 2   -- Maximum number of CBR range
                                             for Tx Carrier selection
```

Referring to Table 24, cbr-RangeList may be configured as a minimum value and a maximum value of the corresponding CBR range.

Event V4_T2 according to an embodiment of the present disclosure may be defined as any one of (1) the difference between a CBR value of the serving frequency resource and a CBR value of the candidate resource pool group, (2) a CBR value of the candidate resource pool group, (3) the difference in the CBR between the serving frequency resource and the candidate resource pool group, and a CBR value of the candidate resource pool group, (4) a CBR value of the serving frequency resource and a CBR value of the candidate resource pool, and (5) an event in which the serving frequency resource has the lowest CBR value.

If the CBR result of the serving frequency resource for the corresponding PPPPn is greater than the CBR result of the candidate resource pool group by more than CBR_Threshold_PPPPn, the candidate resource pool group is more likely to be included in the transmission resource candidates. This corresponds to the case where, for example, the probability of occurrence of resource conflict or resource shortage is high if the serving frequency resource is used to transmit a packet of the corresponding PPPP.

If the CBR result of the serving frequency resource for the corresponding PPPPn is greater than the CBR result of the candidate resource pool group by more than CBR_Threshold_PPPPn, and if the CBR result of the candidate resource pool group for the corresponding PPPPn is smaller than CBR_Threshold_PPPPn B, the candidate resource pool group is more likely to be included in the transmission resource candidates. This corresponds to the case where, for example, the probability of occurrence of resource conflict or resource shortage is high if the serving frequency resource is used to transmit a packet of the corresponding PPPP.

If the CBR result of the serving frequency resource for the corresponding PPPPn is greater than CBR_Threshold_PPPPn A, and if the CBR result of the candidate resource pool group is smaller than CBR_Threshold_PPPPn B, the candidate resource pool group is more likely to be included in the transmission resource candidates. This corresponds to the case where, for example, the probability of occurrence of resource conflict or resource shortage is high if the serving frequency resource is used to transmit a packet of the corresponding PPPP. The value of CBR_Threshold_PPPPn A and the value of CBR_Threshold_PPPPn B may be the same or different.

In the case where the CBR threshold value for the corresponding PPPPn is set as a range, if the CBR result of the serving frequency resource is out of the range corresponding to CBR_Threshold_PPPPn, compared to the CBR result of the candidate resource pool group, the candidate resource pool is more likely to be included in the transmission resource candidates.

In the case where the CBR threshold value for the corresponding PPPPn is set as a range, if the CBR result of the serving frequency resource is out of the range corresponding to CBR_Threshold_PPPPn, compared to the CBR result of the candidate resource pool group, and if the CBR result of the candidate resource pool group for the corresponding PPPPn belongs to the range of CBR_Threshold_PPPPn B, the candidate resource pool group is more likely to be included in the transmission resource candidates. This corresponds to the case where, for example, the probability of occurrence of resource conflict or resource shortage is high if the serving frequency resource is used to transmit a packet of the corresponding PPPP.

In the case where the CBR threshold value for the corresponding PPPPn is set as a range, if the CBR result of the serving frequency resource is out of the range of CBR_Threshold_PPPPn A, and if the CBR result of the candidate resource pool group belongs to the range of CBR_Threshold_PPPPn B, the candidate resource pool group is more likely to be included in the transmission resource candidates. This corresponds to the case where, for example, the probability of occurrence of resource conflict or resource shortage is high if the serving frequency resource is used to transmit a packet of the corresponding PPPP. The value of CBR_Threshold_PPPPn A and the value of CBR_Threshold_PPPPn B may be the same or different.

The utilization of Event V4_T2 using a specific CBR threshold value or a range of the CBR threshold value may be implemented as various embodiments, in addition to the above embodiment.

TTT may be operated for Event V4_T2. If Event V4_T2 is satisfied during the TTT, the candidate resource pool is included in the transmission resource candidates. Otherwise, it is not included in the transmission resource candidates. The TTT may be used for the purpose of preventing frequent frequency switching of the terminal and frequent resource allocation requests/resource allocation signaling between the terminal and the base station in mode 3.

In step 1607, the terminal may use an Event V5_T2 condition to select one resource pool group from the resource pool group candidates satisfying the Event V4_T2 condition in step 1605. Event V5_T2 may be defined as one of the following or a combination thereof. According to an embodiment, the terminal may select a resource pool group having the lowest CBR from among the candidate resource pool groups. According to an embodiment, the terminal may select a resource pool group having the lowest average CBR from among the candidate resource pool groups. According to another embodiment, the terminal may randomly select a resource pool group from among the candidate resource pool groups.

In step 1609, the terminal may use an Event V6_T1 condition to select one resource pool from the selected resource pool group. According to an embodiment, the terminal may select a resource pool having the lowest CBR from the selected resource pool group. According to another embodiment, the terminal may randomly select a resource pool from the selected resource pool group.

In step 1611, the terminal may sense a resource available for V2X communication using the selected resource pool of the selected candidate frequency (operation in mode 4), or the terminal may transmit, to the base station, a request for resource allocation to the selected candidate resource pool of the selected candidate frequency (operation in mode 3).

In mode 3, the operation in which the terminal makes a request to the base station for resource allocation to the selected resource pool of the selected candidate frequency is performed in the same manner as the embodiment in FIG. 9.

In mode 3 or mode 4, a transmission (TX) carrier timer may be set for the purpose of instructing the terminal to keep using the candidate frequency or the candidate resource pool for a predetermined period of time. The transmission carrier timer may minimize the probability of resource conflict in a corresponding carrier due to frequent changes in the transmission carrier. When the terminal selects to use the candidate frequency and a resource pool of the candidate frequency, instead of the serving frequency and a resource pool of the serving frequency, the transmission carrier timer may be specified such that the terminal can use the selected candidate frequency for a predetermined period of time, and the predetermined period of time may be set as a value of the transmission carrier timer. In another embodiment, the transmission carrier timer may be set to specify that the terminal uses the selected candidate frequency and the selected resource pool of the corresponding frequency for a predetermined period of time.

In step 1613, if the Event V4_T2 condition is not satisfied in step 1605, the terminal may use the resource on the basis of mode 3 or mode 4 with respect to the resource pool of the serving frequency while maintaining the selection of the resource pool of the serving frequency.

Figure 17:
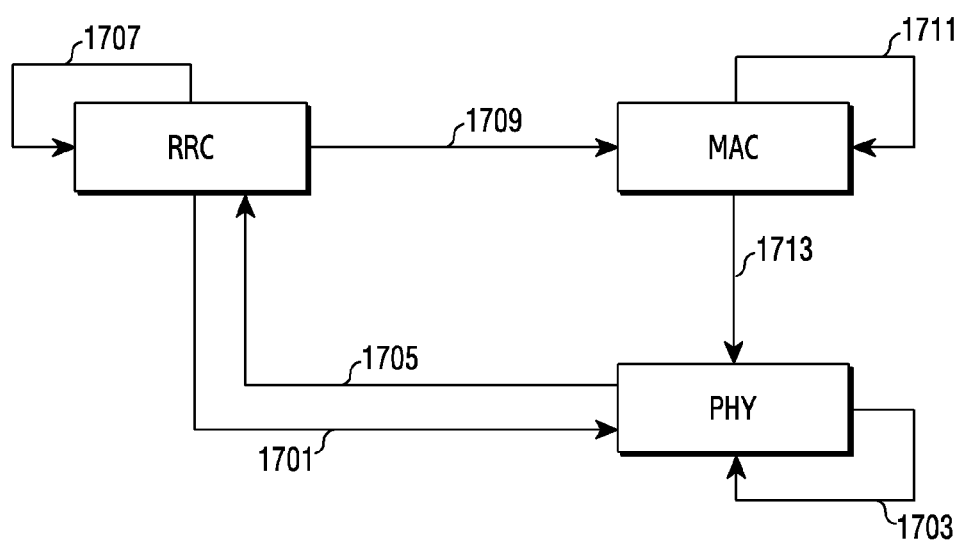
FIG. 17 illustrates a process of selecting a resource pool on the basis of mode 4 according to the embodiments in FIGS. 15 and 16 in sublayers inside a terminal according to various embodiments of the present disclosure.

FIG. 17 illustrates a process of selecting a resource pool on the basis of mode 4 according to the embodiments in FIGS. 15 and 16 in sublayers inside a terminal according to various embodiments of the present disclosure. The RRC, MAC, and PHY sublayers inside the terminal process the following information and operations.

Referring to FIG. 17, in step 1701, the RRC layer instructs the PHY layer to measure a CBR of a resource.

In step 1703, the PHY layer measures a CBR of the resource pool.

In step 1705, the PHY layer transmits a CBR result for the resource pool to the RRC layer.

In step 1707, the RRC layer determines whether or not an event is satisfied using the result of step 1705 and determines a carrier and a resource pool of the corresponding carrier. The event may correspond to at least one of Event V4_T1, Event V4_T2, Event V5_T1, Event V5_T2, Event V6_T1, and Event V6_T2 defined in FIGS. 15 and 16. If the event for selecting the candidate resource pool is satisfied, a resource pool is determined from among the candidate resource pools.

In step 1709, the RRC layer transmits, to the MAC layer, information on the carrier and the resource pool of the corresponding carrier determined in step 1707.

In step 1711, the MAC layer senses resources using the information on the carrier and the resource pool of the corresponding carrier, which is received from the RRC layer, and selects an actual transmission resource.

In step 1713, the MAC layer transfers data to be transmitted to the PHY layer using the selected resource.

Figure 18:
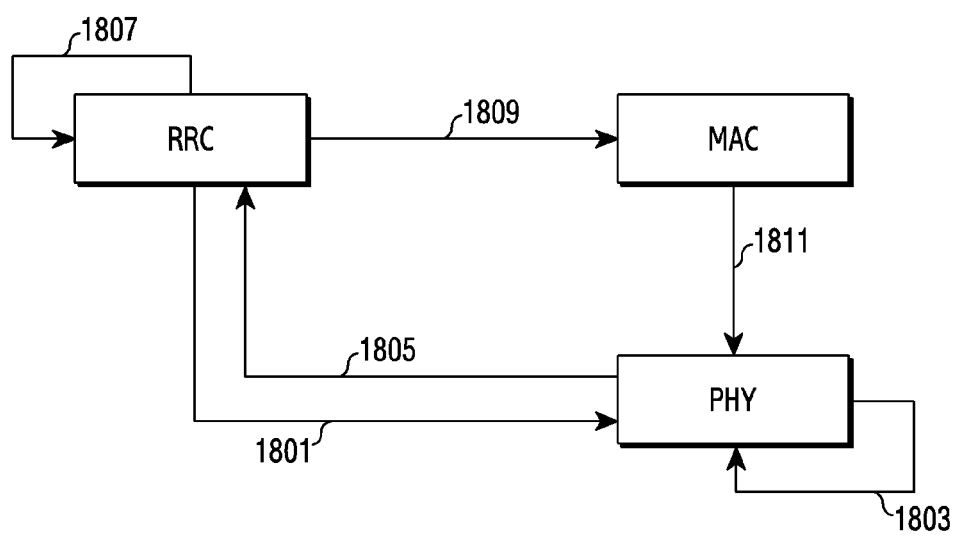
FIG. 18 illustrates a process of selecting a resource pool on the basis of mode 3 according to the embodiments in FIGS. 15 and 16 in sublayers inside a terminal according to various embodiments of the present disclosure.

FIG. 18 illustrates a process of selecting a resource pool on the basis of mode 3 according to the embodiments in FIGS. 15 and 16 in sublayers inside a terminal according to various embodiments of the present disclosure. The RRC, MAC, and PHY sublayers inside the terminal process the following information and operations.

Referring to FIG. 18, in step 1801, the RRC layer instructs the PHY layer to measure a CBR of a resource.

In step 1803, the PHY layer measures a CBR of the resource pool.

In step 1805, the PHY layer transmits a CBR result of the resource pool to the RRC layer.

In step 1807, the RRC layer determines whether or not an event is satisfied using the result of step 1805 and determines a carrier and a resource pool of the corresponding carrier. The event may correspond to at least one of Event V4_T1, Event V4_T2, Event V5_T1, Event V5_T2, Event V6_T1, and Event V6_T2 defined in FIGS. 15 and 16. If the event for selecting the candidate resource pool is satisfied, a resource pool is determined from among the candidate resource pools.

In step 1809, the RRC layer transmits, to the MAC layer, information on the carrier and the resource pool of the corresponding carrier determined in step 1807.

In step 1811, the MAC layer transmits, to the base station (e.g., the E-UTRAN), resource allocation request information on the basis of the information on the carrier and the resource pool of the corresponding carrier, which is received from the RRC layer. In this case, the actual resource allocation request information and resource allocation information are transmitted/received through the PHY layer. The MAC layer transmits data to be transmitted to the PHY layer using the allocated resource.

Figure 19:
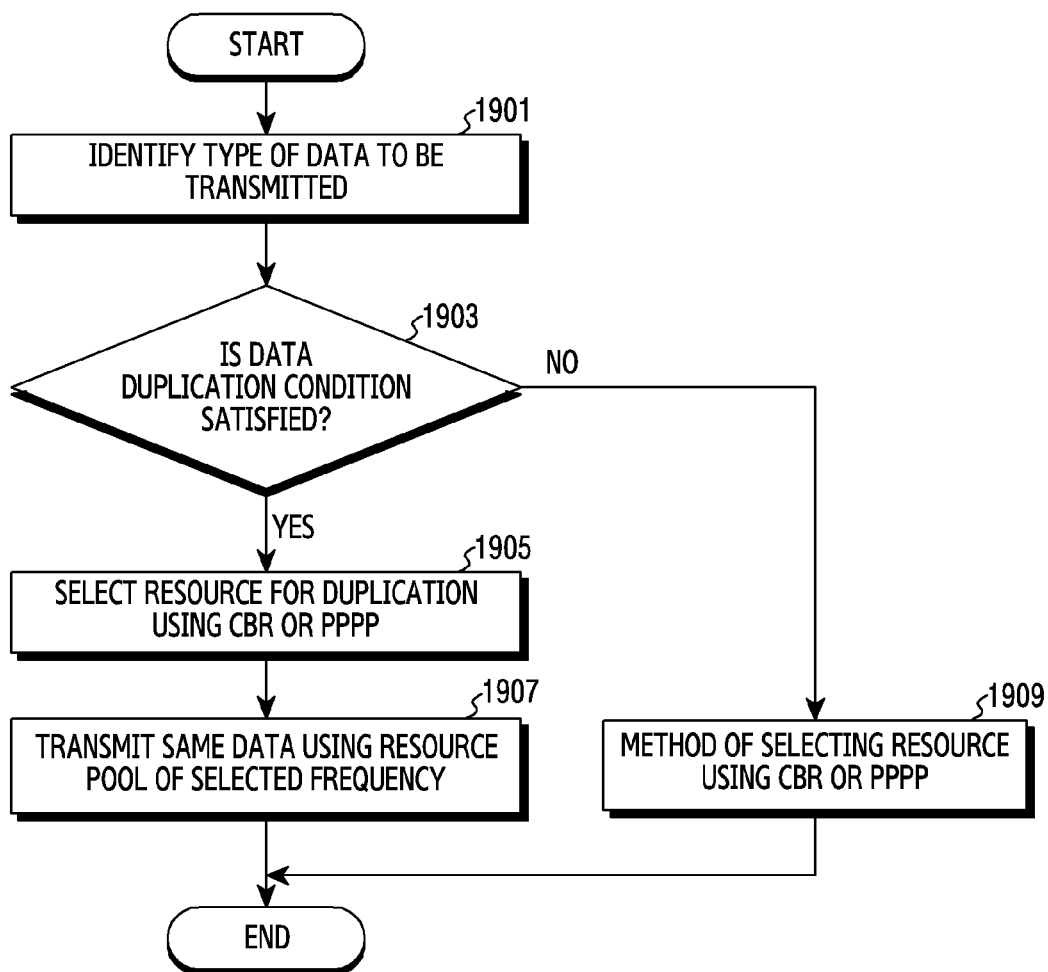
FIG. 19 illustrates a process in which a terminal selects a transmission carrier in the case of applying data duplication and transmission using multiple carriers according to various embodiments of the present disclosure.

FIG. 19 illustrates a process in which a terminal selects a transmission carrier in the case of applying data duplication and transmission using multiple carriers according to various embodiments of the present disclosure.

Referring to FIG. 19, in step 1901, when data to be transmitted is generated, the terminal may identify the corresponding data (i.e., the type of application). The data type information may be utilized to determine whether or not data duplication is necessary using a plurality of transmission carriers. In an embodiment, the type of data requiring data duplication may be identified on the basis of a value {e.g., PPPP or prose reliability per packet (PRPP)} that is set by the upper layer, such as an application layer, a facility layer, or a prose layer. In another embodiment, the type of data requiring data duplication may be identified on the basis of the application ID set by the upper layer.

In step 1903, the terminal may determine whether or not data to be transmitted needs to be duplicated and transmitted. The conditions in which the data duplication and transmission is required are the same as the following embodiments.

For example, PPPP may be used.

In an embodiment, a dedicated PPPP index may be specified, which requires data duplication. For example, it may be specified that data duplication is performed when PPPP is 1, and the terminal determines that, when transmitting a packet of PPPP=1, it is necessary to duplicate the packet to multiple carriers. An example of RRC ASN.1 to inform of a dedicated PPPP index to which data duplication is to be applied is shown in Table 25 below.

TABLE 25

| priorityThreshold-r14 | SL-Priority-r13, |
|---|---|

In another embodiment, the terminal may be configured to apply data duplication in the case where the PPPP value of a packet to be transmitted is set to a value out of a general range of the PPPP value. For example, when the general range of the PPPP value is set to values of 1 to 8, data duplication may be performed with respect to a packet having a PPPP value out of the values of 1 to 8. When transmitting a packet of PPPP=10, the terminal may determine that it is necessary to duplicate the packet to the multiple carriers.

As another example, PRPP may be used.

In an embodiment, in the case where the PRPP flag is set as "data duplication On", the terminal may determine that it is necessary to duplicate the data to multiple carriers.

In another embodiment, the terminal may be configured to apply data duplication in the case where the PRPP value of a packet to be transmitted is set to a value out of a general range of the PRPP value. For example, when the general range of the PRPP value is set to values of 1 to 8, data duplication may be performed with respect to a packet having a PRPP value out of the values of 1 to 8. When transmitting a packet of PRPP=10, the terminal may determine that it is necessary to duplicate the packet to the multiple carriers.

If it is determined that the packet to be transmitted needs to be duplicated in step 1903, the terminal may select a carrier for packet duplication and transmission and a resource pool of the corresponding carrier. In various embodiments of the present disclosure, a resource selection method using at least one of the CBR, PPPP, and PRPP may be used.

In step 1905, the terminal may select a candidate frequency and a candidate resource pool of the corresponding frequency using one of the following embodiments in order to select a resource for duplication.

In an embodiment, the terminal may compare the CBRs of the candidate resources, and may select transmission carriers for data duplication and transmission in the order of the resource pool of the frequency from the lowest CBR value to the highest CBR value. For example, if the CBR values are ranked in the order of Carrier 1 resource pool 1<Carrier 2 resource pool 1<Carrier 3 resource pool 1, when data duplication is performed using two transmission carriers, Carrier 1 resource pool 1 and Carrier 2 resource pool 1 are selected.

If there is only one resource pool for each frequency, the selection of a TX carrier to perform data duplication is determined according to the CBR ranking between the frequencies. If there are a plurality of resource pools for each frequency, a resource pool having the lowest CBR ranking is selected for each frequency, and the selection of a transmission carrier to perform data duplication is determined according to the CBR ranking between the resource pools for the respective selected frequencies.

In another embodiment, the terminal may compare the CBRs of the candidate resources with CBR_PPPP_Threshold (i.e., the CBR threshold value corresponding to a PPPP index of the packet to be transmitted) (see the embodiments in FIGS. 15 and 16), and may select transmission carriers for data duplication in the order of the resource pool of the frequency from the lowest CBR value to the highest CBR value with respect to the frequency satisfying CBR_PPPP_Threshold and a resource pool of the corresponding frequency. For example, if Carrier 1 resource pool 1, Carrier 2 resource pool 2, and Carrier 3 resource pool 3 satisfying CBR_PPPP_Threshold are selected, it may be assumed that CBR values of the selected resources are ranked as Carrier 1 resource pool 1<Carrier 2 resource pool 1<Carrier 3 resource pool 1. In this case, when performing data duplication using two transmission carriers, the terminal may select Carrier 1 resource pool 1 and Carrier 2 resource pool 1.

If there is one resource pool for each frequency, the terminal may measure a CBR value of the one resource pool, thereby determining whether or not CBR_PPPP_Threshold is satisfied for each frequency. Afterwards, the terminal may select a transmission carrier to perform data duplication and a resource pool of the corresponding carrier according to the CBR value ranking for a resource pool of the frequency satisfying CBR_PPPP_Threshold. If there are a plurality of resource pools for each frequency, the terminal may select a resource pool satisfying CBR_PPPP_Threshold from among the plurality of resource pools of each frequency, and may select a transmission carrier to perform data duplication and a resource pool of the corresponding carrier according to the CBR value ranking of each resource pool satisfying CBR_PPPP_Threshold.

In another embodiment, the terminal may compare the CBRs of the candidate resources with CBR_PRPP_Threshold (i.e., the CBR threshold value corresponding to a PRPP index of the packet to be transmitted) (the embodiments using PRPP in FIGS. 15 and 16 may be utilized), and may select transmission carriers for performing data duplication in the order of the resource pool of the frequency from the lowest CBR value to the highest CBR value with respect to the frequency satisfying CBR_PRPP_Threshold and a resource pool of the corresponding frequency. For example, if Carrier 1 resource pool 1, Carrier 2 resource pool 2, and Carrier 3 resource pool 3 satisfying CBR_PRPP_Threshold are selected, it may be assumed that CBR values of the selected resources are ranked as Carrier 1 resource pool 1<Carrier 2 resource pool 1<Carrier 3 resource pool 1. In this case, when performing data duplication using two transmission carriers, the terminal may select Carrier 1 resource pool 1 and Carrier 2 resource pool 1.

In step 1907, the terminal may transmit an original packet and a duplicated packet using a plurality of selected frequencies and resource pools of the corresponding frequencies. In an embodiment, the packet duplication may correspond to duplication of a PDCP packet.

In step 1909, the terminal may perform transmission of single piece of data using a currently used frequency and a resource pool of the corresponding frequency or using a newly selected frequency and a resource pool of the corresponding frequency. In another embodiment of the operation of a terminal that selects a plurality of transmission carrier resources to be used for data duplication, the terminal may use the serving frequency (a camped frequency or a frequency of the previously used resource pool) as a transmission carrier, and may select the remaining transmission carriers to transmit duplicated data using step 1905.

Now, a process in which a terminal operates a transmission carrier timer proposed in the present disclosure will be described with reference to FIGS. 20 and 21. The transmission carrier timer may be applied to the selection for a transmission carrier and a resource pool in FIGS. 8 to 18.

Figure 20:
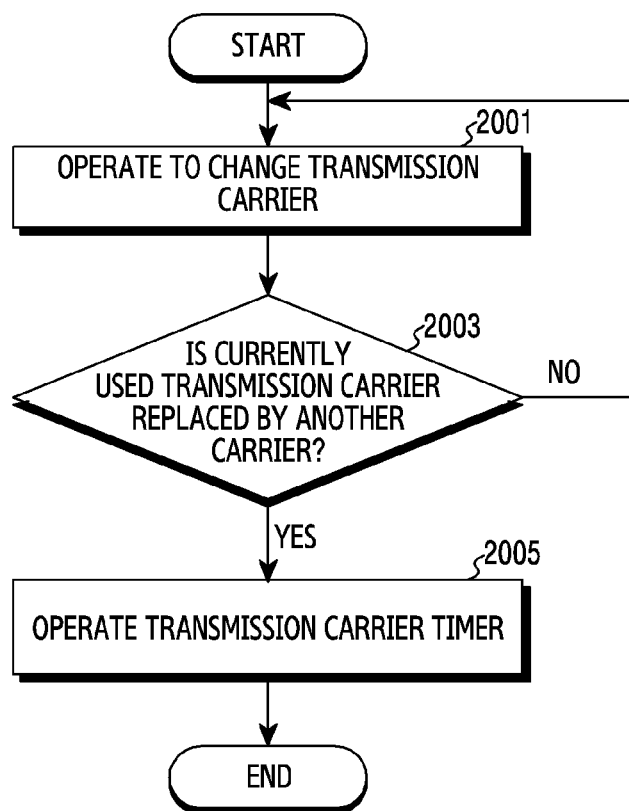
FIG. 20 illustrates a process in which a terminal initiates the operation of a transmission (TX) carrier timer according to various embodiments of the present disclosure.

FIG. 20 illustrates a process in which a terminal initiates the operation of a transmission (TX) carrier timer according to various embodiments of the present disclosure.

The transmission carrier timer may be used to identify whether or not a change of the transmission carrier is possible. In an embodiment, if the terminal selects to use a candidate frequency and a resource pool of the candidate frequency, instead of a serving frequency and a resource pool of the serving frequency, the terminal may be specified to use the selected candidate frequency for a predetermined period of time, and the predetermined period of time may be set as a value of the transmission carrier timer. In another embodiment, the transmission carrier timer may be set to specify that the terminal uses the selected candidate frequency and a selected resource pool of the corresponding frequency for a predetermined period of time. If the transmission carrier timer is set, the terminal does not change the transmission carrier or the selected resource pool of the transmission carrier.

Referring to FIG. 20, in step 2001, the terminal may perform a process of selecting a transmission carrier and a resource pool. The process of selecting the transmission carrier may be performed using the methods described in FIGS. 8 to 18.

In step 2003, when the terminal changes the transmission carrier from the serving transmission carrier to another transmission carrier, if the transmission carrier timer is not set at this time, the terminal may proceed to step 2005 to set the transmission carrier timer. On the other hand, if the terminal uses the resource pool in the serving transmission carrier, the terminal may proceed to step 2001.

Figure 21:
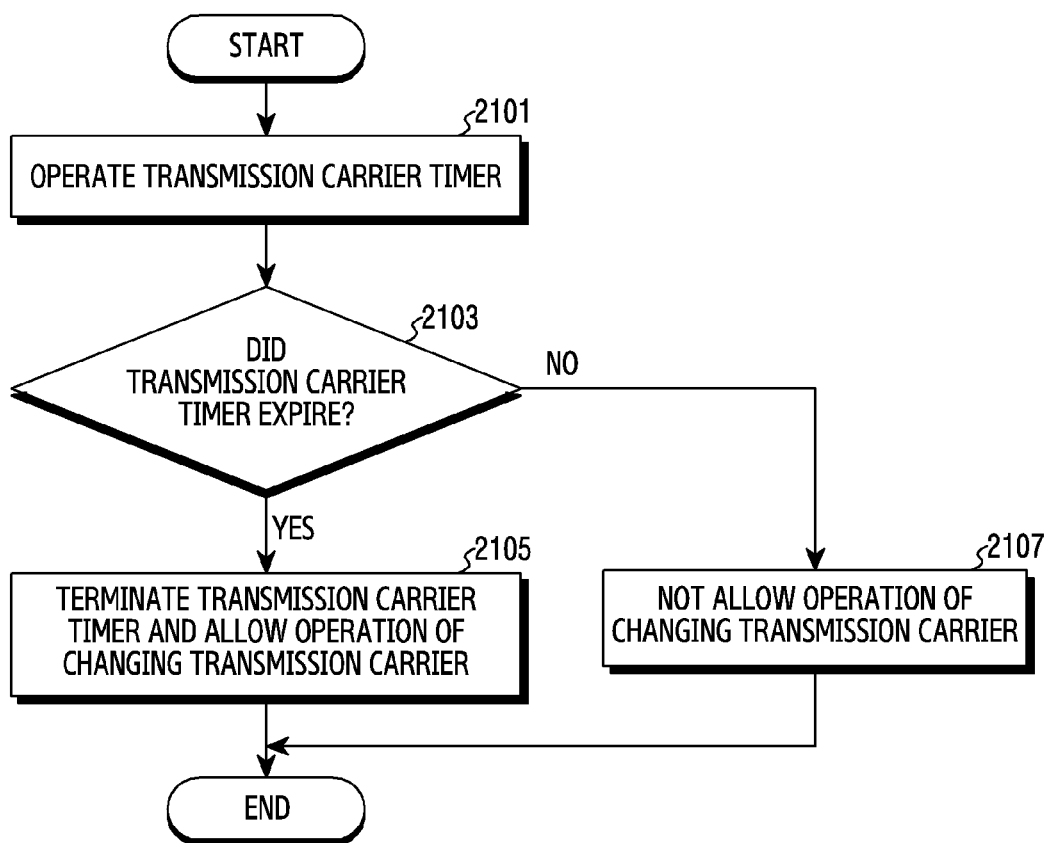
FIG. 21 illustrates a process in which a terminal operates a transmission carrier timer according to various embodiments of the present disclosure.

The terminal that has set the transmission carrier timer in step 2005 may perform a process of FIG. 21.

FIG. 21 illustrates a process in which a terminal operates a transmission carrier timer according to various embodiments of the present disclosure.

Referring to FIG. 21, in step 2101, the terminal may initiate setting of a transmission carrier timer when changing a resource from a serving transmission carrier to a resource pool of another transmission carrier. For example, the terminal may initiate setting of the transmission carrier timer in accordance with the embodiment in FIG. 20.

In step 2103, if the transmission carrier timer, which is currently used, expires, the terminal may proceed to step 2105. Otherwise, the terminal may proceed to step 2107.

In step 2105, the terminal may determine that the operation of changing the transmission carrier to another transmission carrier other than the currently used transmission carrier is allowed as necessary, instead of setting the transmission carrier timer.

In step 2107, the terminal may maintain the previously set transmission carrier timer, and may determine that the operation of changing the transmission carrier to another transmission carrier other than the currently used transmission carrier is not allowed.

Figure 22:
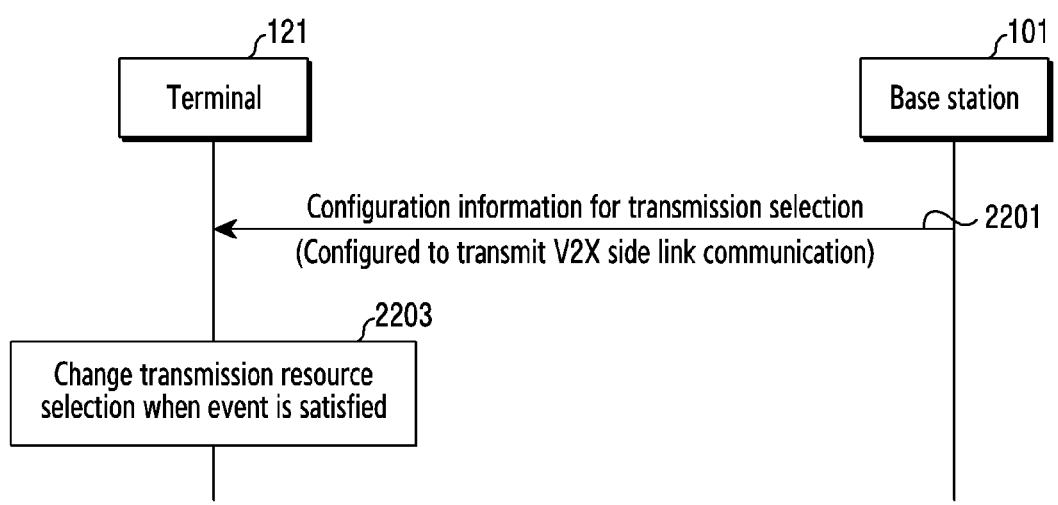
FIG. 22 illustrates a signal flow in which a terminal receives, from a base station, a transmission (TX) carrier selection configuration to be applied to the selection for a transmission carrier and a resource pool of the corresponding carrier according to various embodiments of the present disclosure.

FIG. 22 illustrates a signal flow in which a terminal receives, from a base station, a transmission (TX) carrier selection configuration to be applied to the selection for a transmission carrier and a resource pool of the corresponding carrier according to various embodiments of the present disclosure.

Referring to FIG. 22, in step 2201, the base station 101 may transmit, to the terminal 121, configuration information to be used for selecting a transmission carrier and a resource pool of the corresponding carrier. The configuration information may be transmitted through system information or RRC dedicated signaling.

An example of the configuration information for TX carrier selection, which is transmitted from the base station 101 to the terminal 121, is as follows. (1) a frequency ID, (2) a resource pool ID, (3) resource pool information, (4) transmission (TX) carrier and resource pool selection event type information, and CBR threshold value information, and (5) a transmission (TX) carrier timer.

Here, (2) the resource pool ID indicates the ID of the resource pool, and may have a unique value for all the frequencies, or may have a unique value by being used together with the frequency ID.

(3) The resource pool information indicates the location of the resource pool. For example, it denotes the frequency of a resource pool, time resource information, and so on.

(4) The TX resource selection event type includes at least one piece of information on Event V1_T1, Event V1_T2, Event V2_T1, Event V2_T2, Event V3_T1, Event V3_T2, Event V4_T1, Event V4_T2, Event V5_T2, or Event V6_T1.

(4) The CBR threshold value information includes at least one piece of information on a specific value, a range of the CBR value, a threshold value per PPPP, and a CBR threshold value per PRPP.

(5) The transmission carrier timer has a transmission carrier timer setting value. For example, if the transmission carrier timer is set to 1000 ms, the terminal 121 does not perform the operation of selecting another transmission carrier other than the currently used transmission carrier for 1000 ms after the start of the transmission carrier timer.

In step 2203, the terminal 121 may perform the operation of selecting a transmission carrier and a resource of the corresponding carrier according to various embodiments of the present disclosure using the transmission (TX) carrier selection configuration set by the base station 101.

The embodiment in FIG. 22 may be used for selecting a transmission carrier and a resource pool for transmission of a single packet. Next, referring to FIG. 23, an embodiment of setting transmission carrier selection, which may be used for selecting a transmission carrier and a resource pool for packet duplication and transmission, will be described.

Figure 23:
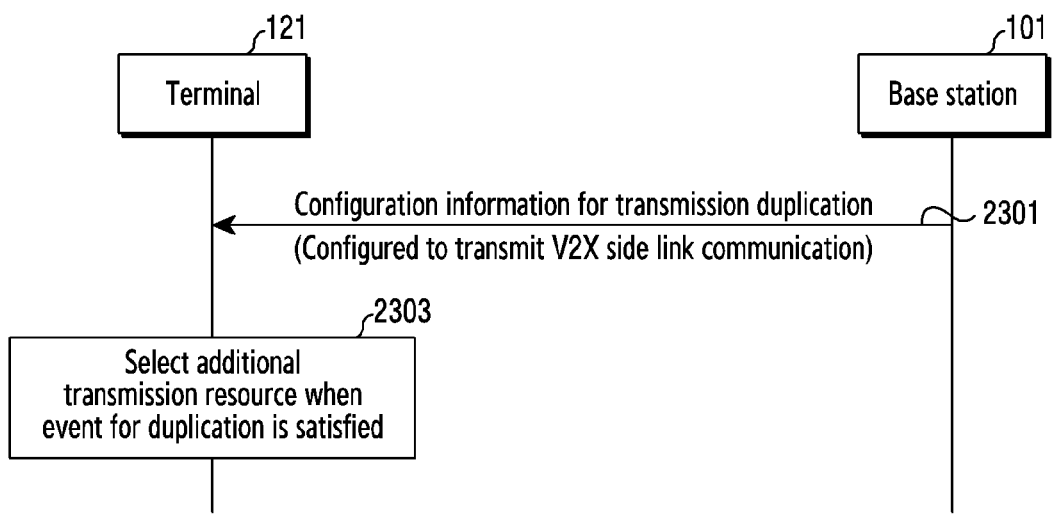
FIG. 23 illustrates a signal flow in which a terminal receives, from a base station, configuration information for transmission (TX) resource selection for data duplication according to various embodiments of the present disclosure.

FIG. 23 illustrates a signal flow in which a terminal receives, from a base station, configuration information for a transmission (TX) resource selection for data duplication according to various embodiments of the present disclosure.

Referring to FIG. 23, in step 2301, the base station 101 may transmit configuration information to be used for selecting a transmission carrier to perform packet duplication and transmission and a resource pool of the corresponding carrier. The configuration information may be transmitted through system information or RRC dedicated signaling.

An example of the configuration information for TX carrier selection for duplication of a packet, which is transmitted from the base station 101 to the terminal 121, is as follows. (1) A frequency ID, (2) a resource pool ID, (3) resource pool information, and (4) TX carrier and resource pool selection event type information for packet duplication, PRPP threshold value information, and CBR threshold value information.

Here, (2) the resource pool ID indicates the ID of the resource pool, and may have a unique value for all the frequencies, or may have a unique value by being used together with the frequency ID.

(3) The resource pool information indicates the location of the resource pool. For example, it denotes the frequency of a resource pool, time resource information, and so on.

(4) The TX resource selection event type includes at least one piece of information on of Event V1_T1, Event V1_T2, Event V2_T1, Event V2_T2, Event V3_T1, Event V3_T2, Event V4_T1, Event V4_T2, Event V5_T2, or Event V6_T1.

(4) The PPPP threshold value information means PPPP reference information for determining packet duplication and transmission with respect to multiple carriers.

(4) The PRPP threshold value information means PRPP reference information for determining packet duplication and transmission with respect to multiple carriers.

(4) The CBR threshold value information means a specific value, a range of the CBR value, a CBR threshold value per PPPP, and a CBR threshold value per PRPP.

In step 2303, the terminal 121 may perform the operation of selecting a transmission carrier and a resource of the corresponding carrier according to various embodiments of the present disclosure using the TX carrier selection configuration for packet duplication, which is set by the base station 101.

Another embodiment of the transmission carrier selection configuration information for packet duplication described above in FIGS. 19 to 23 is as follows.

A TX parameter, a duplication indicator, or a channel busy ratio (CBR) index may be used as configuration parameters for selecting or reselecting a carrier for packet duplication on the basis of the PRPP, CBR or PPPP, which may be expressed as Table 26 or Table 27 below.

In an embodiment, the following is the case where transmission parameters determined on the basis of the PPRP and CBR are used as parameters for selecting or reselecting a carrier for packet duplication. In the case where a selection indicator or a reselection indicator, as a corresponding indicator, is included in the transmission parameters, the indicator may be used as a condition for carrier selection and reselection. For example, if the selection indicator of the transmission parameters is set to be true, the V2X terminal may perform a carrier selection operation on the basis of the PRPP and CBR of V2X data to be transmitted. Alternatively, if the selection indicator of the transmission parameters is set to be false, the V2X terminal may not perform the carrier selection operation. In addition, if the reselection indicator is included in the transmission parameters, whether or not the carrier reselection operation is performed may be determined in the same manner as the example of the selection indicator. In another embodiment, a maximum power value of the transmission parameters may be used as a condition on the carrier selection and reselection as follows. If the maximum power of the transmission parameters, which is selected on the basis of the PRPP and CBR of V2X data to be transmitted, is set to zero, the V2X terminal may not transmit the V2X data by the corresponding carrier, and may transmit the V2X data by selecting another carrier. At this time, the V2X terminal, for example, may select a resource whose maximum power of the transmission parameters of another carrier is not zero, or may select a resource having the lowest CBR from among the resources whose maximum power is not zero, thereby transmitting the V2X data.

Another embodiment in which a selection indicator or a reselection indicator is included when PRPP and a CBR are used as parameters for selecting or reselecting a carrier for packet duplication is as follows. The V2X terminal may select a selection indicator using the CBR result of a measured channel environment and the PRPP of V2X data to be transmitted. For example, if the selection indicator is set to be true with respect to the CBR of a channel and the PRPP of a packet to be transmitted, the V2X terminal may perform the carrier selection operation. As another example, if the selection indicator is set to be false with respect to the CBR of a channel and the PRPP of a packet to be transmitted, the V2X terminal may not perform the carrier selection operation. Similarly, in the case where a reselection indicator is used for carrier reselection, whether the reselection indicator is set to be true or false with respect to the CBR of a channel and the PRPP of a packet to be transmitted may be determined, so that the carrier reselection operation may, or may not, be performed.

Another embodiment in which a selection indicator or a reselection indicator is included when a CBR index is used as a parameter for selecting or reselecting a carrier is as follows. The CBR index may be determined using the CBR result of the channel measured by the V2X terminal and the PRPP of V2X data to be transmitted. As an example of selecting a carrier using a CBR index, the V2X terminal may determine the CBR index using the CBR result and PRPP. If a selection indicator or a reselection indicator of the selected CBR index is true, the V2X terminal may perform the carrier selection operation. Alternatively, if the selection indicator of the selected CBR index is false, the V2X terminal may not perform the carrier selection operation. Similarly, in the case where a reselection indicator is used for carrier reselection, whether the reselection indicator of the CBR index, which is determined on the basis of the CBR of the channel and the PRPP of a packet to be transmitted, is set to be true or false may be determined, so that the carrier reselection operation may, or may not, be performed.

Although the above description has been made on the basis of the CBR and PRPP, the same operation may also be applied to the case where PPPP of a packet to be transmitted is used.

TABLE 26

|  | PRPP 1 | PRPP 2 | ... | PRPP N |
|---|---|---|---|---|
| CBR range 1 | TX parameter, selection indicator, reselection indicator, or CBR index | ... | ... | ... |
| CBR range 2 | ... | ... | ... | ... |
| ... | ... | ... | ... | ... |
| CBR range M | ... | ... | ... | ... |

Table 26 shows that a transmission (TX) parameter, a selection indicator, a reselection indicator, or a CBR index corresponding to the CBR ranges of a channel and the PRPP of a packet are used as information for selecting or reselecting a carrier for packet duplication. The information for selecting or reselecting a carrier for packet duplication may be a specific transmission (TX) parameter or a selection indicator/reselection indicator mapped with the transmission parameter, or may be a specific CBR index or a selection indicator/reselection indicator mapped with the CBR index. The V2X terminal may determine the parameters in Table 26 on the basis of the PRPP and CBRs, and may apply the same to the selection or reselection of a carrier for packet duplication.

TABLE 27

|  | PPPP 1 | PPPP 2 | ... | PPPP Y |
|---|---|---|---|---|
| CBR range 1 | TX parameter, selection indicator, reselection indicator, or CBR index | ... | ... | ... |
| CBR range 2 | ... | ... | ... | ... |
| ... | ... | ... | ... | ... |
| CBR range X | ... | ... | ... | ... |

Table 27 shows that a transmit (TX) parameter, a selection indicator, a reselection indicator, or a CBR index corresponding to the CBR ranges of a channel and the PPPP of a packet are used as information for selecting or reselecting a carrier for packet duplication. The information for selecting or reselecting a carrier for packet duplication may be a specific transmission (TX) parameter or a selection indicator/reselection indicator mapped with the transmission parameter, or may be a specific CBR index or a selection indicator/reselection indicator mapped with the CBR index. The V2X terminal may determine the parameters in Table 27 on the basis of the PPPP and CBRs, and may apply the same to the selection or reselection of a carrier for packet duplication.

In addition, as embodiments of a selection indicator or a reselection indicator for selecting or reselecting a carrier for packet duplication, a candidate resource pool may be selected in the MAC layer using the events according to the embodiments in FIGS. 8, 10 to 12, 15, 16, and 19 described above or using Tables 28 to 41 described later. According to various embodiments of the present disclosure, in the case of using the CBRs, among the methods using Tables 28 to 41 described later, the carrier selection and reselection may be determined by comparing the previous CBR value of a currently used carrier with the currently used CBR value thereof, or the carrier selection and reselection may be determined using the current CBR value of a currently used carrier and the current CBR value of a candidate carrier.

Now, according to various embodiments of the present disclosure, an embodiment for the operation of a V2X terminal for selecting a transmission carrier and an embodiment for the operation of a V2X terminal for reselecting a transmission carrier will be described separately.

Figure 24A:
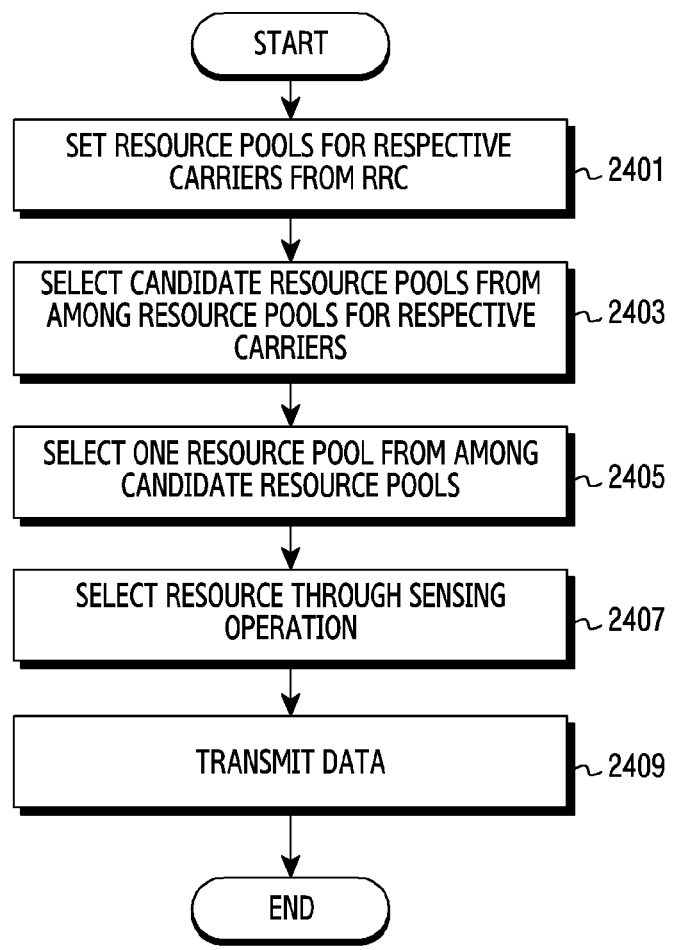
FIG. 24A illustrates an example of an initial operation of a V2X terminal for selecting a transmission carrier according to various embodiments of the present disclosure.

FIG. 24A illustrates an example of an initial operation of a V2X terminal for selecting a transmission carrier according to various embodiments of the present disclosure.

In step 2401, the V2X terminal may obtain resource pool information allocated to each carrier from information received from the base station or pre-configuration information stored in the V2X terminal. The resource pool information may be stored as RRC information, and may be transmitted to the MAC layer.

In step 2403, the V2X terminal selects a candidate resource pool from among resource pools allocated to each carrier. In an embodiment, the candidate resource pool may be selected on the basis of the CBR measurement result of the resource pool allocated to each carrier and the PPPP of V2X data to be transmitted by the terminal. At this time, the candidate resource pool may be selected in the MAC layer using the events according to the embodiments in FIGS. 8, 10 to 12, 15, 16, and 19 described above or using Tables 28 to 41 described later.

In step 2405, the V2X terminal selects one resource pool from among the candidate resource pools selected in step 2403. As an example, the V2X terminal may select one resource pool having the lowest CBR or may randomly select one resource pool from among the candidate resource pools.

In step 2407, the V2X terminal may select a transmission resource through a sensing operation in one resource pool selected in step 2405.

In step 2409, the V2X terminal may transmit V2X data using the transmission resource selected in step 2407.

Figure 24B:
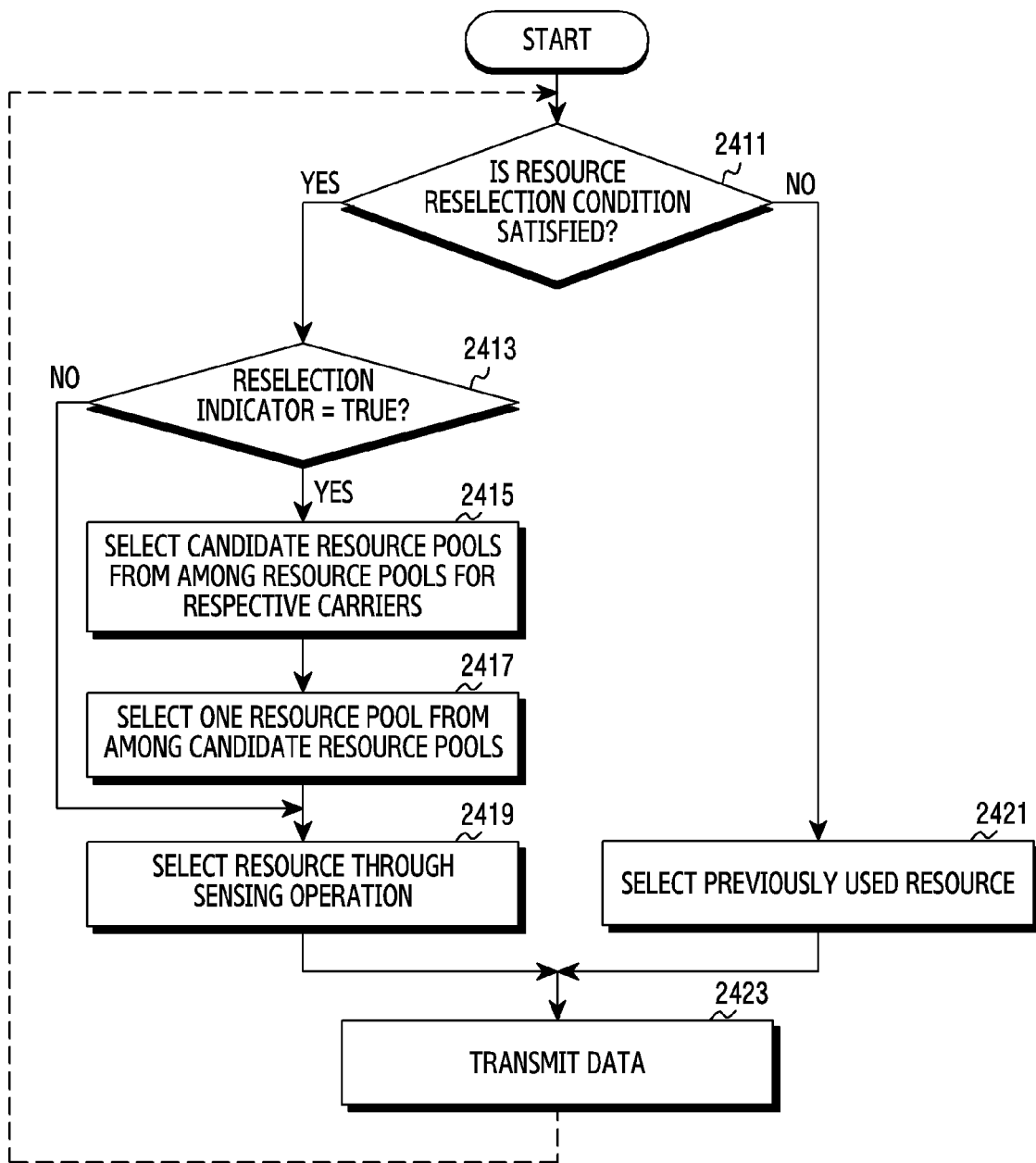
FIG. 24B illustrates an example of an operation of a V2X terminal for reselecting a transmission carrier according to various embodiments of the present disclosure.

FIG. 24B illustrates an example of an operation of a V2X terminal for reselecting a transmission carrier according to various embodiments of the present disclosure. Here, it is assumed that the V2X terminal has already completed the operation of selecting a transmission carrier according to the embodiment in FIG. 24A described above.

In the embodiment in FIG. 24B, the V2X terminal may obtain resource pool information allocated to each carrier from information received from the base station or pre-configuration information stored in the V2X terminal. The resource pool information may be stored as RRC information, and may be transmitted to the MAC layer.

In step 2411, the V2X terminal may identify whether or not a condition for reselecting transmission resources (i.e., a transmission carrier, a transmission resource pool, and the like) is satisfied. The operation of step 2411 may correspond to the case where the data to be transmitted remains in the terminal buffer. The operation of step 2411 may correspond to the case where the terminal has the pre-selected transmission carrier and resource pool information.

An embodiment satisfying the condition in step 2411 may be the case where SL_RESOURCE_RESELECTION_COUNT is zero. SL_RESOURCE_RESELECTION_COUNT is a value used to determine whether to maintain or reselect the V2X data transmission resource and decreases by one for each V2X data transmission. If SL_RESOURCE_RESELECTION_COUNT is zero, the V2X terminal may reselect the V2X data transmission resource. If SL_RESOURCE_RESELECTION_COUNT is not zero, the V2X terminal may transmit V2X data using existing resources. Another embodiment satisfying the condition in step 2411 may be the case where the V2X terminal does not transmit data for a predetermined period of time or a predetermined number of times even though the V2X terminal has obtained transmission resources. Another embodiment satisfying the condition in step 2411 may be the case where the V2X terminal fails to satisfy the latency requirement or the terminal RF requirement when transmitting a packet using the selected resources. Another embodiment satisfying the condition in step 2411 may be the case where the transmission carrier timer of FIGS. 20 and 21 expires. For example, if the transmission carrier timer is in operation, the V2X terminal may not perform the carrier reselection operation. For example, if the transmission carrier timer expires, the V2X terminal may perform the carrier reselection operation.

In step 2413, the V2X terminal may identify a carrier reselection indicator to determine whether or not the carrier reselection condition is satisfied. If the carrier reselection condition is satisfied as a result of the determination in step 2413, the V2X terminal may proceed to step 2415. Otherwise, the V2X terminal may proceed to step 2419. Examples of the carrier reselection indicator may refer to the selection indicators in Tables 28 to 30 and 34 to 36 or the reselection indicators in Tables 31 to 33 and 37 to 41.

In step 2415, the V2X terminal may select a candidate resource pool from among the resource pools allocated to each carrier. In an embodiment, the candidate resource pool may be selected on the basis of the CBR measurement result of the resource pools allocated to each carrier and the PPPP of V2X data to be transmitted by the terminal. At this time, the candidate resource pool may be selected in the MAC layer using the events according to the embodiments in FIGS. 8, 10 to 12, 15, 16, and 19 described above or using Tables 28 to 41 described later.

In step 2417, the V2X terminal may select one or more resources for each carrier as the candidate resource pools using the method in step 2415. The V2X terminal may select one resource pool having the lowest CBR or may randomly select one resource pool from among the candidate resource pools.

In step 2419, the V2X terminal may select a resource by performing a sensing operation for selecting transmission resources from the resource pool. The resource pool of step 2419 may be the resource pool that was used in the previous packet transmission, or may be the resource pool reselected through the operations of steps 2415 and 2417.

In step 2421, if the condition for reselecting the transmission resource is not satisfied (for example, SL_RESOURCE_RESELECTION_COUNT is not zero) in step 2411, the V2X terminal may maintain the resource, which was used for the packet transmission.

In step 2423, the V2X terminal may transmit V2X data using the determined resource. If SL_RESOURCE_RESELECTION_COUNT is being used by the V2X terminal, the V2X terminal reduces a SL_RESOURCE_RESELECTION_COUNT value by one. Thereafter, if there is V2X data to be transmitted, the V2X terminal may proceed to the operation of step 2411.

In the case where a new resource pool setting for each carrier is transferred from the RRC of the V2X terminal to the MAC layer, if SL_RESOURCE_RESELECTION_COUNT is zero, the V2X terminal may perform the operation of step 2413.

Although the operations of steps 2411 to 2415 are described as separate steps for carrier and resource pool reselection in the embodiment of FIG. 24B, the operations of steps 2411 to 2415 may be configured as one step for carrier and resource pool reselection. That is, the V2X terminal may determine whether or not the carrier and resource pool reselection condition is satisfied using the information of step 2415 that uses the events according to the embodiments in FIGS. 8, 10 to 12, 15, 16, and 19 described above or uses Tables 28 to 41 described later, including various resource reselection conditions of step 2411 and the selection/reselection indicators of step 2413.

Figure 24C:
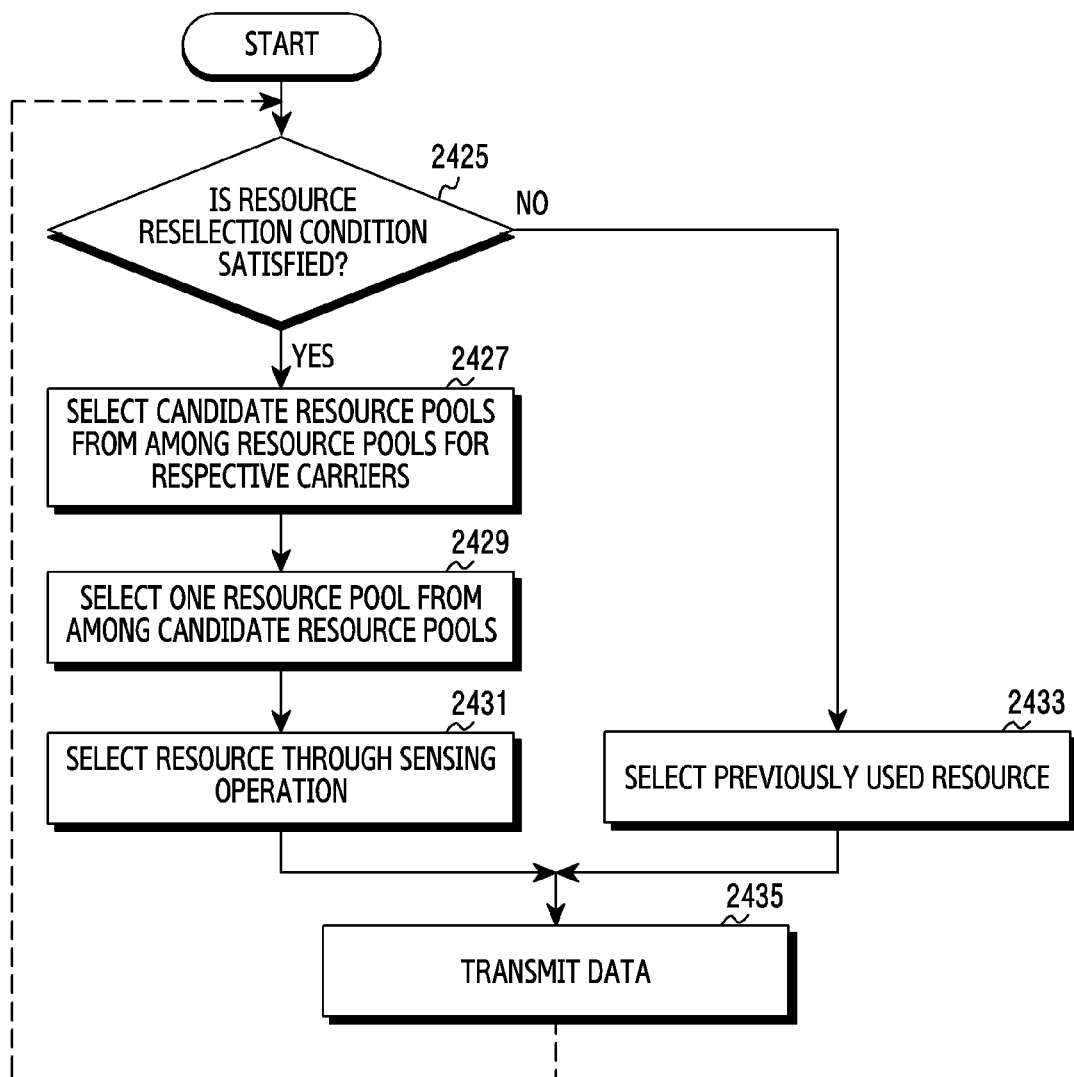
FIG. 24C illustrates another example of an operation in which a V2X terminal reselects a transmission carrier according to various embodiments of the present disclosure.

FIG. 24C illustrates another example of the operation in which a V2X terminal reselects a transmission carrier according to various embodiments of the present disclosure. It is assumed that the V2X terminal has already completed the operation of selecting a transmission carrier according to the embodiment in FIG. 24A described above.

In the embodiment of FIG. 24C, the V2X terminal may obtain resource pool information allocated to each carrier from information received from the base station or pre-configuration information stored in the V2X terminal. The resource pool information may be stored as RRC information, and may be transmitted to the MAC layer.

In step 2425, the V2X terminal may identify whether or not a condition for reselecting transmission resources (i.e., a transmission carrier, a transmission resource pool, and the like) is satisfied. The operation of step 2425 may correspond to the case where data to be transmitted remains in the terminal buffer. The operation of step 2425 may correspond to the case where the terminal has the pre-selected transmission carrier and resource pool information.

An embodiment satisfying the condition in step 2425 may be the case where SL_RESOURCE_RESELECTION_COUNT is zero. SL_RESOURCE_RESELECTION_COUNT is a value used to determine whether to maintain or reselect the V2X data transmission resource and decreases by one for each V2X data transmission. If SL_RESOURCE_RESELECTION_COUNT is zero, the V2X terminal may reselect the V2X data transmission resource. If SL_RESOURCE_RESELECTION_COUNT is not zero, the V2X terminal may transmit the V2X data using existing resources. Another embodiment satisfying the condition in step 2425 may be the case where the V2X terminal does not transmit data for a predetermined period of time or a predetermined number of times even though the V2X terminal has obtained transmission resources. Another embodiment satisfying the condition in step 2425 may be the case where the V2X terminal fails to satisfy the latency requirement or the terminal RF requirement when transmitting a packet using the selected resources. Another embodiment satisfying the condition in step 2425 may be the case where the transmission carrier timer in FIGS. 20 and 21 expires. For example, if the transmission carrier timer is in operation, the V2X terminal may not perform the carrier reselection operation. For example, if the transmission carrier timer expires, the V2X terminal may perform the carrier reselection operation.

In step 2427, the V2X terminal may select a candidate resource pool from among resource pools allocated to each carrier. In an embodiment, the candidate resource pool may be selected on the basis of the CBR measurement result of the resource pool allocated to each carrier and the PPPP of V2X data to be transmitted by the terminal. At this time, the candidate resource pool may be selected in the MAC layer using the events according to the embodiments in FIGS. 8, 10 to 12, 15, 16, and 19 described above or using Tables 28 to 41 described later. Examples of the carrier reselection indicator used in step 2427 may refer to the selection indicators in Tables 28 to 30 and 34 to 36 or the reselection indicators in Tables 31 to 33 and 37 to 41.

In step 2429, the V2X terminal may select one or more resources for each carrier as the candidate resource pools using the method in step 2427. The V2X terminal may select one resource pool having the lowest CBR or may randomly select one resource pool from among the candidate resource pools.

In step 2431, the V2X terminal may select a resource by performing a sensing operation for selecting transmission resources from the resource pool. The resource pool of step 2431 may be the resource pool that was used in the previous packet transmission, or may be the resource pool reselected through the operations of steps 2427 and 2429.

If the condition for reselecting the transmission resource is not satisfied (for example, SL_RESOURCE_RESELECTION_COUNT is not zero) in step 2425, the V2X terminal may maintain the resource, which was used for the packet transmission in step 2433.

In step 2435, the V2X terminal may transmit V2X data using the determined resource. If SL_RESOURCE_RESELECTION_COUNT is being used by the V2X terminal, the V2X terminal reduces the SL_RESOURCE_RESELECTION_COUNT value by one. Thereafter, if there is V2X data to be transmitted, the V2X terminal may proceed to the operation of step 2425.

In the case where a new resource pool setting for each carrier is transferred from the RRC of the V2X terminal to the MAC layer, if SL_RESOURCE_RESELECTION_COUNT is zero, the V2X terminal may perform the operation of step 2427.

Although the operations of steps 2425 to 2427 are described as separate steps for carrier and resource pool reselection in the embodiment of FIG. 24C, the operations of steps 2425 to 2427 may be configured as one step for carrier and resource pool reselection. That is, the V2X terminal may determine whether or not the carrier and resource pool reselection condition is satisfied using the information of step 2427 that uses the events according to the embodiments in FIGS. 8, 10 to 12, 15, 16, and 19 described above or uses Tables 28 to 41 described later, including various resource reselection conditions of step 2425 and the selection/reselection indicators of step 2427.

Now, Tables 28 to 41 showing CBR or PPPP indication information that the V2X terminal may use in selecting a carrier and a resource pool according to various embodiments of the present disclosure will be described. The embodiments of Tables 28 to 41 may be applied to the operation of step 2403 in FIG. 24A, step 2415 in FIG. 24B, or step 2427 in FIG. 24C.

According to various embodiments of the present disclosure, Tables 28 to 41 show the cases where a CBR-PPPP table applied to the resource pool is used. According to Tables 28 to 41, the V2X terminal may select a candidate resource pool by means of a CBR-PPPP-based carrier selection or reselection condition using a carrier selection indicator. The carrier selection indicator is used as a condition for determining an available carrier in the operation of selecting a carrier (i.e., step 2403 in FIG. 24A) and in the operation of reselecting a carrier (i.e., step 2415 in FIG. 24B or step 2427 in FIG. 24C).

Table 28 shows an example in which the carrier selection indicator is set for some CBR-PPPP ranges. In the case where the carrier selection indicator is set for a specific CBR-PPPP range, the operation of the same indicator (e.g., the carrier selection or reselection condition) may be applied to the CBR-PPPP ranges beyond the specific CBR-PPPP range as a reference. As another embodiment, the operation of the same indicator may be applied to the CBR ranges beyond the reference CBR range. As another embodiment, the operation of the same indicator may be applied to the PPPP ranges beyond a reference PPPP range. For example, if the selection indicator is set to be true in the CBR range 1 and parameter PPPP1, the V2X terminal operates as follows. It is assumed that the CBR measured by the V2X terminal is within the CBR range 2 and the PPPP of V2X data to be transmitted is 1. In this case, the V2X terminal may determine that the condition of CBR range 2 and PPPP1 satisfies the condition of performing carrier selection or reselection operation for V2X data transmission because the selection indicator of the CBR range 1 and PPPP1 is set to be true.

TABLE 28

|  | PPPP1 | PPPP2 | ... PPPP8 |
|---|---|---|---|
| CBR range 1 | transmission configuration index, selection indicator | transmission configuration index | ...... |
| CBR range 2 | transmission configuration index | transmission configuration index, selection indicator | ...... |
| ... | ... | transmission configuration index | ... transmission configuration index, selection indicator |
| CBR range 16 | transmission configuration index | ... | ...... |

Table 29 shows an example in which a carrier selection indicator is set for all CBR-PPPP ranges. In the case where the carrier selection indicator is set in the CBR-PPPP range, the carrier selection indicator in the corresponding CBR-PPPP range may be used as a condition for determining the carrier selection or reselection. For example, if the selection indicator is set to be true in the condition of the CBR range 1 and parameter PPPP1, the V2X terminal operates as follows. For example, in the case where the CBR result measured by the V2X terminal is within the CBR range 1 and the PPPP of V2X data to be transmitted is 1, the terminal refers to a value of the selection indicator of the CBR range 1 and PPPP1, and if it is set to be true, performs the carrier selection or reselection operation. For example, in the case where the CBR result measured by the V2X terminal is within the CBR range 1 and the PPPP of V2X data to be transmitted is 1, the terminal refers to a value of the selection indicator of the CBR range 1 and PPPP1, and if it is set to be false, does not perform the carrier selection or reselection operation.

TABLE 29

|  | PPPP1 | PPPP2 | ... PPPP8 |
|---|---|---|---|
| CBR range 1 | transmission configuration index, selection indicator | transmission configuration index, selection indicator | ...... |
| CBR range 2 | transmission configuration index, selection indicator | ... | ...... |
| ... | ... | ... | ...... |
| CBR range 16 | transmission configuration index, selection indicator | ... | ... transmission configuration index, selection indicator |

An embodiment of RRC signaling including the information of the above Tables 28 and 29 is as follows. As an embodiment of RRC ASN.1, a selection indicator may be included in SL-CBR-PPPP-TxConfigList, which is shown in Table 30. Table 30 shows an embodiment of the SL-CBR-PPPP-TxConfigList information component.

TABLE 30

```
-- ASN1START
SL-CBR-PPPP-TxConfigList-r14 ::=    SEQUENCE (SIZE (1..8)) OF SL-PPPP-TxConfigIndex-r14
SL-PPPP-TxConfigIndex-r14 ::=       SEQUENCE {
    priorityThreshold-r14              SL-Priority-r13,
    defaultTxConfigIndex-r14           INTEGER(0..maxCBR-Level-1-r14),
    cbr-ConfigIndex-r14                INTEGER(0..maxSL-V2X-CBRConfig-1-r14),
    tx-ConfigIndexList-r14             SEQUENCE (SIZE (1..maxCBR-Level-r14)) OF Tx-ConfigList-r14
    tx-ConfigIndexList-r15             SEQUENCE (SIZE (1..maxCBR-Level-r14)) OF Tx-ConfigList-r15
}
Tx-ConfigList-r14 :: =              SEQUENCE {
    Tx-ConfigIndex-r14 ::=             INTEGER(0..maxSL-V2X-TxConfig-1-r14)
}
Tx-ConfigList-r15 :: =              SEQUENCE {
    Tx-ConfigIndex-r14 ::=             INTEGER(0..maxSL-V2X-TxConfig-1-r14)
    Selection Indicator-r15            BOOLEAN          -- OPTIONAL
}
-- ASN1STOP
```

The selection indicator of Tx-ConfigList-r15, as an indicator to indicate carrier selection or reselection, may be set to be true or false. As in the embodiments of Tables 28 and 29, the selection indicator may be combined with a priority threshold value (priorityThreshold) or a CBR configuration index (cbr-ConfigIndex), and may then be used as a carrier selection or reselection condition.

According to various embodiments of the present disclosure, a candidate resource pool may be selected using a selection indicator or a reselection indicator in Tables 31 and 32 below. The selection indicator is used to determine carriers available for the V2X terminal when the V2X terminal selects a carrier. The reselection indicator is used to reselect a carrier while the V2X terminal is using a selected carrier.

Table 31 shows an example in which a selection indicator or a reselection indicator is set for some CBR-PPPP ranges. In the case where the carrier selection indicator or the carrier reselection indicator is set for a specific CBR-PPPP range, the operation of the same indicator (e.g., the carrier selection or reselection condition) may be applied to the CBR-PPPP ranges beyond the specific CBR-PPPP range as a reference. As another embodiment, the operation of the same indicator may be applied to the CBR ranges beyond a reference CBR range. As another embodiment, the operation of the same indicator may be applied to the PPPP ranges beyond a reference PPPP range.

For example, if the selection indicator is set to be true or the reselection indicator is set to be true in the CBR range 1 and parameter PPPP1, the V2X terminal operates as follows. For example, in the case where the CBR measurement result is within the CBR range 1 and the PPPP of V2X data to be transmitted is 1, the V2X terminal may refer to a value of the indicator (i.e., the selection indicator or the reselection indicator) of the CBR range 1 and the PPPP1, and if the indicator is set to be true, may perform the carrier selection or reselection operation. For example, in the case where the CBR result measured by the V2X terminal is within the CBR range 1 and the PPPP of V2X data to be transmitted is 1, the V2X terminal may refer to a value of the selection indicator of the CBR range 1 and PPPP1, and if the indicator is set to be false, may not perform the carrier selection or reselection operation.

TABLE 31

|  | PPPP1 | PPPP2 | ... PPPP8 |
|---|---|---|---|
| CBR range 1 | transmission configuration index, selection indicator, reselection indicator | transmission configuration index, selection indicator | ...... |
| CBR range 2 | transmission configuration index | transmission configuration index, selection indicator, reselection indicator | ...... |
| ... | ... | TX config index | ... transmission configuration index, selection indicator, reselection indicator |
| CBR range 16 | transmission configuration index | ... | ...... |

Table 32 shows an example in which a selection indicator or a reselection indicator exists in all CBR-PPPP ranges in the table. If the corresponding selection indicator or reselection indicator exists in all CBR-PPPP ranges, and if the indicator is set to the CBR-PPPP range, the selection indicator or reselection indicator may be used as a carrier reselection condition or a carrier reselection determination condition in the corresponding CBR-PPPP range. For example, if the selection indicator or the reselection indicator is set to be true in the condition of the CBR range 1 and parameter PPPP1, the V2X terminal operates as follows. For example, in the case where the CBR result measured by the V2X terminal is within the CBR range 1 and the PPPP of V2X data to be transmitted is 1, the V2X terminal may refer to a value of the indicator of the CBR range 1 and PPPP1 (i.e., the selection indicator or the reselection indicator), and if the indicator is set to be true, may perform the carrier selection or reselection operation. For example, in the case where the CBR result measured by the V2X terminal is within the CBR range 1 and the PPPP of V2X data to be transmitted is 1, the V2X terminal may refer to a value of the selection indicator or reselection indicator of the CBR range 1 and PPPP1, and if the indicator is set to be false, may not perform the carrier selection or reselection operation.

TABLE 32

|  | PPPP1 | PPPP2 | ... PPPP8 |
|---|---|---|---|
| CBR range 1 | transmission configuration index, selection indicator, reselection indicator | transmission configuration index, selection indicator, reselection indicator | . . . . . . |
| CBR range 2 | transmission configuration index, selection indicator, reselection indicator | . . . | . . . . . . |
| . . . | . . . | . . . | . . . . . . |
| CBR range 16 | transmission configuration index, selection indicator, reselection indicator | . . . | . . . transmission configuration index, selection indicator, reselection indicator |

An embodiment of the RRC signaling including the information in Tables 31 and 32 is as follows. As an embodiment of RRC ASN.1, a selection indicator or a reselection indicator may be included in SL-CBR-PPPP-TxConfigList, which is shown in Table 33. Table 33 shows an embodiment of the SL-CBR-PPPP-TxConfigList information component.

TABLE 33

```
-- ASN1START
SL-CBR-PPPP-TxConfigList-r14 ::=    SEQUENCE (SIZE (1..8)) OF SL-PPPP-TxConfigIndex-r14
SL-PPPP-TxConfigIndex-r14 ::=       SEQUENCE {
    priorityThreshold-r14           SL-Priority-r13,
    defaultTxConfigIndex-r14        INTEGER(0..maxCBR-Level-1-r14),
    cbr-ConfigIndex-r14             INTEGER(0..maxSL-V2X-CBRConfig-1-r14),
    tx-ConfigIndexList-r14          SEQUENCE (SIZE (1..maxCBR-Level-r14)) OF Tx-ConfigList-r14
    tx-ConfigIndexList-r15          SEQUENCE (SIZE (1..maxCBR-Level-r14)) OF Tx-ConfigList-r15
}
Tx-ConfigList-r14 :: =              SEQUENCE {
    Tx-ConfigIndex-r14 ::=          INTEGER(0..maxSL-V2X-TxConfig-1-r14)
}
Tx-ConfigList-r15 :: =              SEQUENCE {
    Tx-ConfigIndex-r14 ::=          INTEGER(0..maxSL-V2X-TxConfig-1-r14)
    Selection Indicator-r15         BOOLEAN       -- OPTIONAL
    Reselection Indicator-r15       BOOLEAN       -- OPTIONAL
}
-- ASN1STOP
```

The selection indicator of Tx-ConfigList-r15, as an indicator to indicate carrier selection, may be set to be true or false. The reselection indicator of Tx-ConfigList-r15, as an indicator to indicate carrier reselection, may be set to be true or false. As the embodiments of Tables 31 and 32, the selection indicator or the reselection indicator may be combined with a priority threshold value (priorityThreshold) or a CBR configuration index (cbr-ConfigIndex), and may then be used as a carrier selection or reselection condition.

In addition, the selection indicator or the reselection indicator may be set to the same value, or may have different values.

In the case where the V2X terminal selects a carrier, the V2X terminal may select a candidate resource pool by referring to a selection indicator. In the case where the V2X terminal reselects a carrier after the selection of the carrier, the V2X terminal may select a candidate resource pool by referring to a reselection indicator.

Tables 34 to 36 according to various embodiments of the present disclosure show another embodiment of RRC signaling in which CBR common TX configuration of system information is used.

Table 34 shows an example in which the selection indicator exists only in some CBRs in the table of the CBR common TX configuration. In the case where the selection indicator is set to a specific CBR index of the CBR common TX configuration, the operation of the same indicator (e.g., the carrier selection condition or the carrier reselection condition) may also be applied to CBR indexes above the specific CBR index. For example, if the selection indicator for CBR index 2 is set to be true, the V2X terminal may operate as follows. In the case where the CBR index determined on the basis of the CBR measurement result of the resource pool and the PPPP of the data to be transmitted is 3, if it is assumed that the CBR index 3 is above the reference CBR index 2, the V2X terminal may perform the carrier selection or reselection operation by applying the fact that selection indicator is true for the CBR index 3 because the selection indicator of the CBR index 2 is set to be true.

TABLE 34

| CBR index 1 | CRLimit, transmission parameter |
| CBR index 2 | CRLimit, transmission parameter, selection indicator |
| . . . | . . . |
| CBR index 16 | CRLimit, transmission parameter |

Table 35 shows an example in which a selection indicator exists in all CBR indexes of the CBR common TX configuration. That is, a selection indicator set in each CBR index of the CBR common TX configuration may be used as a carrier selection or reselection condition. For example, if the selection indicator for CBR index 2 is set to be true, the V2X terminal may operate as follows. If the V2X terminal determines the CBR index 2 on the basis of the CBR measurement result of the resource pool and the PPPP of the data to be transmitted, since the selection indicator for the CBR index 2 is set to be true, the V2X terminal may perform the carrier selection or reselection operation. For example, in the case where the CBR index 2 is determined on the basis of the CBR result measured by the V2X terminal and the PPPP of the data to be transmitted, the V2X terminal may refer to a value of the selection indicator of the CBR index 2, and if the indicator is set to be false, may not perform the carrier selection or reselection operation.

TABLE 35

| CBR index 1 | CRLimit, transmission parameter, selection indicator |
| CBR index 2 | CRLimit, transmission parameter, selection indicator |
| . . . | . . . |
| CBR index 16 | . . . |

An embodiment of RRC signaling including the information in the above Tables 34 and 35 is as follows. As an embodiment of RRC ASN.1, a selection indicator may be included in SL-CBR-CommonTxConfigList, which is shown, for example, in Table 36 below. Table 36 shows an embodiment of the SL-CBR-CommonTxConfigList information component.

TABLE 36

```
-- ASN1START
SL-CBR-CommonTxConfigList-r14 ::=    SEQUENCE {
    cbr-RangeCommonConfigList-r14    SEQUENCE (SIZE (1..maxSL-V2X-CBRConfig-r14)) OF SL-CBR-Levels-
Config-r14,
    sl-CBR-PSSCH-TxConfigList-r14    SEQUENCE (SIZE (1..maxSL-V2X-TxConfig-r14)) OF SL-CBR-PSSCH-
TxConfig-r14
    sl-CBR-PSSCH-TxConfigList-r15    SEQUENCE (SIZE (1..maxSL-V2X-TxConfig-r14)) OF SL-CBR-PSSCH-
TxConfig-r15
}
SL-CBR-Levels-Config-r14 ::=         SEQUENCE (SIZE (1..maxCBR-Level-r14)) OF SL-CER-r14
SL-CBR-PSSCH-TxConfig-r14 ::=        SEQUENCE {
    cr-Limit-r14                     INTEGER(0..10000),
    tx-Parameters-r14                SL-PSSCH-TxParameters-r14
}
SL-CBR-PSSCH-TxConfig-r15 ::=        SEQUENCE {
    cr-Limit-r14                     INTEGER(0..10000),
    tx-Parameters-r14                SL-PSSCH-TxParameters-r14
Selection Indicator-r15              BOOLEAN                       -- OPTIONAL
}
SL-CBR-r14 ::=                       INTEGER(0..100)
-- ASN1STOP
```

The selection indicator of SL-CBR-PSSCH-TxConfig-r15, as an indicator to indicate carrier selection or reselection, may be set to be true or false. As in the embodiments of Tables 34 and 35, the selection indicator may be combined with a CBR index, CR-Limit, a transmission (TX) parameter, a priority threshold value (priorityThreshold), or the like, and may then be used as a carrier selection or reselection condition.

The following Tables 37 and 38 according to various embodiments of the present disclosure show other embodiments of RRC signaling in which CBR common TX configuration of system information is used. A candidate resource pool may be selected using a selection indicator or a reselection indicator in Tables 37 and 38 below. The selection indicator is used to determine a carrier available for the V2X terminal when the V2X terminal selects the carrier. The reselection indicator is used to reselect a carrier while the V2X terminal is using a selected carrier.

Table 37 shows an example in which the selection indicator or the reselection indicator exists only in a specific CBR index range of the CBR common TX configuration. If the indicator (e.g., the selection indicator or the reselection indicator) is included in a specific index of the CBR common TX configuration in the table, the operation (e.g., carrier selection or reselection) of the same indicator may be performed for the CBR indexes above the specific index as a reference. For example, if the selection indicator or the reselection indicator for CBR index 2 is set to be true, the V2X terminal may operate as follows. The V2X terminal may determine the CBR index on the basis of the CBR measurement result of the resource pool and the PPPP of the data to be transmitted. if it is assumed that the CBR index 3, which is determined by the V2X terminal, is above the reference CBR index 2, the V2X terminal may also perform the carrier selection or reselection operation by applying the indicator of the CBR index 2 in the case of the CBR index 3 because the indicator (e.g., selection indicator or reselection indicator) of the CBR index 2 is set to be true.

TABLE 37

| CBR index 1 | CRLimit, transmission parameter |
| CBR index 2 | CRLimit, transmission parameter, selection indicator, reselection indicator |
| ... | ... |
| CBR index 16 | CRLimit, transmission parameter |

Table 38 shows an example in which a selection indicator or a reselection indicator exists in all CBR indexes of the CBR common TX configuration. The indicator (e.g., selection indicator or reselection indicator) set for the CBR index of the CBR common TX configuration may be used as a carrier selection or reselection condition. For example, if the selection indicator or the reselection indicator for CBR index 2 is set to be true, the V2X terminal may operate as follows. The V2X terminal may determine the CBR index on the basis of the CBR measurement result of the resource pool and the PPPP of the data to be transmitted. In the case where the CBR index is determine to be 2 according to the determination of the V2X terminal, the V2X terminal may perform the carrier selection or reselection operation because the indicator (e.g., selection indicator or reselection indicator) for the CBR index is set to be true. For example, in the case where the indicator (e.g., selection indicator or reselection indicator) for the CBR index 2 is set to be false, the V2X terminal may not perform the carrier selection or reselection operation if the CBR index determined by the V2X terminal is 2.

TABLE 38

| CBR index 1 | CRLimit, transmission parameter, selection indicator, reselection indicator |

TABLE 38-continued

| CBR index 2 | CRLimit, transmission parameter, selection indicator, reselection indicator |
|---|---|
| ... | ... |
| CBR index 16 | ... |

As an embodiment of the RRC signaling in Tables 37 and 38, a selection indicator or a reselection indicator may be included in SL-CBR-CommonTxConfigList. The ASN.1 example of the RRC signaling is shown in Table 39. Table 39 shows an embodiment of the SL-CBR-CommonTxConfigList information component.

The following Tables 40 to 41 according to various embodiments of the present disclosure show embodiments in which CBR common TX configuration of system information is used. The V2X terminal may use the TX parameter including the corresponding selection indicator or reselection indicator as a carrier selection and reselection condition. For example, if the selection indicator or the reselection indicator is set to be true in the TX parameter configuration, the V2X terminal may operate as follows. The V2X terminal may determine a CBR index on the basis of the CBR measurement result of the resource pool and the PPPP of the data to be transmitted. The V2X terminal may select a TX

TABLE 39

```
-- ASN1START
SL-CBR-CommonTxConfigList-r14 ::=   SEQUENCE {
    cbr-RangeCommonConfigList-r14   SEQUENCE (SIZE (1..maxSL-V2X-CBRConfig-r14)) OF SL-CBR-Levels-
Config-r14,
    sl-CBR-PSSCH-TxConfigList-r14   SEQUENCE (SIZE (1..maxSL-V2X-TxConfig-r14)) OF SL-CBR-PSSCH-
TxConfig-r14
    sl-CBR-PSSCH-TxConfigList-r15   SEQUENCE (SIZE (1..maxSL-V2X-TxConfig-r14)) OF SL-CBR-PSSCH-
TxConfig-r15
}
SL-CBR-Levels-Config-r14 ::=        SEQUENCE (SIZE (1..maxCBR-Level-r14)) OF SL-CBR-r14
SL-CBR-PSSCH-TxConfig-r14 ::=       SEQUENCE {
    cr-Limit-r14                    INTEGER(0..10000),
    tx-Parameters-r14               SL-PSSCH-TxParameters-r14
}
SL-CBR-PSSCH-TxConfig-r15 ::=       SEQUENCE {
    cr-Limit-r14                    INTEGER(0..10000),
    tx-Parameters-r14               SL-PSSCH-TxParameters-r14
Selection Indicator-r15             BOOLEAN                 -- OPTIONAL
Reselection Indicator-r15           BOOLEAN                 -- OPTIONAL
}
SL-CBR-r14 ::=                      INTEGER(0..100)
-- ASN1STOP
```

The selection indicator, as an indicator to indicate carrier selection, may be set to be true or false. The reselection indicator, as an indicator to indicate carrier reselection, may be set to be true or false. The selection indicator and the reselection indicator may be set to the same value, or may have different values.

In the case where the V2X terminal selects a carrier, the V2X terminal may select a candidate resource pool by referring to a selection indicator. In the case where the V2X terminal reselects a carrier after the selection of the carrier, the V2X terminal may select a candidate resource pool by referring to a reselection indicator.

parameter on the basis of the determined CBR index. If the indicator (i.e., the selection indicator or the reselection indicator) is set to be true in the TX parameter, the V2X terminal may perform the carrier selection or reselection operation. If the indicator (i.e., the selection indicator or the reselection indicator) is set to be false in the TX parameter, the V2X terminal may not perform the carrier selection or reselection operation.

Tables 40 and 41 show embodiments of the RRC signaling in which the TX parameters in SL-CBR-PPPP-TxConfigList include a selection indicator or a reselection indicator. Tables 40 and 41 show embodiments of the SL-CBR-CommonTxConfigList information component.

TABLE 40

```
-- ASN1START
SL-CBR-CommonTxConfigList-r14 ::=   SEQUENCE {
    cbr-RangeCommonConfigList-r14   SEQUENCE (SIZE (1..maxSL-V2X-CBRConfig-r14)) OF SL-CBR-Levels-
Config-r14,
    sl-CBR-PSSCH-TxConfigList-r14   SEQUENCE (SIZE (1..maxSL-V2X-TxConfig-r14)) OF SL-CBR-PSSCH-
TxConfig-r14
}
SL-CBR-Levels-Config-r14 ::=        SEQUENCE (SIZE (1..maxCBR-Level-r14)) OF SL-CBR-r14
SL-CBR-PSSCH-TxConfig-r14 ::=       SEQUENCE {
    cr-Limit-r14                    INTEGER(0..10000),
    tx-Parameters-r14               SL-PSSCH-TxParameters-r14
    tx-Parameters-r15               SL-PSSCH-TxParameters-r15
}
SL-CBR-r14 ::=                      INTEGER(0..100)
-- ASN1STOP
```

TABLE 41

```
SL-PSSCH-TxParametera-r15 ::=       SEQUENCE {
    minMCS-PSSCH-r14                INTEGER (0..31),
    maxMCS-PSSCH-r14                INTEGER (0..31),
    minSubchannel-NumberPSSCH-r14       INTEGER (1..20),
    maxSubchannel-NumberPSSCH-r14       INTEGER (1..20),
    allowedRetxNumberPSSCH-r14  ENUMERATED {n0, n1, both, spare1},
    maxTxPower-r14                  SL-TxPower-r14          OPTIONAL            -- Cond CBR
Selection Indicator-r15             BOOLEAN                 -- OPTIONAL
Reselection Indicator-r15           BOOLEAN                 -- OPTIONAL
}
```

The selection indicator, as an indicator to indicate carrier selection, may be set to be true or false. The reselection indicator, as an indicator to indicate carrier reselection, may be set to be true or false.

In addition, the selection indicator and the reselection indicator may be set to the same value, or may have different values.

In the case where the V2X terminal initially selects a carrier, the V2X terminal may select a candidate resource pool by considering a selection indicator. In addition, the V2X terminal may select a candidate resource pool by means of a reselection indicator after the selection of the carrier.

The embodiments of Tables 28 to 41 may be used separately or as a combination thereof. An example in which the embodiments of Tables 28 to 41 are used as a combination thereof is as follows. The V2X terminal may use Table 31 as a carrier selection criterion. First, the V2X terminal filters carrier selection candidates available for the condition of Table 31. Thereafter, the V2X terminal may filter the same according to the conditions of Tables 40 and 41 once again, thereby finally determining the available candidate carrier resources.

The selection indicators or the reselection indicators in Tables 28 to 41 in the above embodiments may be indicator information allocated to each carrier or commonly used for all carriers.

A candidate resource pool may be selected in the MAC layer using the events according to the embodiments of FIGS. 8, 10 to 12, 15, 16, and 19 or using Tables 28 to 41. In this case, as to the comparative group, according to various embodiments of the present disclosure, (i) the previous CBR value of the currently used carrier (e.g., the CBR result 100 ms before the present time or the CBR value at the previous resource selection time) may be compared with the current CBR value of the currently used carrier (i.e., the CBR value at the present time or the CBR value at the current resource selection time), thereby determining carrier selection or reselection, or (ii) the current CBR value of the currently used carrier and the current CBR value of a candidate carrier may be used to determine carrier selection or reselection.

According to various embodiments of the present disclosure, a method for operating a terminal in a wireless communication system is provided. The method comprises acquiring information on a first threshold value and a second threshold value of channel busy ratio (CBR); measuring a first CBR for a first carrier and a plurality of second CBRs for a plurality of second carriers configured by upper layer; and determining at least one transmission carrier from among the first carrier and the plurality of second CBRs based on the first threshold value, the second threshold value, the first CBR and the plurality of second CBRs. In some embodiments, wherein determining the at least one transmission carrier comprises: if the first CBR is higher than the first threshold value and the plurality of second CBRs are lower than the second threshold value, determining the at least one transmission carrier as at least one second carrier with at least one lowest CBR from among the plurality of second carriers. In some embodiments, wherein determining the at least one transmission carrier comprises: if the first CBR is lower than the first threshold value or the plurality of second CBRs are higher than the second threshold value, determining the at least one transmission carrier as the first carrier. In some embodiments, wherein the information on the first threshold value and the second threshold value is acquired by radio resource control (RRC) reconfiguration from upper layer. In some embodiments, wherein the information on the first threshold value and the second threshold value is acquired by system information block from upper layer. In some embodiments, the method further comprising: sensing available resources for the at least one transmission carrier. In some embodiments, the method further comprising: transmitting a request for resource allocation using the at least one transmission carrier; and receiving a resource allocation message for available resources for the at least one transmission carrier. In some embodiments, the method further comprising: transmitting data based on the available resources.

According to various embodiments of the present disclosure, a terminal in a wireless communication system is provided. The terminal comprises a transceiver; and a processor operably coupled to the transceiver, and configured to: acquire information on a first threshold value and a second threshold value of channel busy ratio (CBR), measure a first CBR for a first carrier and a plurality of second CBRs for a plurality of second carriers configured by upper layer, and determine at least one transmission carrier from among the first carrier and the plurality of second CBRs based on the first threshold value, the second threshold value, the first CBR and the plurality of second CBRs. In some embodiments, wherein the processor is further configured to: if the first CBR is higher than the first threshold value and the plurality of second CBRs are lower than the second threshold value, determine the at least one transmission carrier as at least one second carrier with at least one lowest CBR from among the plurality of second carriers. In some embodiments, wherein the processor is further configured to: if the first CBR is lower than the first threshold value or the plurality of second CBRs are higher than the second threshold value, determine the at least one transmission carrier as the first carrier. In some embodiments, wherein the information on the first threshold value and the second threshold value is acquired by radio resource control (RRC) reconfiguration from upper layer. In some embodiments, wherein the information on the first threshold value and the second threshold value is acquired by system information block from upper layer. In some embodiments, wherein the processor is further configured to sense available resources for the at least one transmission carrier. In some embodiments, wherein the processor is further configured to: control the transceiver to transmit a request for resource allocation using the at least one transmission carrier, and control the transceiver to receive a resource allocation message for available resources for the at least one transmission carrier. In some embodiments, wherein the processor is further configured to control the transceiver to transmit data based on the sensed available resources.

According to various embodiments of the present disclosure, a method for operating a base station in a wireless communication system is provided. The method comprises transmitting information on a first threshold value and a second threshold value of channel busy ratio (CBR) to a terminal; receiving a request for resource allocation using at least one transmission carrier determined based on the first threshold value, the second threshold value, a first CBR for a first carrier and a plurality of second CBRs for a plurality of second carriers; and transmitting a resource allocation message for available resources for the at least one transmission carrier. In some embodiments, wherein, if the first CBR is higher than the first threshold value and the plurality of second CBRs are lower than the second threshold value, the at least one transmission carrier is determined as at least one second carrier with at least one lowest CBR from among the plurality of second carriers. In some embodiments, wherein, if the first CBR is lower than the first threshold value or the plurality of second CBRs are higher than the second threshold value, the at least one transmission carrier is determined as the first carrier. In some embodiments, wherein the information on the first threshold value and the second threshold value is transmitted by radio resource control (RRC) reconfiguration or system information block.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for operating a terminal in a wireless communication system, the method comprising:
receiving, from a base station, information on a first threshold value of a channel busy ratio (CBR) and a second threshold value of the CBR;
measuring at least one first CBR for at least one serving carrier and a plurality of second CBRs for a plurality of other carriers;
in case that the at least one first CBR is higher than the first threshold value and at least one of the plurality of second CBRs is lower than the second threshold value, selecting at least one transmission carrier having at least one lowest CBR among the plurality of other carriers;
selecting at least one resource from a resource pool associated with the at least one transmission carrier; and
transmitting data based on the selected at least one resource.

2. The method of claim 1,
wherein the first threshold value is a CBR threshold to determine whether the at least one serving carrier can be selected for the at least one transmission carrier, and
wherein the second threshold value is a CBR threshold to determine whether the at least one transmission carrier can be determined among the plurality of other carriers.

3. The method of claim 1, further comprising:
selecting the at least one transmission carrier as the at least one serving carrier in case that the at least one first CBR is lower than the first threshold value.

4. The method of claim 1, wherein the information on the first threshold value and the second threshold value is received by radio resource control (RRC) connection reconfiguration.

5. The method of claim 1, wherein the information on the first threshold value and the second threshold value is received by system information block.

6. The method of claim 1, further comprising:
sensing available resources for the at least one transmission carrier.

7. The method of claim 1, further comprising:
transmitting a request for resource allocation using the at least one transmission carrier; and
receiving a resource allocation message for available resources for the at least one transmission carrier.

8. A terminal in a wireless communication system, the terminal comprising:
a transceiver; and
a processor operably coupled to the transceiver and configured to:
receive, from a base station, information on a first threshold value of a channel busy ratio (CBR) and a second threshold value of the CBR,
measure at least one first CBR for at least one serving carrier and a plurality of second CBRs for a plurality of other carriers,
in case that the at least one first CBR is higher than the first threshold value and at least one of the plurality of second CBRs is lower than the second threshold value, select at least one transmission carrier having at least one lowest CBR among the plurality of other carriers,
select at least one resource from a resource pool associated with the at least one transmission carrier, and
transmit data based on the selected at least one resource.

9. The terminal of claim 8,
wherein the first threshold value is a CBR threshold to determine whether the at least one serving carrier can be selected for the at least one transmission carrier, and
wherein the second threshold value is a CBR threshold to determine whether the at least one transmission carrier can be determined among the plurality of other carriers.

10. The terminal of claim 8,
wherein the processor is further configured to:
select the at least one transmission carrier as the at least one serving carrier in case that the at least one first CBR is lower than the first threshold value.

11. The terminal of claim 8, wherein the information on the first threshold value and the second threshold value is received by radio resource control (RRC) connection reconfiguration.

12. The terminal of claim 8, wherein the information on the first threshold value and the second threshold value is received by system information block.

13. The terminal of claim 8, wherein the processor is further configured to sense available resources for the at least one transmission carrier.

14. The terminal of claim 8,
wherein the processor is further configured to:
transmit a request for resource allocation using the at least one transmission carrier, and
receive a resource allocation message for available resources for the at least one transmission carrier.

15. A method for operating a base station in a wireless communication system, the method comprising:
transmitting, to a terminal, information on a first threshold value for at least one first channel busy ratio (CBR) from at least one serving carrier and a second threshold value for a plurality of second CBRs from a plurality of other carriers;
receiving a request for resource allocation on at least one transmission carrier; and
transmitting a resource allocation message for available resources for the at least one transmission carrier,
wherein, in case that the at least one first CBR is higher than the first threshold value and at least one of the plurality of second CBRs is lower than the second threshold value, the at least one transmission carrier having at least one lowest CBR is selected among a plurality of other carriers, and data is transmitted based on at least one resource selected from a resource pool associated with the at least one transmission carrier.

16. The method of claim 15,
wherein the first threshold value is a CBR threshold to determine whether the at least one serving carrier can be selected for the at least one transmission carrier, and
wherein the second threshold value is a CBR threshold to determine whether the at least one transmission carrier can be determined among the plurality of other carriers.

17. The method of claim 15,
wherein the at least one transmission carrier is selected as the at least one serving carrier in case that the at least one first CBR is lower than the first threshold value.

18. The method of claim 15, wherein the information on the first threshold value and the second threshold value is transmitted by radio resource control (RRC) connection reconfiguration or system information block.

19. A base station in a wireless communication system, the base station comprising:
a transceiver; and
a processor operably coupled to the transceiver and configured to:
transmit, to a terminal, information on a first threshold value for at least one first channel busy ratio (CBR) from at least one serving carrier and a second threshold value for a plurality of second CBRs from a plurality of other carriers,
receive a request for resource allocation on at least one transmission carrier, and
transmit a resource allocation message for available resources for the at least one transmission carrier,
wherein, in case that the at least one first CBR is higher than the first threshold value and at least one of the plurality of second CBRs is lower than the second threshold value, the at least one transmission carrier having at least one lowest CBR is selected among a plurality of other carriers, and data is transmitted based on at least one resource selected from a resource pool associated with the at least one transmission carrier.

20. The base station of claim 19,
wherein the first threshold value is a CBR threshold to determine whether the at least one serving carrier can be selected for the at least one transmission carrier, and
wherein the second threshold value is a CBR threshold to determine whether the at least one transmission carrier can be determined among the plurality of other carriers.

21. The base station of claim 19,
wherein the at least one transmission carrier is selected as the at least one serving carrier in case that the at least one first CBR is lower than the first threshold value.

22. The base station of claim 19, wherein the information on the first threshold value and the second threshold value is transmitted by radio resource control (RRC) connection reconfiguration or system information block.

* * * * *